US007158915B2

(12) United States Patent
Wargon

(10) Patent No.: US 7,158,915 B2
(45) Date of Patent: Jan. 2, 2007

(54) APPARATUS AND METHOD FOR DISPLAYING NUMERIC VALUES CORRESPONDING TO THE VOLUME OF SEGMENTS OF AN IRREGULARLY SHAPED ITEM

(76) Inventor: Kenneth Wargon, 85 Raglan Street, Manly, NSW 2095 (AU)

( * ) Notice: Subject to any disclaimer, the term of this patent is extended or adjusted under 35 U.S.C. 154(b) by 0 days.

(21) Appl. No.: 10/744,059

(22) Filed: Dec. 23, 2003

(65) Prior Publication Data

US 2004/0153283 A1    Aug. 5, 2004

Related U.S. Application Data

(60) Provisional application No. 60/520,812, filed on Nov. 17, 2003, provisional application No. 60/498,639, filed on Aug. 29, 2003, provisional application No. 60/453,816, filed on Mar. 11, 2003, provisional application No. 60/440,801, filed on Jan. 16, 2003, provisional application No. 60/436,078, filed on Dec. 23, 2002.

(51) Int. Cl.
*G01B 5/26*    (2006.01)

(52) U.S. Cl. .................................... 702/156; 702/167

(58) Field of Classification Search ................ 702/156; 452/149, 150, 152, 155, 156, 157, 159; 83/360, 83/361, 363, 365, 170, 171, 732
See application file for complete search history.

(56) References Cited

U.S. PATENT DOCUMENTS 3,762,257 A    10/1973    Matthews, Jr.
3,851,720 A  * 12/1974    Williams, Jr. .................. 177/3
4,557,019 A  * 12/1985    Van Devanter et al. ..... 452/157
4,598,618 A    7/1986    Kuchler
4,726,094 A    2/1988    Braeger
4,868,951 A    9/1989    Akesson et al.

(Continued)

OTHER PUBLICATIONS

Horowitz and Hill, "The Art of Electronics", 1989, Cambridge University Press, pp. 590-595.*

*Primary Examiner*—John Barlow
*Assistant Examiner*—Stephen J. Cherry
(74) *Attorney, Agent, or Firm*—John R. Benefiel

(57) ABSTRACT

An apparatus and method for displaying the weight or cost of segments of an irregularly shaped item involves passing a sensor bar supported above a supporting surface over the item lying on the surface. A compact hand-held embodiment of the sensor bar enables the operator to move the sensor bar in various linear or non-linear motions over the item surface as the sensor bar moves laterally across the item surface while the sensor bar support posts remain in constant contact with the supporting surface. The sensor bar contains one or more sensors which generate signals corresponding to the height of the item as the sensor bar traverses the item. At the same time, a displacement detector arrangement generates signals corresponding to displacement of the sensor bar relative to the support surface. These signals are processed in a signal processor to determine the volume of an uncut segment of the item lying behind the sensor bar at successive positions. Each of these cumulative volume determinations may be continuously converted into numeric weight values based on the density factor for the particular type of item, whereby numeric weight and cost values (based on weight) are continuously displayed as the sensor bar is stroked over the item, thus enabling the operator to accommodate an on-looking consumer's specific requests as per the particular portion desired based on the physical appearance, weight, and cost of an item before the item is cut.

147 Claims, 66 Drawing Sheets

U.S. PATENT DOCUMENTS

| | | | | |
|---|---|---|---|---|
| 5,054,345 A | * | 10/1991 | Weber | 83/42 |
| RE33,851 E | * | 3/1992 | Rudy et al. | 452/150 |
| RE33,904 E | * | 4/1992 | Rudy et al. | 452/150 |
| 5,163,865 A | * | 11/1992 | Smith | 452/157 |
| 5,184,733 A | * | 2/1993 | Arnarson et al. | 209/585 |
| 5,226,334 A | | 7/1993 | Pegoraro | |
| 5,739,426 A | * | 4/1998 | Storm | 73/149 |
| 5,937,080 A | * | 8/1999 | Vogeley et al. | 382/110 |
| 6,125,338 A | | 9/2000 | Brienza et al. | |
| 6,164,174 A | * | 12/2000 | Sigurdsson et al. | 83/13 |
| 6,407,818 B1 | * | 6/2002 | Whitehouse | 356/627 |
| 6,700,563 B1 | | 3/2004 | Koizumi | |
| 6,701,279 B1 | * | 3/2004 | Hawes | 702/155 |

\* cited by examiner

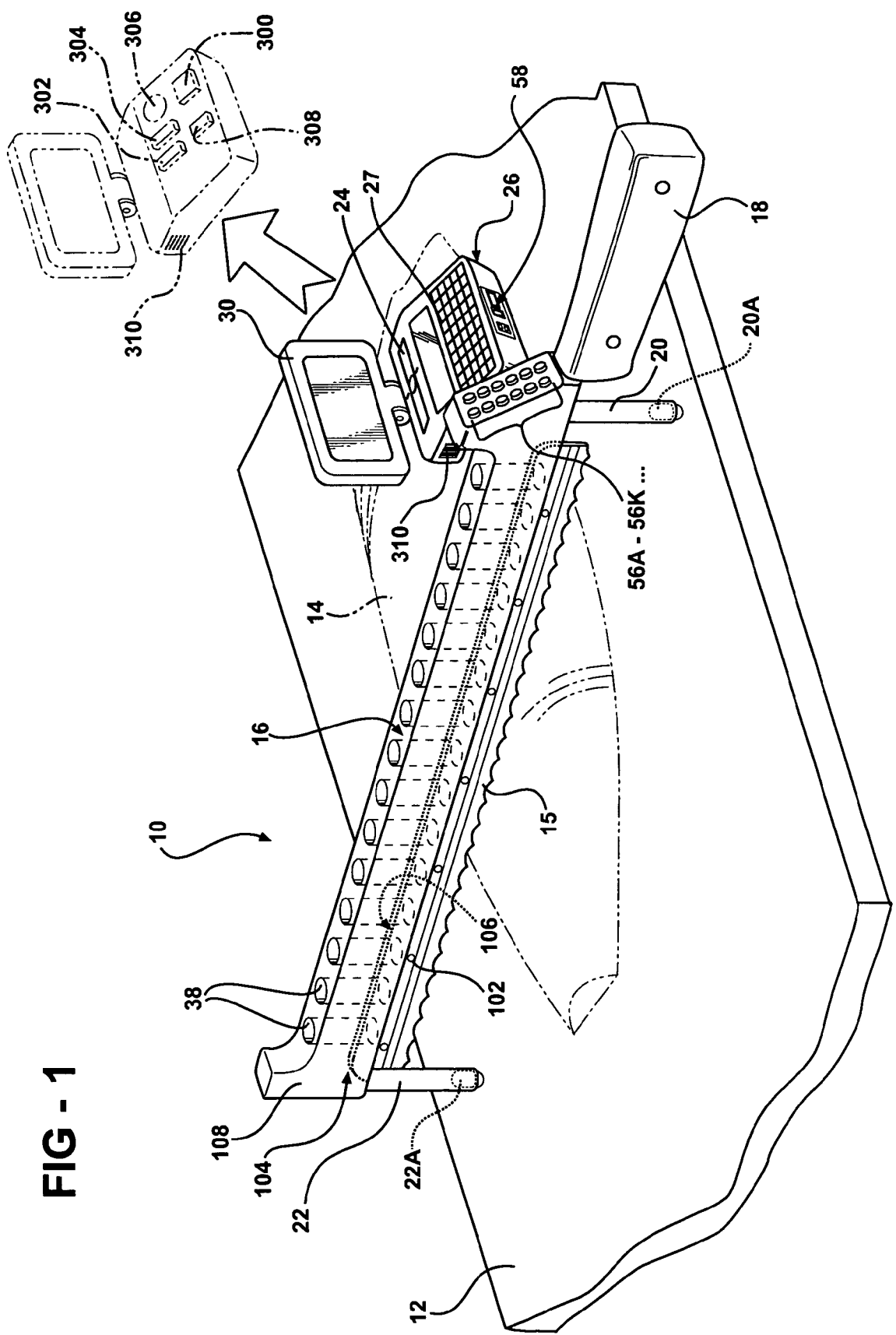

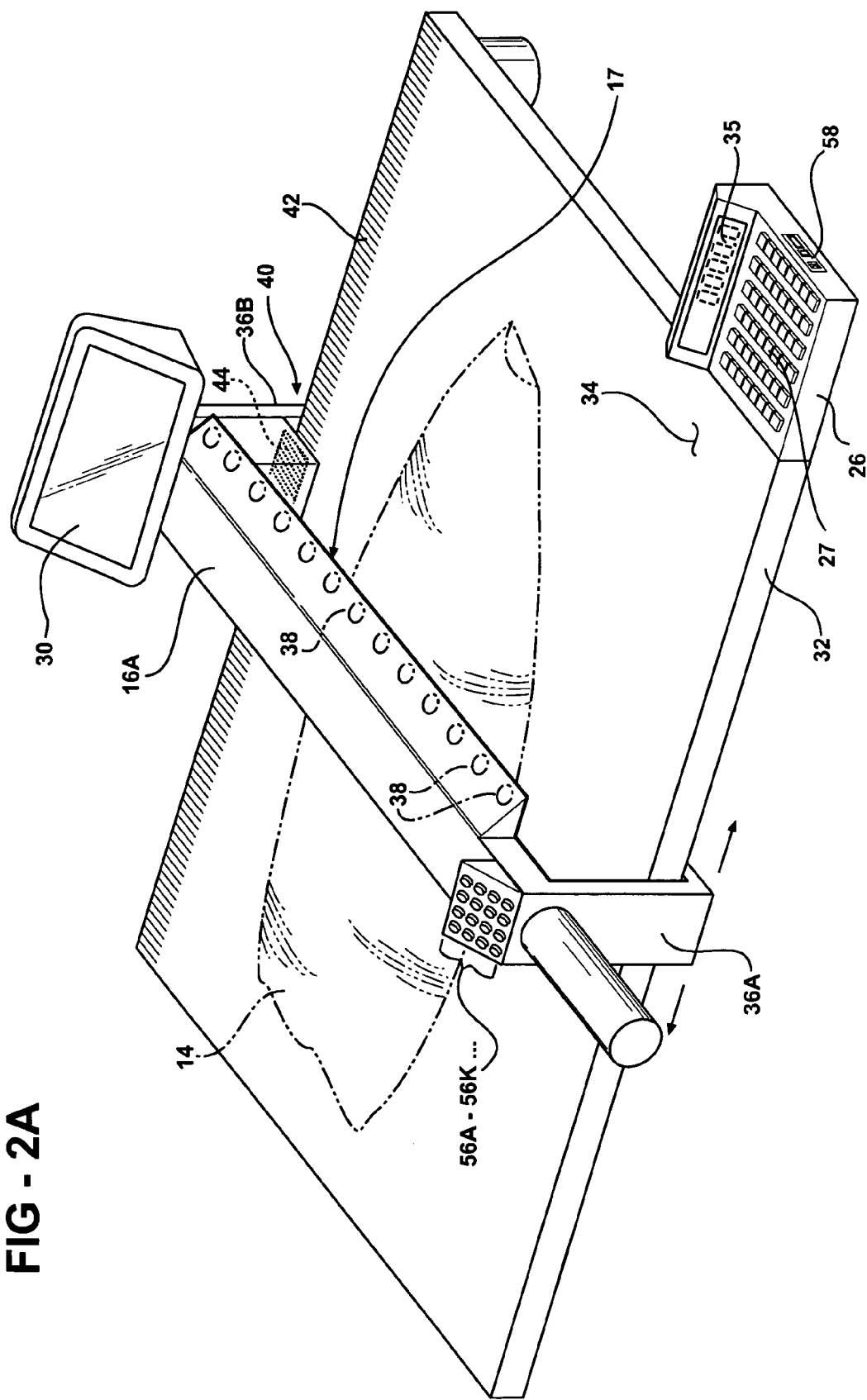

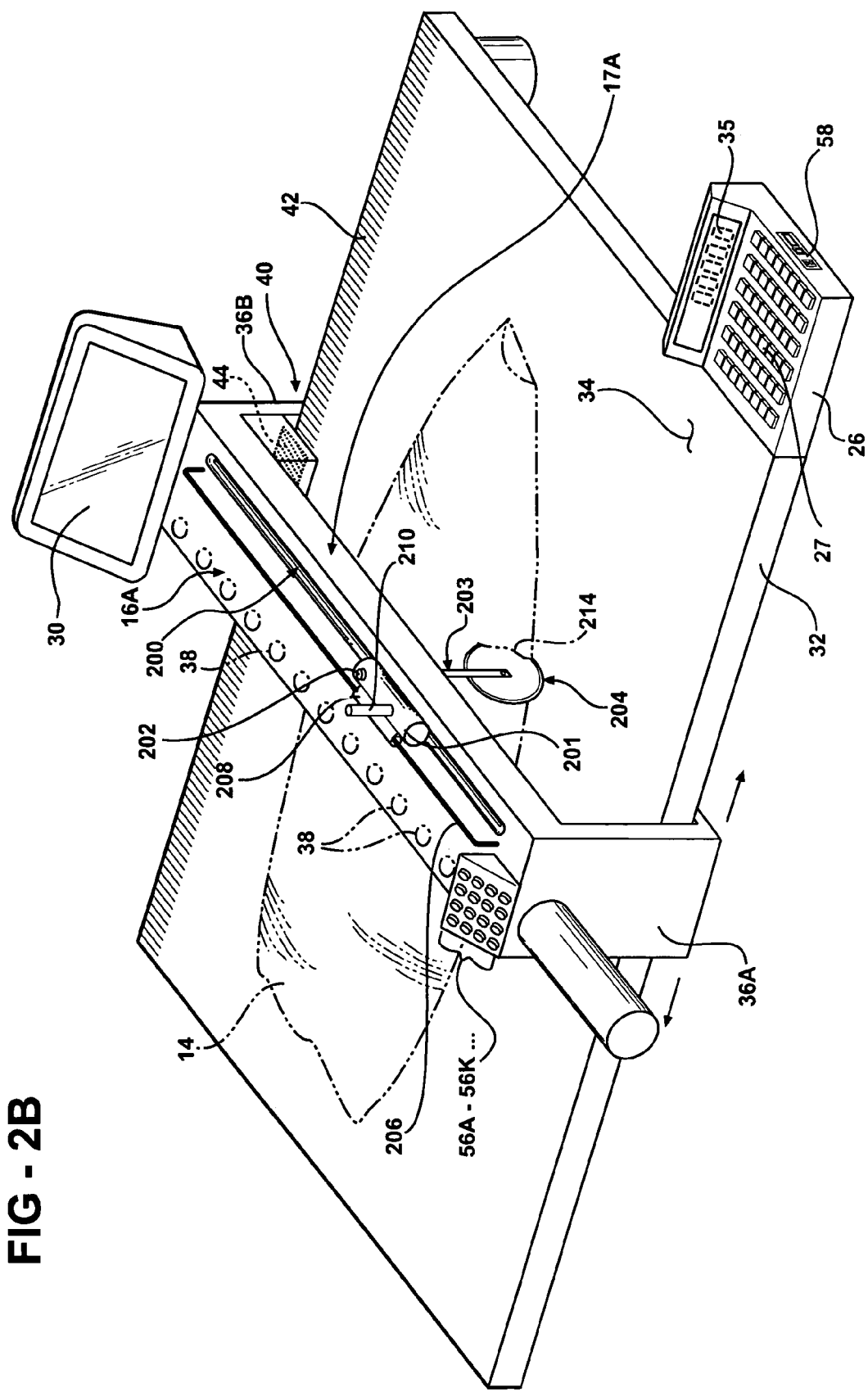

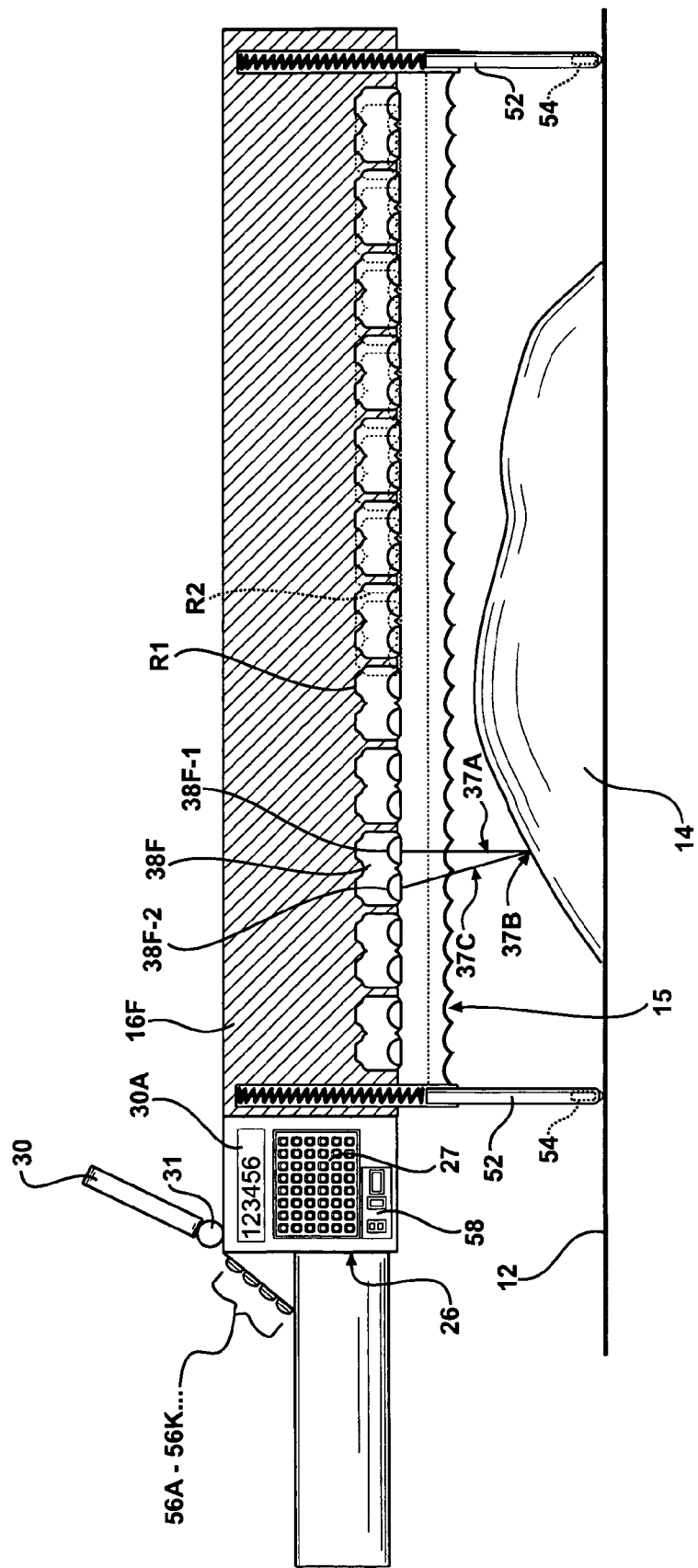

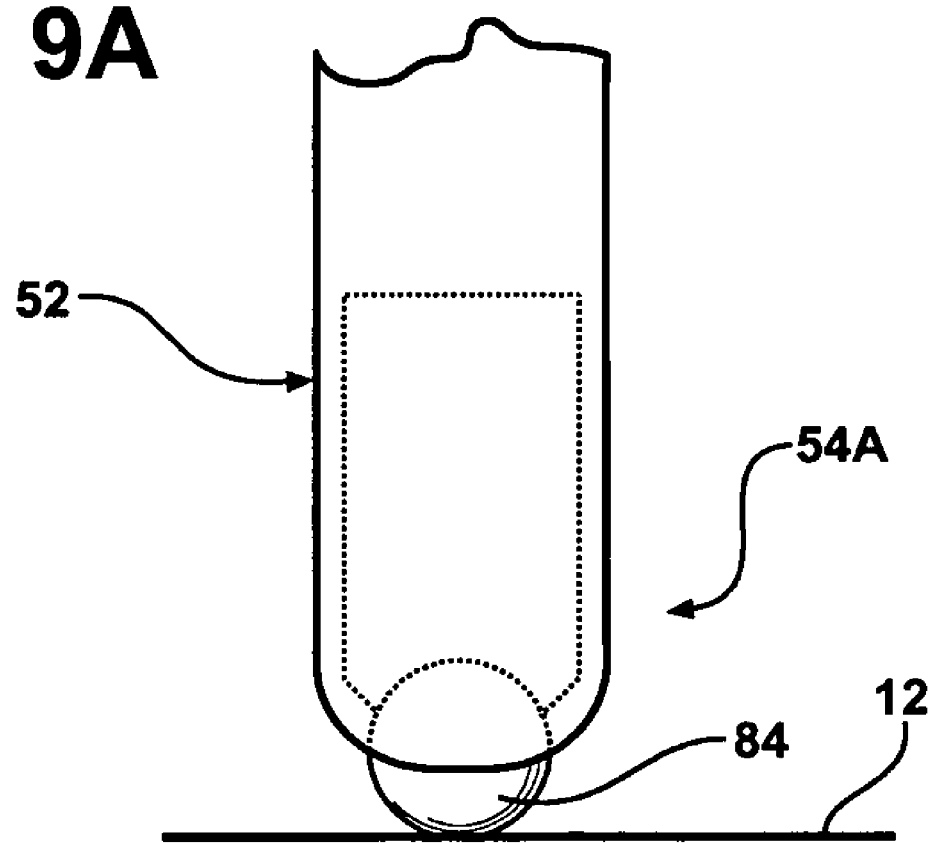

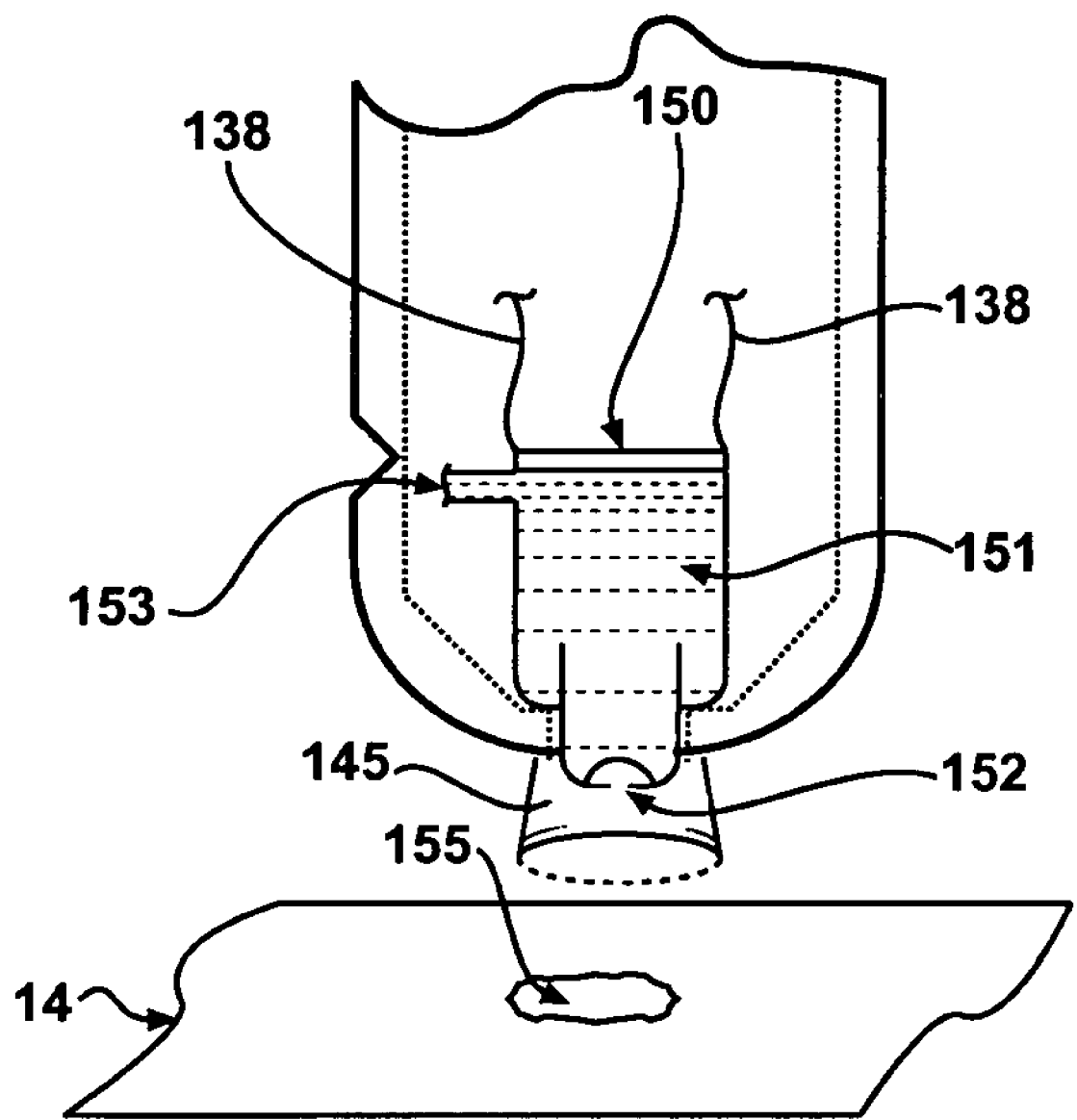

(V)

(VI)

(III)

(IV)

(I)

(II)

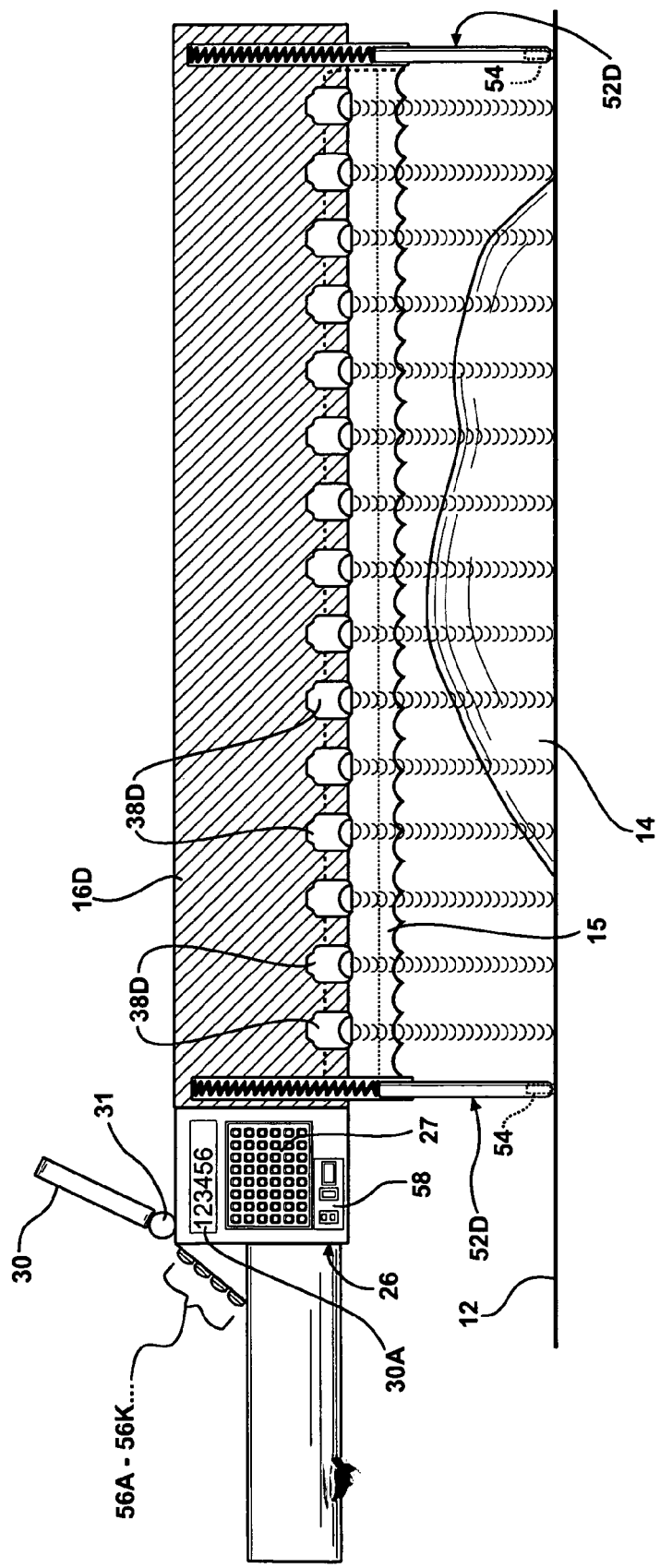

APPARATUS AND METHOD FOR DISPLAYING NUMERIC VALUES CORRESPONDING TO THE VOLUME OF SEGMENTS OF AN IRREGULARLY SHAPED ITEM

CROSS REFERENCE TO RELATED APPLICATIONS

This invention claims the benefit of U.S. provisional Ser. No. 60/436,078, filed Dec. 23, 2002, U.S. provisional Ser. No. 60/440,801, filed Jan. 16, 2003, U.S. provisional Ser. No. 60/453,816, filed Mar. 11, 2003, U.S. provisional Ser. No. 60/498,639, filed Aug. 29, 2003, and U.S. provisional Ser. No. 60/520,812, filed Nov. 17, 2003.

BACKGROUND OF THE INVENTION

This invention concerns the selective segmenting of irregularly shaped items such as fish filets, or meat cuts, particularly at the point of sale. Complex and bulky machinery has heretofore been devised for automatically cutting up food items such as fish fillets into portions of a desired weight in food packing operations which supply food retailers with pre-weighed packages.

However, at the retail level, the problem still exists as to how to segment an irregularly shaped food item such as a fish fillet or meat cut to a particular weight requested by a customer (or to a price based on the weight) or to determine the weight and/or cost of a selected portion. When a customer requests a certain weight portion of a food item such as a fish fillet, a segment is cut from the item based on the best estimate made by the server as to the weight of that segment. Too often, upon being weighed, the selected portion does not turn out to weigh (or cost) what the customer requested due to the difficulty in estimating the weight of a particular segment of quite variably shaped food item. This is a particular problem with inexperienced servers. Also, a customer may sometimes wish to see how much a certain portion weighs (or costs) before the portion is cut. The aforementioned automatic machinery cannot do this and is not otherwise suited to retail shop applications, as it is too bulky, complex, and expensive for retail shop use.

It is the object of the present invention to provide a relatively simple to use and compact apparatus and method for quickly providing an indication of the weight and/or cost of a particular uncut segment of an irregularly shaped item.

It is another object to provide such apparatus and method which is suitable for use in a retail fish or meat market or elsewhere for accurately and quickly providing a computation of the weight (or cost based on weight) of a selected cut or uncut segment of a food or other non-food items.

The apparatus and method may also be used for other segmenting applications where a non-food item needs to be portioned or a weight determination made quickly and accurately. While particularly advantageous for retail sale use, it may also be used in industrial applications as providing a lower cost alternative for existing automated processing equipment.

SUMMARY OF THE INVENTION

The above recited objects and other objects which will be appreciated upon a reading of the following specification and claims are achieved by a compact device which may be manually operated including a sensor bar supported spaced above a table, conveyor belt, or other support surface at a predetermined height thereabove sufficient to provide vertical clearance for the expected maximum thickness of the range of items to be segmented. The sensor bar support allows the bar to be relatively moved with respect to the support surface to be passed over and along the item while being supported at the predetermined height above the table surface. The sensor bar can be supported on a post at each end, with the posts held vertical and the sensor bar guided in its movement manually by the operator. In this embodiment, the sensor bar can be moved freely on the table surface, and also freely lifted clear for use elsewhere. Alternatively, the sensor bar can be supported elevated above the table surface by uprights and guide bearings, to be constrained in its orientation and position as it is stroked across the width of the table.

The sensor bar can thus be manually stroked along the length of an item to be segmented which has previously been placed on the table surface. A selectively controlled powered operation of the sensor bar stroking may also be provided in the constrained sensor bar embodiment.

In both forms, the sensor bar carries a sensor arrangement comprising one or more sensors generating signals corresponding to the cross sectional contour of each section of an item passed over during the movement of the sensor bar. In some embodiments, one or more sensors either simultaneously or sequentially measure the height of points on the upper surface of the item above the support surface lying beneath the sensor bar and generate signals corresponding thereto.

A displacement measuring detector arrangement is also provided associated with the sensor bar support detecting the extent and direction of displacement of the sensor bar when being passed over the item on the table surface, and also generating corresponding signals. The sensor and detector arrangement signals are transmitted to a suitable microprocessor based signal processor, which processes the signals to continuously calculate the cumulative volume of the uncut segment of the item located behind the section over which the sensor bar is positioned at each of its relative positions over the item on the support surface.

Each of these cumulative volume calculations may be converted into corresponding numeric weight values based on a predetermined memory stored density factor for the particular type of item, which factor may be obtained electronically from a look-up table or value loaded into the memory of the signal processor. These numeric weight values (or numerically indicated prices based on weight) are continuously or selectively displayed as the sensor bar passes over the item.

The segment can be cut from the item with a knife at any selected point to provide a segment of an accurately predetermined weight (or cost).

Various known forms of sensors and displacement detectors may be employed including mechanical, electromechanical, optical-mechanical, acoustic, optical devices, or other devices.

A knife may be mounted to the sensor bar, and the sensor bar can be selectively lowered by retraction of sensor bar rod supports, allowing cutting of the segment with the knife still attached to the sensor bar. Or, alternatively, the item may merely be marked or scored with, for example, the knife, ink marker devices, heating elements, laser burners, or sharp pointed plungers, for later cutting off of the segment selected. A knife can also be separately stored or detachably mounted to the bar and retrieved to perform the segmenting cut. A separate knife used to cut the segment may be guided by surfaces on the sensor bar support.

A powered cutting device such as a rotary blade or laser can also be mounted and driven to traverse along the sensor bar and cut the item into a selected segment.

DESCRIPTION OF THE DRAWINGS

FIG. 1 is a pictorial view of a first embodiment of an apparatus according to the present invention with an item to be segmented shown in phantom lines in position on a supporting table surface shown in fragmentary form, and with an enlarged view of the signal processor case.

FIG. 2A is a pictorial view of another embodiment of an apparatus according to the present invention, with an item to be segmented shown in phantom lines on a support surface.

FIG. 2B is a pictorial view of another embodiment of an apparatus according to the present invention, with an item to be segmented shown in phantom lines on a support surface.

FIG. 3C is an enlarged partially sectional view taken along the sensor bar shown in FIG. 3A showing a modification thereof.

FIG. 9A is a fragmentary side elevational view of a sensor bar support post incorporating another form of a displacement detector.

FIG. 10A-1 is a fragmentary elevational view of a marking plunger using an ink jet marker, with a fragmentary view of an item to be portioned.

FIG. 10A-2 is a partially sectional view of the marking plunger and associated mounting shown in FIG. 10A-1, with the marking plunger in a retracted position.

FIG. 10A-3 is a partially sectional view of the marking plunger and mounting shown in FIG. 10A-2, with the marking plunger in the extended position.

FIG. 10A-4 is a partially sectional view of a height sensor plunger and mounting incorporated in the apparatus according to the invention equipped with an ink jet marker device, with the plunger shown in the extended position.

FIG. 10A-5 is a partially sectional view of the height sensing plunger of FIG. 10A-4 but shown with the plunger in the retracted position.

FIG. 10B-1 is a fragmentary elevational view of a marking plunger using a heater branding device, with a fragmentary view of an item to be portioned.

FIG. 10B-2 is a partially sectional view of the marking plunger and associated mounting shown in FIG. 10B-1, with the marking plunger in a retracted position.

FIG. 10B-3 is a partially sectional view of the marking plunger and mounting shown in FIG. 10B-2, with the marking plunger in the extended position.

FIG. 10B-4 is a partially sectional view of a height sensor plunger and mounting incorporated in the apparatus according to the invention equipped with a heater branding device, with the plunger shown in the extended position.

FIG. 10B-5 is a partially sectional view of the height sensing plunger of FIG. 10B-4 but shown with the plunger in the retracted position.

FIG. 10C-1 is a fragmentary elevational view of a marking plunger using a laser marker, with a fragmentary view of an item to be portioned.

FIG. 10C-2 is a partially sectional view of the marking plunger and associated mounting shown in FIG. 10C-1, with the marking plunger in a retracted position.

FIG. 10C-3 is a partially sectional view of the marking plunger and mounting shown in FIG. 10C-2, with the marking plunger in the extended position.

FIG. 10C-4 is a partially sectional view of a height sensor plunger and mounting incorporated in the apparatus according to the invention equipped with laser marker device, with the plunger shown in the extended position.

FIG. 10C-5 is a partially sectional view of the height sensing plunger of FIG. 10C-4 but shown with the plunger in the retracted position.

FIG. 10D-1 is a fragmentary elevational view of a marking plunger using a sharp tool marker, with a fragmentary view of an item to be portioned.

FIG. 10D-2 is a partially sectional view of the marking plunger and associated mounting shown in FIG. 10D-1, with the marking plunger in a retracted position.

FIG. 10D-3 is a partially sectional view of the marking plunger and mounting shown in FIG. 10D-2, with the marking plunger in the extended position.

FIG. 10D-4 is a partially sectional view of a height sensor plunger and mounting incorporated in the apparatus according to the invention equipped with sharp tool marker device, with the plunger shown in the extended position.

FIG. 10D-5 is a partially sectional view of the height sensing plunger of FIG. 10D-4 but shown with the plunger in the retracted position.

FIG. 13C is a fragmentary elevational view of a thermal bubble ink jet marking mechanism in its ink recharging condition with an ink mark on an adjacent item to be marked.

FIG. 20 is a partially sectional view of a sensor bar having a series of sensors mounting thereon utilizing penetrating waves to determine the thickness of a segment of an item resting on a table surface.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figures 1, 10A:
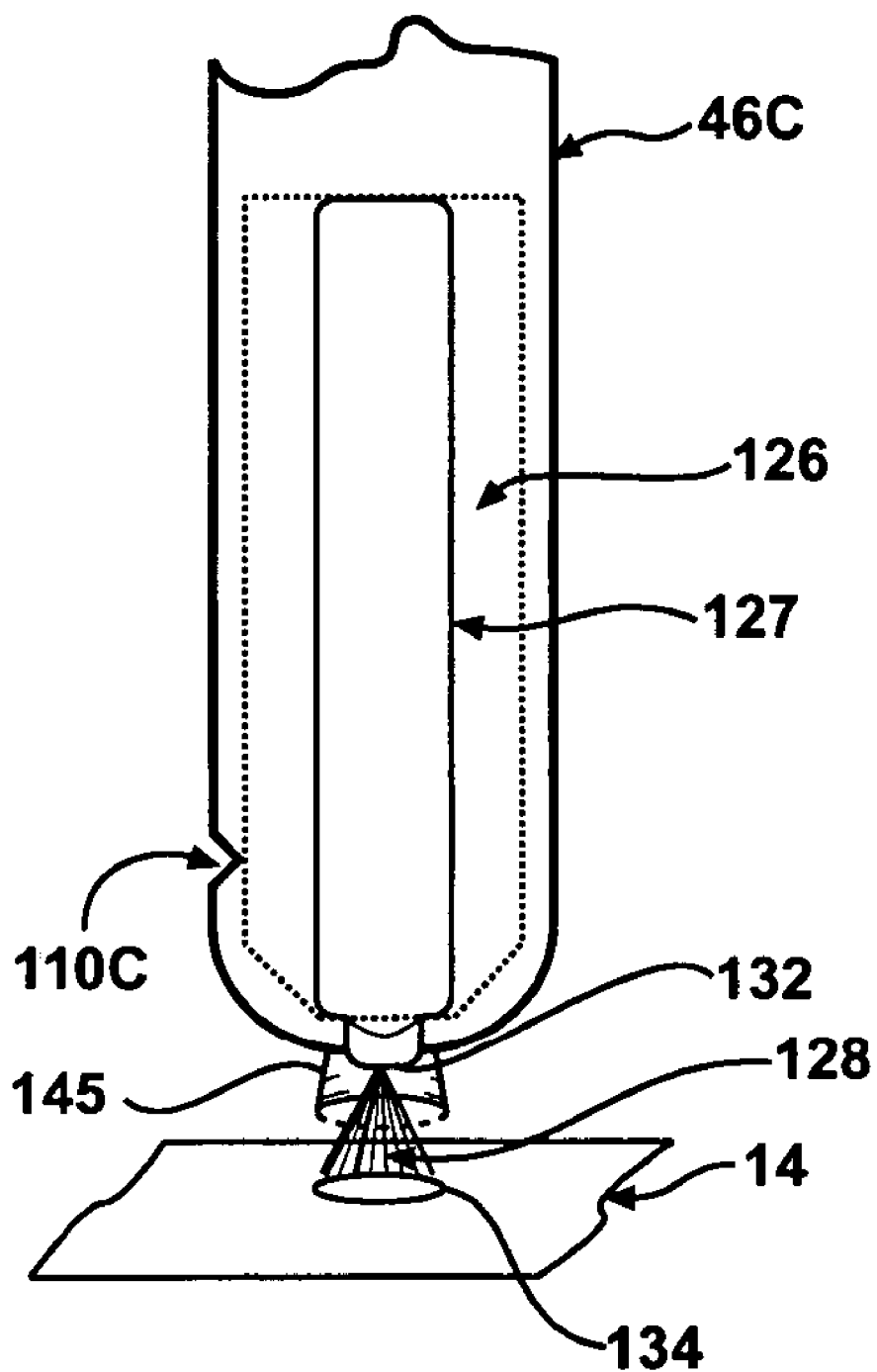

Referring to the drawings, and particularly FIG. 1, the apparatus 10 according to the present invention includes a planar table or other support surface 12 on which may be deposited an item 14, such as the fish fillet represented in phantom lines. The table surface 12 may be defined by a cutting board material suitable for cutting the item 14 once a desired segment is selected as described below.

The item 14 should be substantially flattened on the side resting on the table or other support surface 12 in order for the weight determination to be accurate.

An elongated sensor bar 16 is also included in the apparatus 10 which may be conveniently manually manipulated by a person gripping a handle 18 at the near end thereof.

The sensor bar 16 is supported spaced above the table surface 12 at a predetermined height by a support arrangement comprised of two support posts 20, 22 fixed to and extending down from the underside of the sensor bar 16.

In the embodiment shown, the sensor bar 16 is manually positioned by the user to be upright and extending normally from the front to the rear of the table surface 12, as the sensor bar 16 is freely movable in any way in the plane of the surface 12 and also may be freely lifted from the surface 12 for use elsewhere.

In this embodiment, the support posts 20, 22 should be held as close to plumb as possible and a spirit level 24 on a signal processor-controller case 26 may assist in this. An out of plumb alarm or indicator 302 (FIG. 1A) in the case 26 may be provided responsive to an excessive tilted orientation of the sensor bar 16 as detected by the level 24.

The user initially positions the sensor bar 16 at one end of the item 14 and strokes the same across the width of the table surface 12 thereby passing the sensor bar 16 along the length and over the item 14.

As will be described below in further detail, the sensor bar 16 in this embodiment mounts a linear array of sensors 38 along its length (depicted only diagrammatically in FIG. 1) which each simultaneously or sequentially senses the height of the upper surface of the item 14 above the table surface 12 at a point lying beneath the particular sensor 38 and generates corresponding signals.

At the same time, a displacement detector 20A, 22A is associated with each support post 20, 22, producing signals corresponding to the extent and direction of the displacement of the sensor bar 16 in the plane parallel to the surface 12 when being passed over the item 14.

The height sensor signals correspond to a close approximation of the cross sectional contour of successive sections of the item 14 at each position of the sensor bar 16 in being passed over the item 14. These signals may be processed by a suitable program of a programmable microprocessor controller 300 contained in a signal processor-controller case 26 (which may be powered by a battery 306), with the incremental displacement values as measured by the displacement detectors 22A, 20A, and the contour of each successive section sensed by sensors 38 enabling calculation of an aggregate or running total volume of the segment of the item 14 traversed by the sensor bar 16 along its path of movement. The nature of this calculation is described in further detail below.

The calculated cumulative volume of each segment of the item 14 passed over by the sensor bar 16 is multiplied by a density factor for the particular item type, which can be stored in the memory of the signal processor 300, selectively input using keyboard 27 or uploaded via input/output port 58, to arrive at segment weight values for each position of the sensor bar 16, and a corresponding numeric value continuously or selectively displayed on an adjustable tilt display screen 30 mounted to the case 26. A cost for each segment may also be calculated by multiplying the segment weight value by the input cost per unit weight value and selectively displaying either the weight or cost alternatively or at the same time.

The display 30 and signal processor 300 may be reset for each new operation by a suitable reset button.

A knife blade 15 may be mounted to the sensor bar 16 for cutting a segment from the item 14 as will be described below.

In this application, various sensor bar configurations as well as various devices that may be used with these different configurations are described. To demonstrate the operational theory of these designs, a limited number of possible configurations of sensor bars and devices are detailed as examples; however, various combinations of sensor bars and related devices either here described or known elsewhere in the art may be utilized together to meet the requirements of specific applications.

FIG. 2A shows an alternate support arrangement for supporting a sensor bar 16A spaced above a table 32 defining a support surface 34 on which an item 14 is placed, as in the above described embodiment.

The sensor bar 16A is connected at either end to a pair of uprights 36A, 36B to form a bridge structure spanning the front to rear dimension of the table 32.

The uprights 36 may be supported on suitable guide bearings engaging ways located beneath the table 32 (in a manner not shown but well known in coordinate measuring machines) to allow low friction guided and constrained movement maintaining the orientation of the sensor bar 16A both as to plumb and squareness to the table surface 34 for accurately oriented manual or powered stroking movement of the sensor bar 16A across the width of the table 32.

That is, the way bearings support and accurately guide the uprights 36A, 36B to insure squareness of the sensor bar 16A to the table edge as well as to maintain the same in a vertical orientation above the surface 34.

A linear array of sensors 38 is mounted along the underside of the sensor bar 16A on a forward projecting ledge 17, which generate electronic signals corresponding to the cross sectional contour of the item 14 lying beneath the sensor bar 16A. This done by measuring the height above the surface 34 of points on the upper surface of the section of the item 14 lying below the respective sensor 38. Such sensors 38 may take various forms such as the mechanical, acoustic, or optical devices as described hereinafter.

A displacement detector 40 is associated with one of the uprights 36B. A well known form of displacement detector comprises a Moiré fringe device described in U.S. Pat. No. 2,886,717, comprised of an elongated grid 42 fixed along one edge of the table and a slightly tilted optical grating 44 mounted to the upright 36B above the grid 42. When the grid 42 is illuminated, relative movement in either direction produces a shifting shadow pattern in either direction, a corresponding number of shadows produced for each incremental displacement of the uprights 36B (and 36A), which can be counted up or down by a light sensor (not shown) to produce a corresponding digital signal in the manner well known in the art. Many other linear displacement detectors are known in the art which could be employed to detect displacement of the sensor bar 16A instead of the Moiré fringe device described.

An input keyboard 27 and display 35 allows density settings, etc., to be entered into the signal processor 300 contained within the signal processor controller case 26.

In this embodiment, the sensor bar 16A is constrained by the manner of its support, i.e., is held in the vertical orientation and maintained square to the table surface 34 as it is stroked laterally across the width of the table 32. The user need only push or pull the sensor bar 16A along in its constrained path.

This simplifies the calculation of segment volumes as skewing or shifting of the sensor bar 16 can occur when it is unconstrained, and each successive section of the item 14 might be of a tapered shape requiring more complex calculations.

A separate knife (not shown) may be used to cut the selected item segment using the side surface 17 of uprights 36A and 36B as a guide. The sensor bar 16A can also be moved out of the way when carrying out the cutting step.

FIG. 2B illustrates an alternative embodiment which has a capability of cutting a selected segment from the item 14. A tubular guide rail 206 constrains the bi-directional movement of bracket 208 that is attached to the cutting blade position handle 201. Cutting blade armature 203 protrudes through slot 200 and is affixed at its upper end to cutting blade position handle 201. The base end of cutting blade armature 203 is affixed to the manual or electrically powered rotary cutting blade 204. While securely holding the item 14 down against the table surface 34 with one hand, the operator's other hand grips the upward protruding handle 210 and moves the cutting blade position handle 201 in a forwards (and/or backwards) motion producing cuts 214 which segment the item 14 into the desired portion. Pushbutton 202 controls the application of power to the motorized rotary cutting blade 204 implementation.

In a non-motorized rotary blade implementation of FIG. 2B, a spring assembly (not shown) is positioned between the cutting blade position handle 201 and the slot 200. This assembly normally pulls the cutting blade armature 203 upwards and enables the cutting blade 204 to successively cut deeper and deeper into the item 14 as the operator applies greater pressure on the cutting blade position handle 201 during the forward and backwards motion of the cutting position handle 201. This enables the operator to easily control the depth of each successive cut as the blade 204 approaches the table surface 34. The aforementioned spring assembly is not required for the electrically motorized rotary cutting blade 204 implementation of FIG. 2B, as the item 14 is severed with one complete movement of cutting blade position handle 201.

Figure 2C:
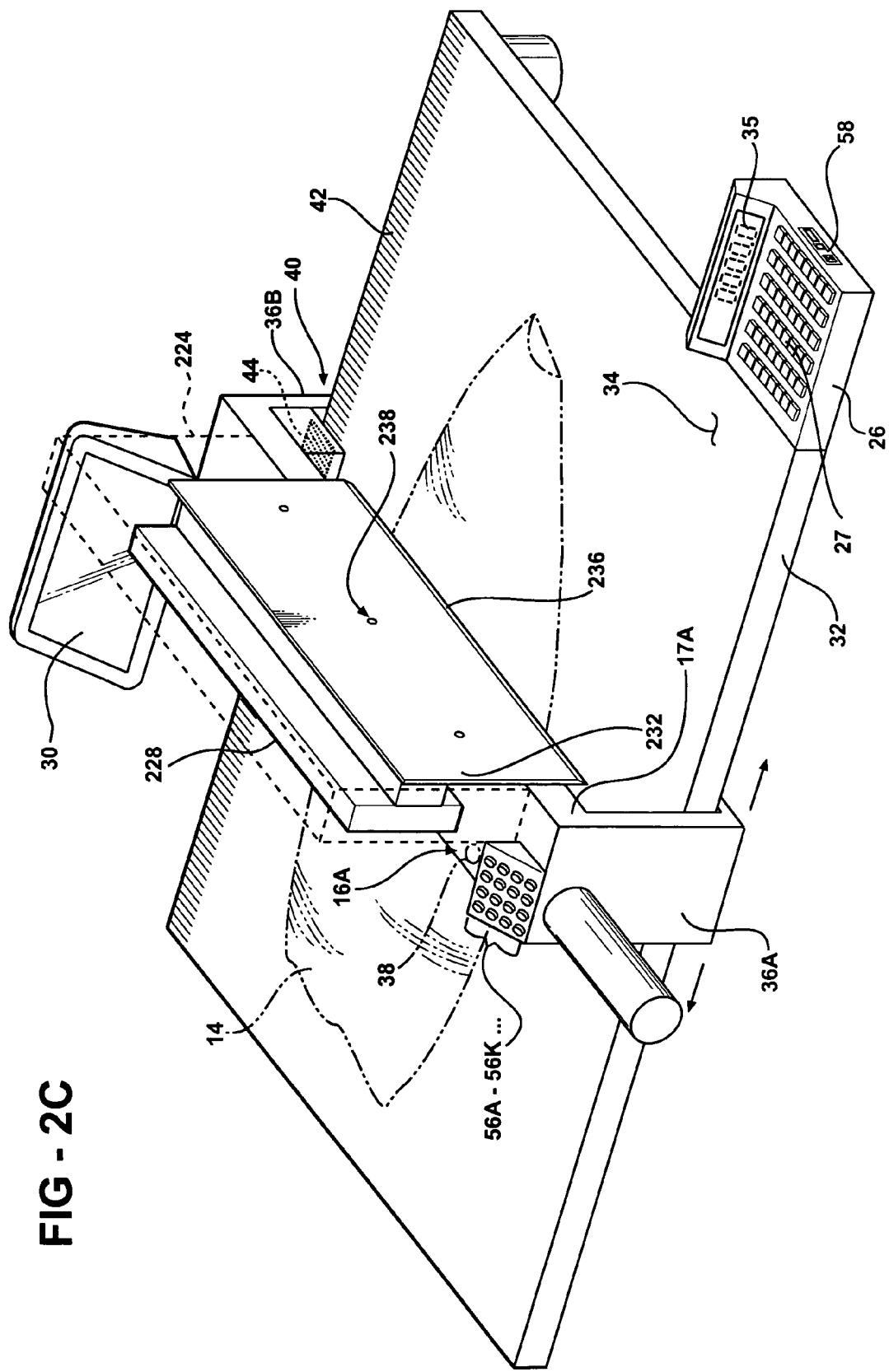
FIG. 2C is a pictorial view of another embodiment of an apparatus according to the present invention, with an item to be segmented shown in phantom lines on a support surface.

FIG. 2C illustrates an additional alterative mechanism used to cut the selected item segment. A guillotine chopping mechanism includes a housing 224 which encloses a cutting blade extender/retractor mechanism 228 that is fastened to chopping blade 232 by flush mounting screws 238. While securely holding the item 14 down against the table surface 34 with one hand, the operator's other hand depresses one of the appropriately designated "cut" pushbuttons 56A–56K to control the application of electrical power to the cutting blade extender/retractor mechanism 228 whereby the cutting edge 236 of cutting blade 232 is forced in a downward direction causing the item 14 to be segmented into the desired portion.

Figure 2D:
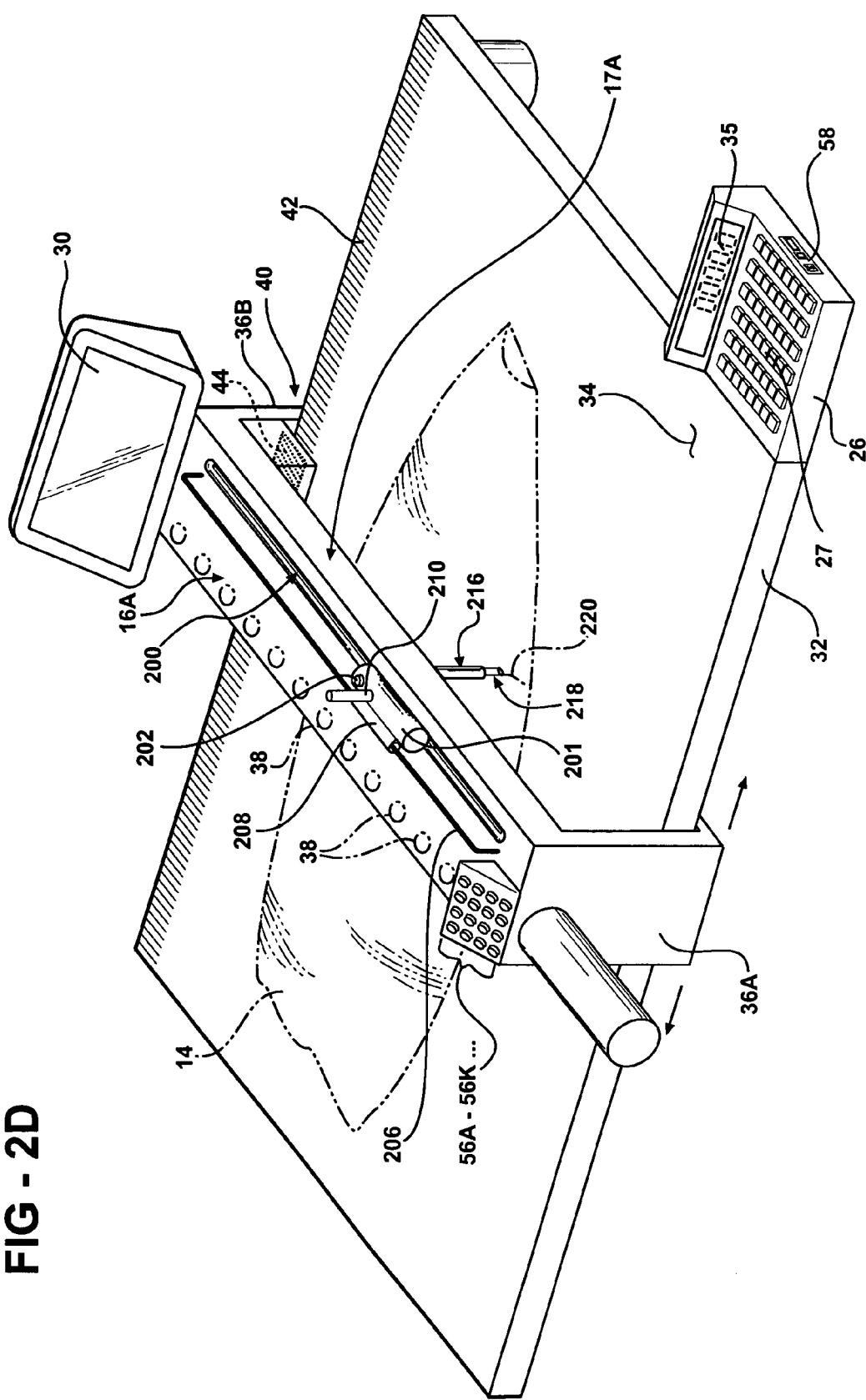
FIG. 2D is a pictorial view of another embodiment of an apparatus according to the present invention, with an item to be segmented shown in phantom lines on a support surface.

FIG. 2D illustrates another embodiment of the invention incorporating an alternative mechanism to cut the selected item segment. A tubular guide rail 206 constrains the bi-directional movement of bracket 208 that is attached to the cutting position handle 201. Laser mechanism 216 protrudes through slot 200 and is affixed at the upper end to cutting position handle 201. The operator grips the upward protruding handle 210 while moving the cutting position handle 201 in a forwards (and/or backwards) motion producing laser cuts 220 from laser light 218 which segment the item 14 into the desired portion. Pushbutton 202 controls the application of electrical power to the laser mechanism 216.

Figure 5:
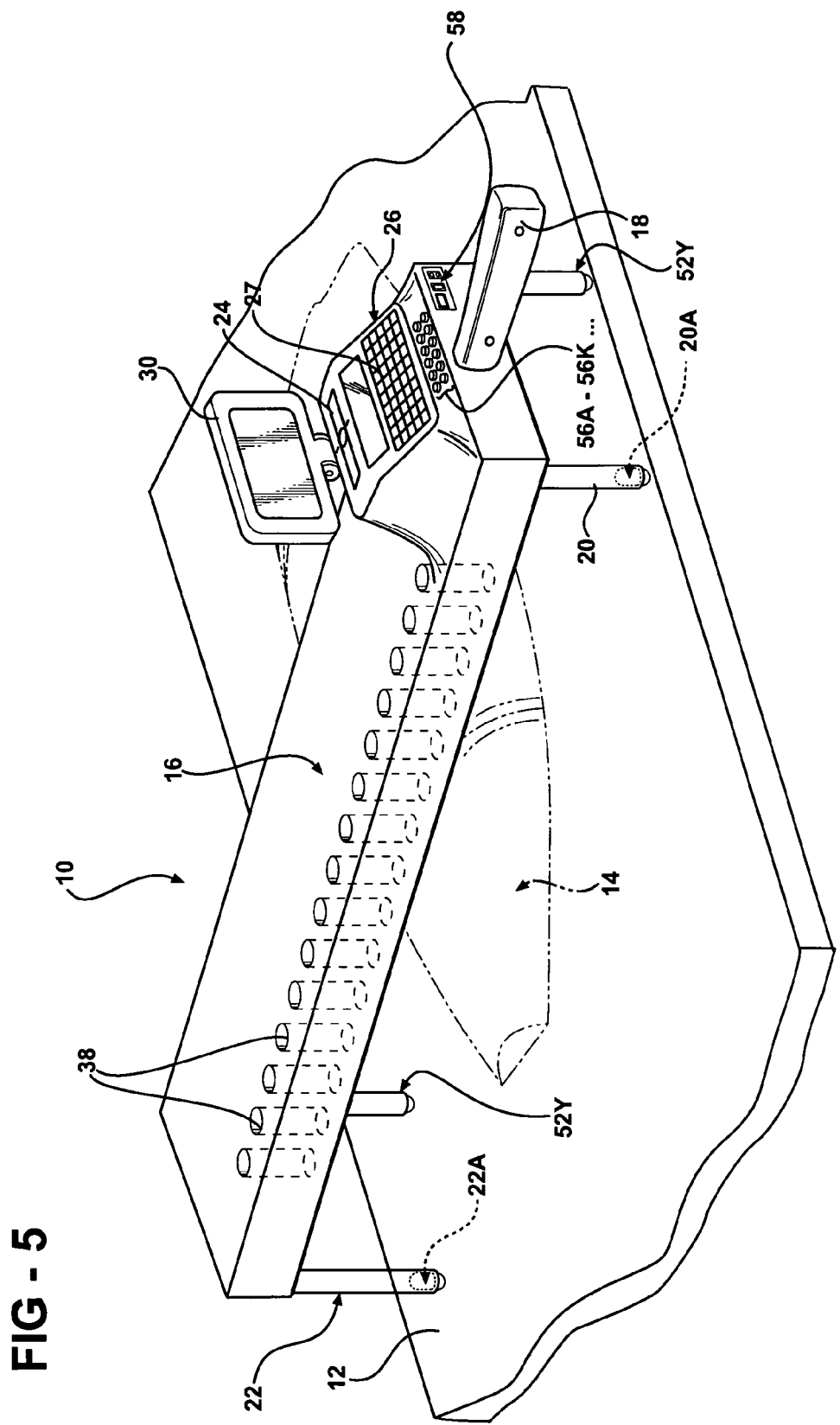
FIG. 5 is a pictorial view of another embodiment of an apparatus according to the present invention with an item to be segmented shown in phantom lines in position on a supporting table shown in fragmentary form.
Figure 5B:
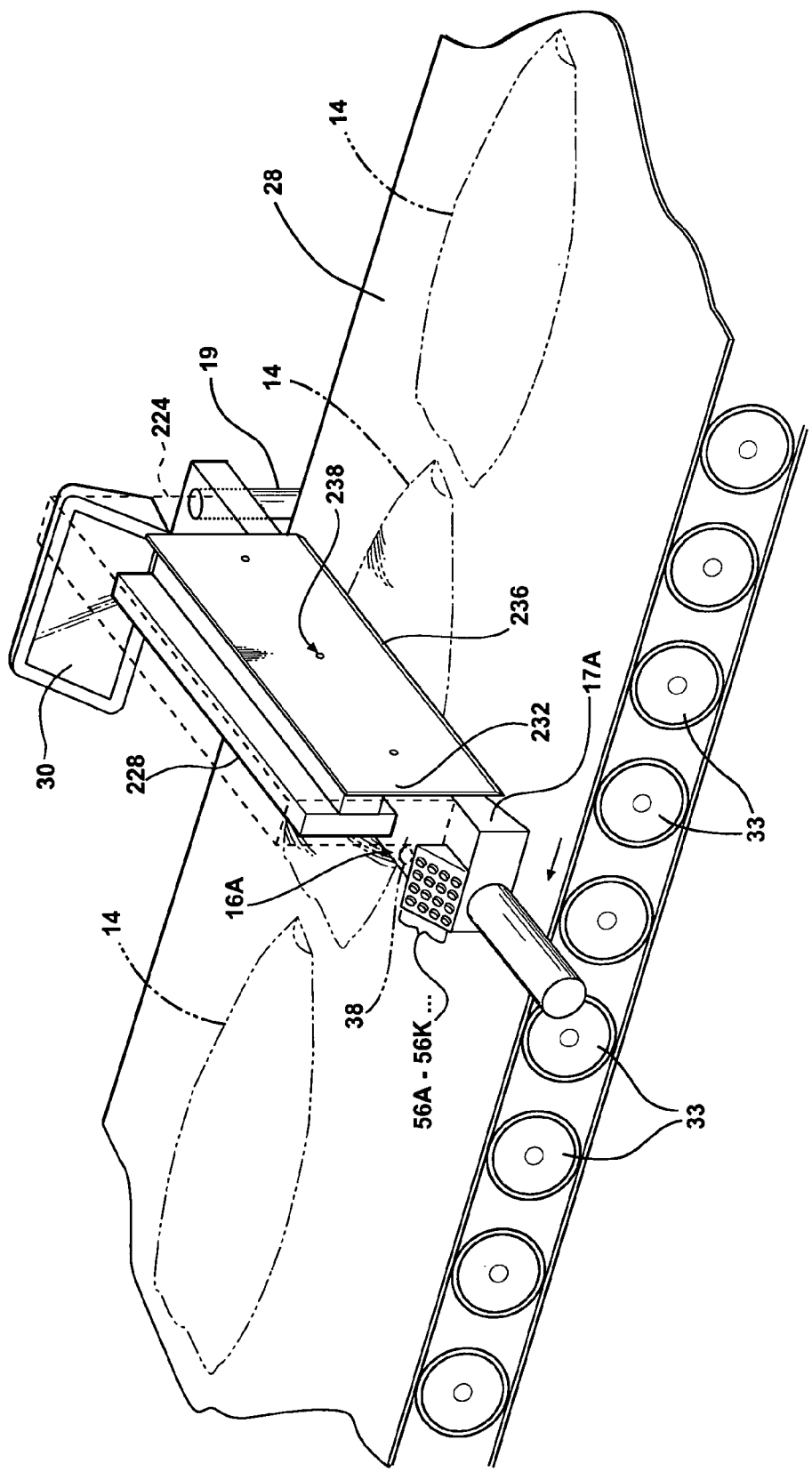
FIG. 5B is a pictorial view of another embodiment of apparatus according to the invention utilizing a conveyor as an item support surface.

The described sensing and cutting mechanisms illustrated in FIGS. 2A, 2B, 2C, 2D, 2E can be incorporated into an industrial automated environment whereby the table surface 34 is replaced with a conveyer belt 28 supported by rollers 33 as shown in FIG. 5B. Items 14 placed on the conveyer belt 28 are passed under the sensors 38 on sensor bar 16A and cutting 232 as shown in FIG. 2C. Computer controlled mechanisms would replace the manual operator controlled functions.

Figure 2E:
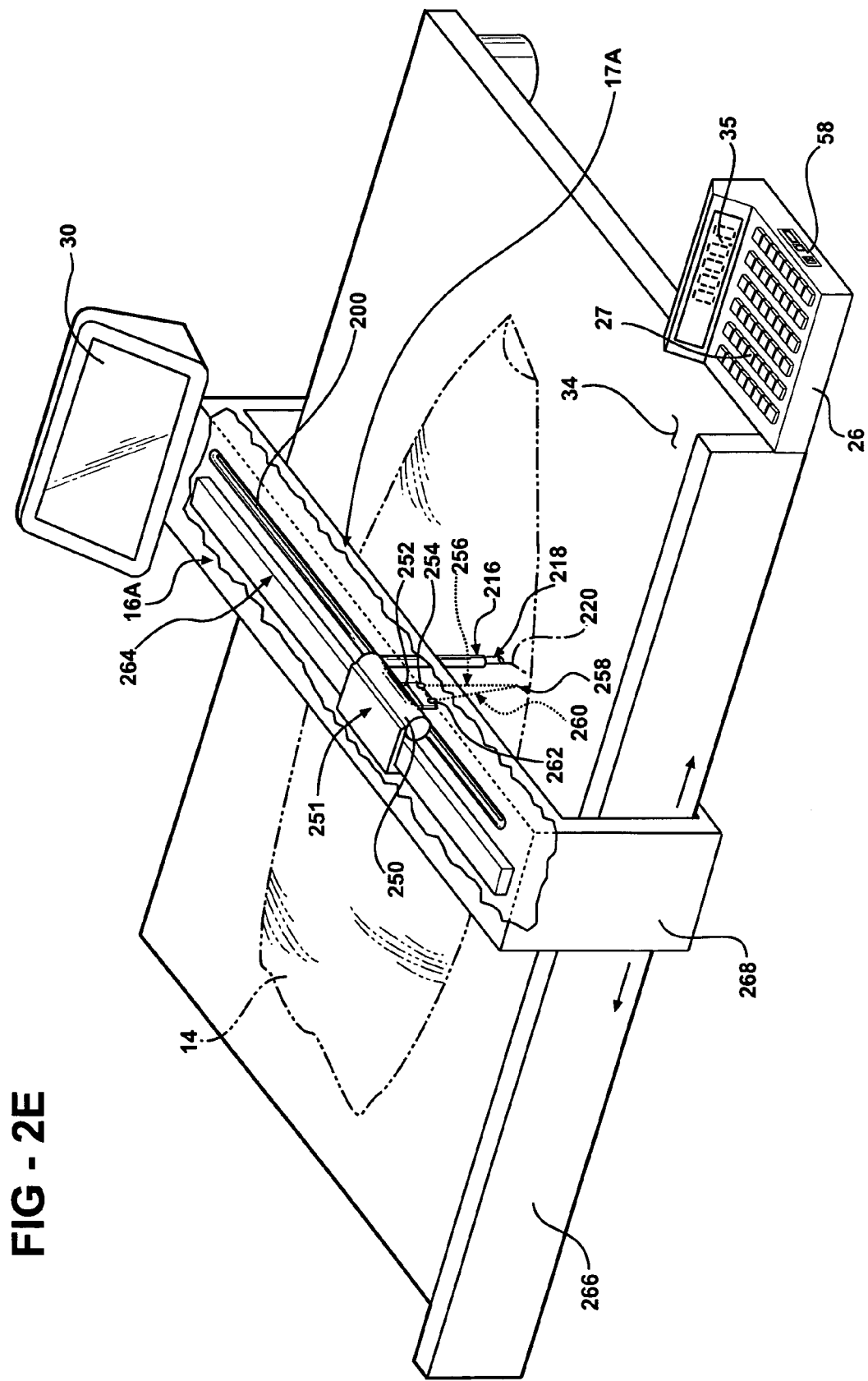
FIG. 2E is a pictorial view of another embodiment of an apparatus according to the present invention, with an item to be segmented shown in phantom lines on a support surface.

FIG. 2E illustrates another embodiment of the apparatus incorporating a mechanism used to both measure the volume (and hence the weight based on density, and the cost based on weight) and cut the item 14 into the desired segment size. The illustrated embodiment utilizes a stepper motor assembly 266 which controls the lateral movement of bracket 268 as it traverses laterally across the table surface 34. An additional stepper motor assembly 264 controls the vertical movement of the sensor/cutter assembly 250 which is attached to stepper motor assembly 264 mounted on a bracket 251. Each stepper motor assembly 264, 266 controls the precise linear positional movement of sensor/cutter assembly 250 along the lateral and vertical axis of table surface 34 as it traverses the item 14 surface. The combined operation of the dual stepper motor assemblies 264, 266 in controlling the precise position of the sensor/cutter assembly 250 corresponds to the assemblies used to control the position and movement of ink pens used in digital computer plotters. Such plotters have been employed in business and industry for many years.

The sensor/cutter assembly 250 consists of a "spot triangulation" height sensor 38 hereinafter referred to as height sensor 252 which protrudes through slot 200 and is affixed to the bottom end of sensor/cutter mechanism 250. Height sensor 252 is comprised of an optical emitter unit 254 and optical receiver unit 262. The emitter unit 254 projects perpendicularly downward along the path 256 a light "spot" 258 onto the upper surface of the item 14. The receiver unit 262 images this spot along the path 260 onto an internal CCD (Charge Coupled Device) array or other PSD (Position Sensitive Detector) such as a photodiode array. The distance between sensor 252 (emitter 254) to the perpendicularly projected spot 258 on the upper surface of item 14 directly beneath emitter 254 is calculated by a signal processor integrated into height sensor 252 or by the signal processor 300 in display case 26. A full description of the operation and associated height calculations regarding use of this "spot triangulation" height sensor 252 is described below in the section entitled "Spot Triangulation Based Optical Height Sensor".

When the bracket 268 is in a stationary position, the stepper motor assembly 264 moves the sensor/cutter assembly 250 from the base side (nearest the operator) of bracket 268 to the top side (farthest from the operator) of bracket 268. During this movement, the height sensor 252 is continuously determining the height above the support surface 34 of the underlying item 14 segment directly beneath the sensor 252. As will be described later in complete detail, these height values enable the calculation of the approximate cross sectional area of the item 14 segment traversed by height sensor 252. When the sensor/cutter 250 completes its travel at the end of bracket 268, stepper motor assembly 266 incrementally moves laterally to the succeeding position whereby the sensor/cutter assembly 250 then moves in the opposite direction of its current position by action of stepper motor assembly 264. The multiplicative product of the incremental distance just traveled by bracket 268 by the just computed cross sectional area of the item 14 results in the volume of the item 14 just traversed by the height sensor 252. As the stepper motor assembly 266 continues to move bracket 268 in a lateral direction across the table surface 34, then stops and waits until sensor/cutter assembly 250 completes its pass from one end of bracket 268 to the other end of bracket 268, the aggregate total volume of item 14 traversed by sensor/cutter assembly 250 is continuously calculated by the signal processor 300 in display case 26 and presented on display 30.

Laser cutting mechanism 216 protrudes through slot 200 and is affixed to the bottom end sensor/cutter mechanism 250. Upon reaching the desired item 14 segment weight (or cost based on weight), the stepper motor assembly 264 positions sensor/cutter mechanism 250 at either end of bracket 268, whereby stepper motor assembly 264 then moves sensor/cutter assembly 250 from its current position to the opposite oriented position along bracket 268. During this movement, laser cutting mechanism 216 emits light 218 resulting in a continuous cut 220 through item 14, thus severing item 14 as the sensor/cutter mechanism 250 progresses across the item 14.

Many other types of cutting mechanisms such as (but not limited to) rotating blades 204 as exhibited in FIG. 2B, or high pressure water cutters may be employed in place of the aforementioned laser cutting device.

This embodiment of sensor arm 16A whereby a movable height sensor device is mechanically moved over an item 14 has many advantages over other non-mechanically driven sensor arm designs presented in this application. By employing only one movable height sensor versus multiple height sensors spaced along the sensor bar 16A length, the number of measured height values along the length of the sensor arm 16A is only limited by the incremental positioning accuracy of the stepper motor assembly 264. This avoids the limit imposed by the number of height sensors that can be physically placed (or fit) along the sensor bar 16A length, whether such height sensors are all placed in a linear order, or multiple rows of height sensors are placed adjacent to each other. Also, by employing only one height sensor, possible interference between multiple height sensors signals is eliminated. Similarly, the overall cost of height sensor mechanisms employed is reduced to the one height sensor versus multiple units.

The height sensors 38 themselves may be based on many different technologies such as (but not limited to) optical, mechanical, and acoustical. Some of the various types of height sensors are outlined in the section below titled Additional Height Sensor Technologies. Following is a description of a sensor bar utilizing "spot" triangulation based optical height sensors, succeeded by a description of a sensor bar utilizing "plunger" based mechanical height sensors:

"Spot" Triangulation Based Optical Height Sensor

Figure 3A:
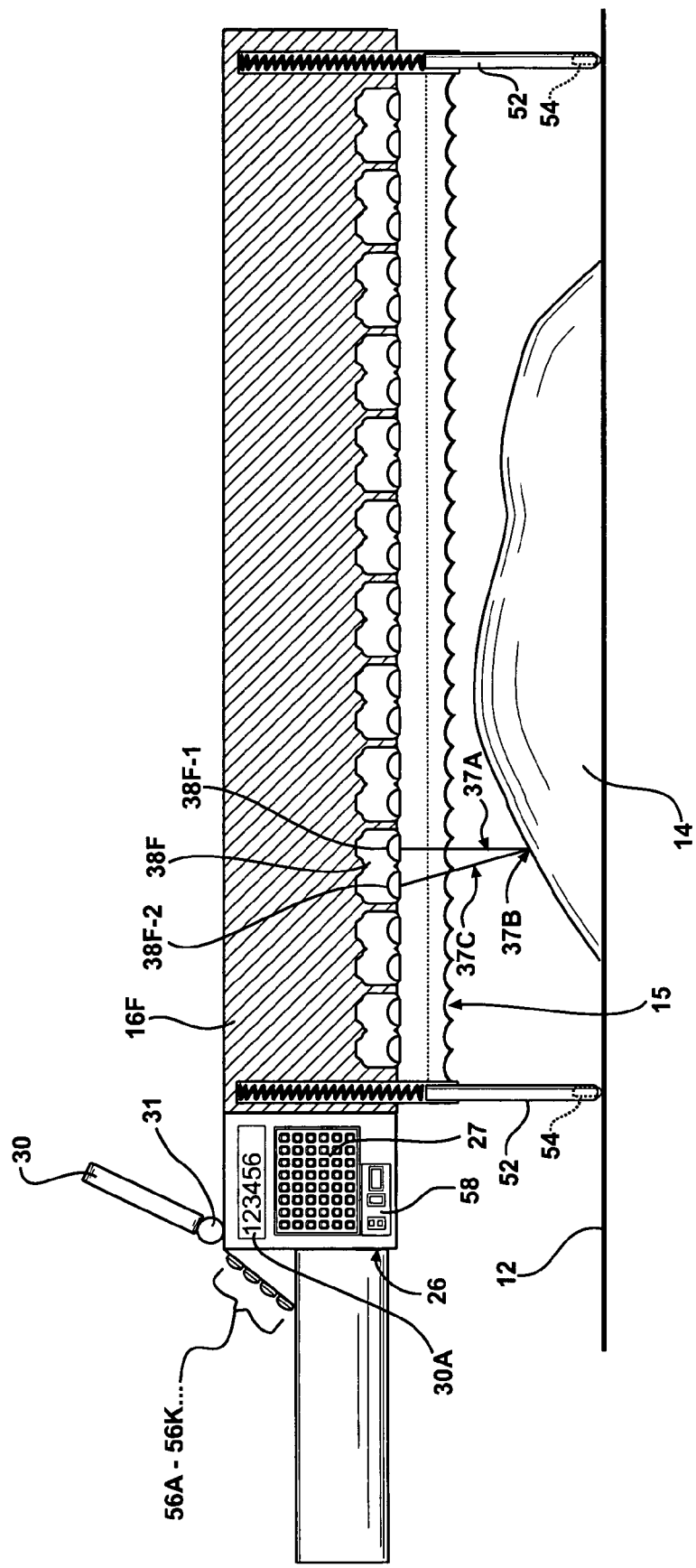
FIG. 3A is a partially sectional view taken through one form of a sensor bar included in the apparatus according to the invention together with an item to be segmented on a support surface.
Figure 3B:
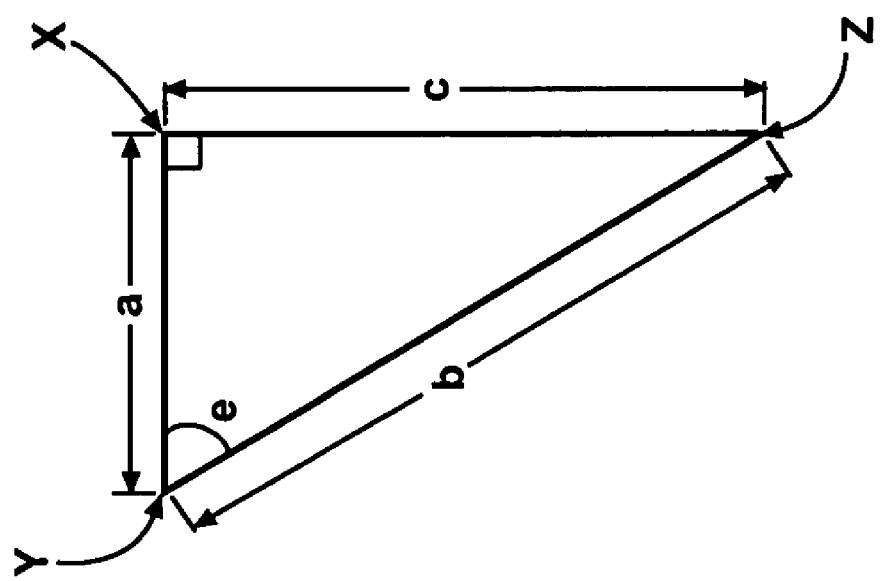
FIG. 3B is a diagram of the spatial relationship of the elements of the sensor and emitter incorporated in the sensor bar shown in FIG. 3A.

Referring to FIGS. 3A, 3B, and 3C, a "spot" triangulation based optical height sensor 38F is shown incorporated in the sensor bar 16F as a linear array arranged along the length of the sensor bar 16F. Each height sensor 38F is comprised of an optical emitter and receiver unit embedded in the sensor bar 16F. Various optical emitter technologies may be employed such as (but not limited to) LED devices and lasers. The emitter unit 38F-1 projects perpendicularly downward along the path 37A a light "spot" 37B onto the upper surface of the item 14. The lens of the offset receiver unit 38F-2 images this spot along the path 37C onto an internal CCD (Charge Coupled Device) array or other PSD (Position Sensitive Detector) such as a photodiode array which then determines the imaged angle (e) of the spot 37B (Z) relative to the horizontal line formed by the positions of the emitter 38F-1 (X) and receiver 38F-2 (Y). The distance from the sensor 38F (emitter 38F-1) to the perpendicularly projected spot 37B on the upper surface of item 14 directly beneath sensor 38F is calculated by a processor integrated into height sensor 38F or by the signal processor in display case 26.

The use of the term "optical" and "light" in this application does not imply only the use of the visible wave portion of the electromagnetic spectrum, but includes all portions (e.g., infrared) of the spectrum that exhibit necessary characteristics of the described technology.

The trigonometric method employed to determine the distance from emitter 38F-1 to the light spot 37B projected onto the upper surface of item 14 is based on the distance measuring principle of triangulation. Again referring to FIG. 3B, the emitter 38F-1 (X) perpendicularly projects a light spot 37B (Z) onto item 14 upper surface. The receiver 38F-2 (Y) images this spot onto a Position Sensitive Detector, e.g. a CCD array, which determines the imaged angle (e) of the spot relative to the horizontal line formed by the positions of the emitter X and receiver Y.

A right triangle is formed at the vertex X of the three triangular coordinates YXZ, therefore, the following trigonometric relationship applies:

$$\mathrm{Tan}(e)=c/a \qquad (I)$$

Thus, the distance (c), from the emitter 38F-1 (X) to the projected spot 37B (Z) is expressed as:

$$c=(a)\mathrm{Tan}(e) \qquad (II)$$

The distance, (a), between the emitter (X) and receiver (Y), is a known constant for the specific sensor 38F employed. The angle (e) is determined by the Position Sensitive Detector (e.g., CCD array), thus enabling the calculation of Tan(e). Therefore, the product of (a) and Tan(e) yields the distance, (c), between the emitter 38F-1 (X) and the projected spot 37B (Z). Subtracting the above optically determined distance (c) from the known (constant) sensor bar height (sensor 38F to table surface 12 distance), yields the height of the item 14 upper surface relative to the table surface 12 directly below sensor 38F.

If all sensor 38F emitters simultaneously project an optical spot on the upper surface of the item 14, sensor 38F receivers may detect spots that did not originate from the same sensor 38F emitter. This likelihood increases if larger emitted optical beam widths are employed and/or sensor arrays along the length of the sensor bar 16F are comprised of a high density of sensor 38F units. Such interference could result in erroneous item 14 height calculations and can be avoided by multiplexing the operation of the linear array of sensor 38F units along the length of the sensor bar 16F.

Instead of all sensor 38F units projecting optical spots simultaneously, each sensor 38F is both activated and deactivated sequentially along the length of the sensor bar 16F. A successive sensor 38F emitter is not activated until the currently activated sensor 38F calculates the distance parameters for the currently projected spot on the upper surface of the item 14 and is then de-activated. Instead of monitoring the completion of processing for each individual sensor 38F, each successive sensor 38F along the sensor bar 16F may be activated and deactivated at a fixed length time interval that is the maximum time required for a sensor 38F to both project a spot and process the distance parameters for that spot. This maximum time is determined by use of the sensor 38F operating specifications whereby the longest (e.g., "worst case") amount of time required to process one height value is utilized. Implementing a multiplexing fixed length time interval longer than this maximum time period ensures that only one sensor 38F is operating at a time and thus eliminates spot recognition errors from multiple sensor 38F units.

A sensor 38F may not locate and process an emitted spot image within the allocated multiplexed time interval for reasons such as unfavorable item 14 surface image formation characteristics, or a debris obstructed sensor 38F emitter and/or receiver. In such cases, the item 14 height at this sensor 38F position can be obtained by extrapolating height values determined for surrounding sensor 38F positions.

Referring the FIG. 3C, increasing the density (the number of sensor 38F units per sensor bar 16F) may be accomplished by incorporating additional sensor 38F units in a row alongside the already described linear array of sensor 38F (R1) units spanning the sensor bar 16F. As illustrated, linear array(s) of sensors 38F (R2) may also be placed adjacent to each other either in a staggered or collinear (not shown) configuration to form a two-dimensional array of sensor 38F units. Calculations requiring the position of each sensor 38F units incorporate offset distance factors to account for these offset sensor positions. The increased sensor density enables the collection of more coordinate data points per given surface area of item 14, and hence increases the overall accuracy of the volume and resultant weight and cost (based on weight) calculations.

Many "spot" triangulation based optical distance sensors are currently available and are used in diverse applications such as measuring tolerances, determination of positions, gauging existence and extent of material deformation, and quantifying mechanical vibration characteristics.

"Plunger" Based Mechanical Height Sensor

Figure 4:
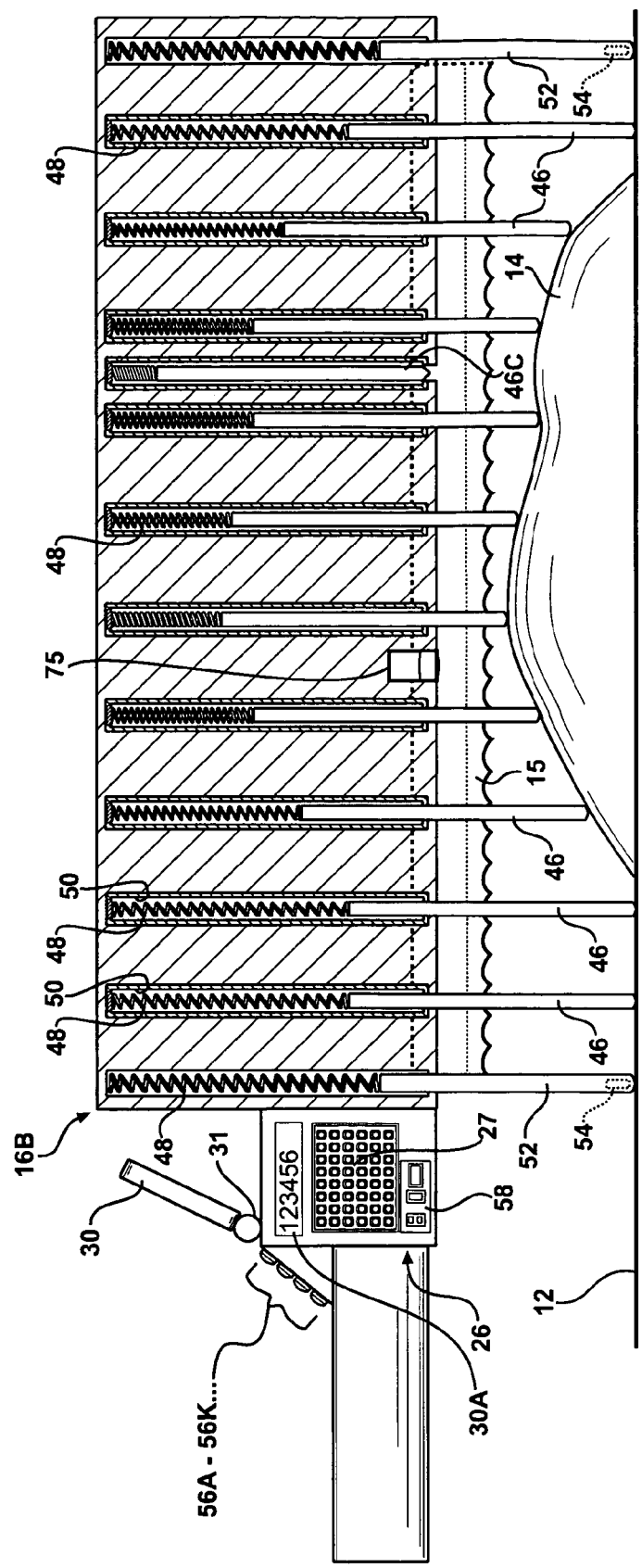
FIG. 4 is a partially sectional view taken through a second form of the sensor bar included in apparatus according to the present invention together with an item on a supporting surface.

FIG. 4 shows the sensor bar 16B with a mechanical height sensor arrangement comprised of a linear array of spring urged extendible plungers 46 distributed along the length of the sensor bar 16B. The plungers 46 are each normally biased to a fully extended position by an associated compression spring 48 disposed in a pocket 50 formed in the sensor bar 16B able to receive the length associated with plunger 46 when retracted thereinto. The tip of each plunger 46 is capable of reaching the table surface 12. The presence of any part of the item 14 beneath a particular plunger 46 causes that plunger 46 to be retracted a distance corresponding to the height of the surface of this item 14 above the table surface 12, which in turn corresponds to the thickness of the item 14.

The extent of retracting travel of each plunger 46 is sensed by a linear displacement sensor arrangement disclosed hereinafter, which generates corresponding electrical signals.

Many different types of displacement sensing technologies may be employed such as (but not limited to) optical, optical-mechanical, mechanical, and electromagnetic. The linear displacement sensor arrangement illustrated below is based on a photoelectric "reflection" sensor array.

Linear Displacement Sensor Based on Photoelectric Reflection Sensor Array

Figure 6A:
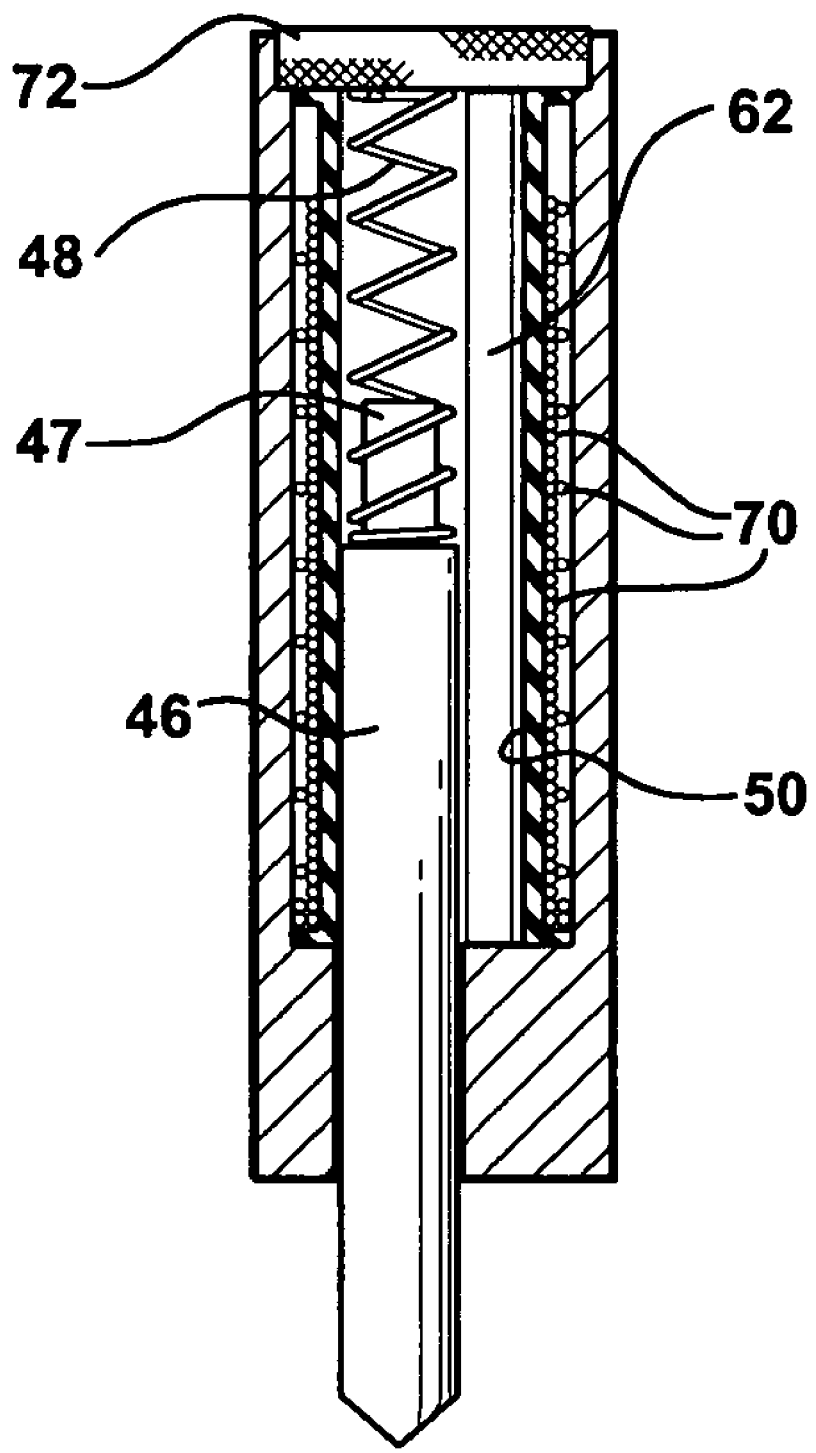
FIG. 6A is a partially sectional view taken through a plunger height sensor used in one form of a sensor bar included in an apparatus according to the invention, with the plunger shown in an extended position.
Figure 6B:
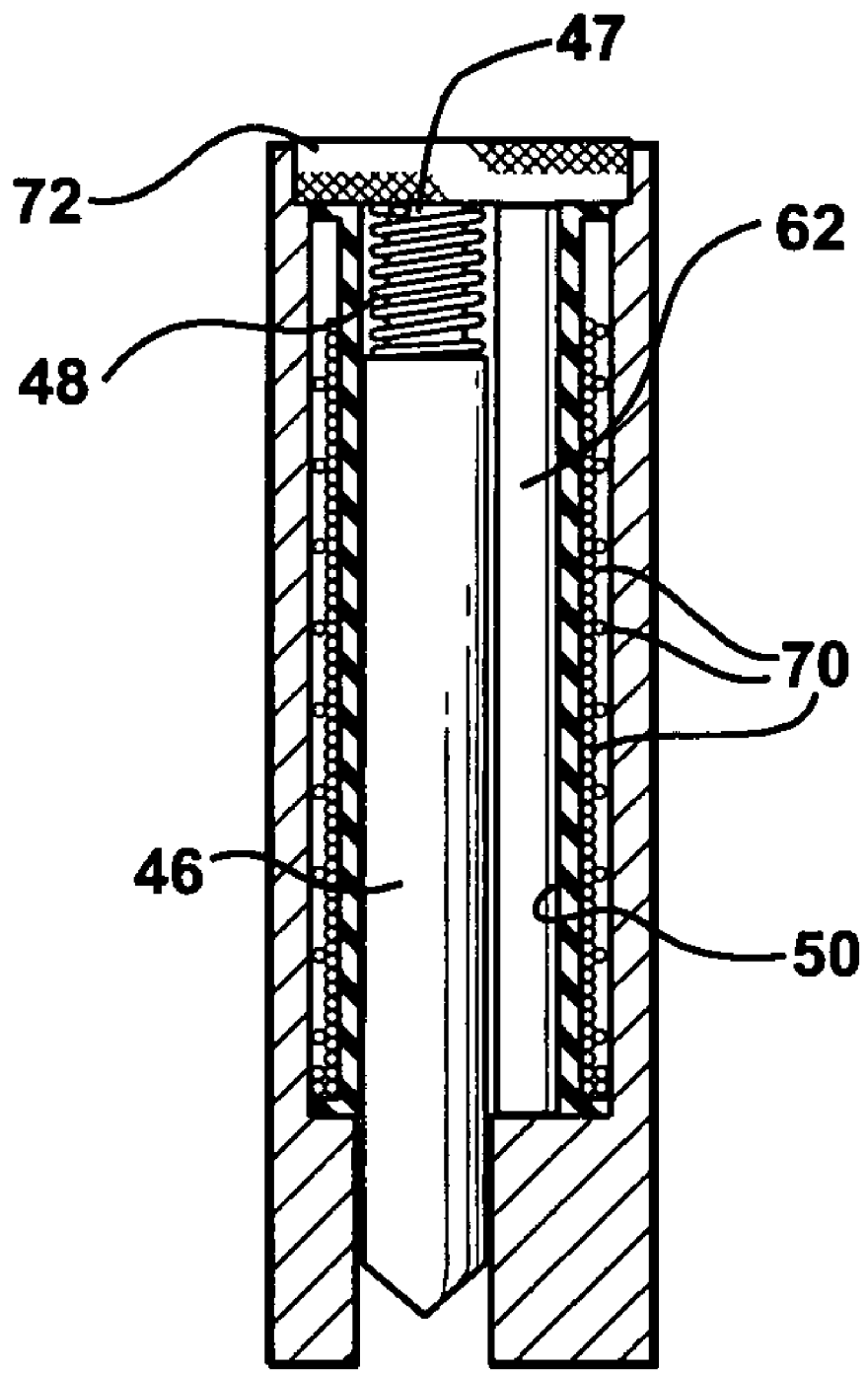
FIG. 6B is a partially sectional view taken through a plunger height sensor used in one form of a sensor bar included in a device according to the invention, with the plunger shown in the retracted position.
Figure 7:
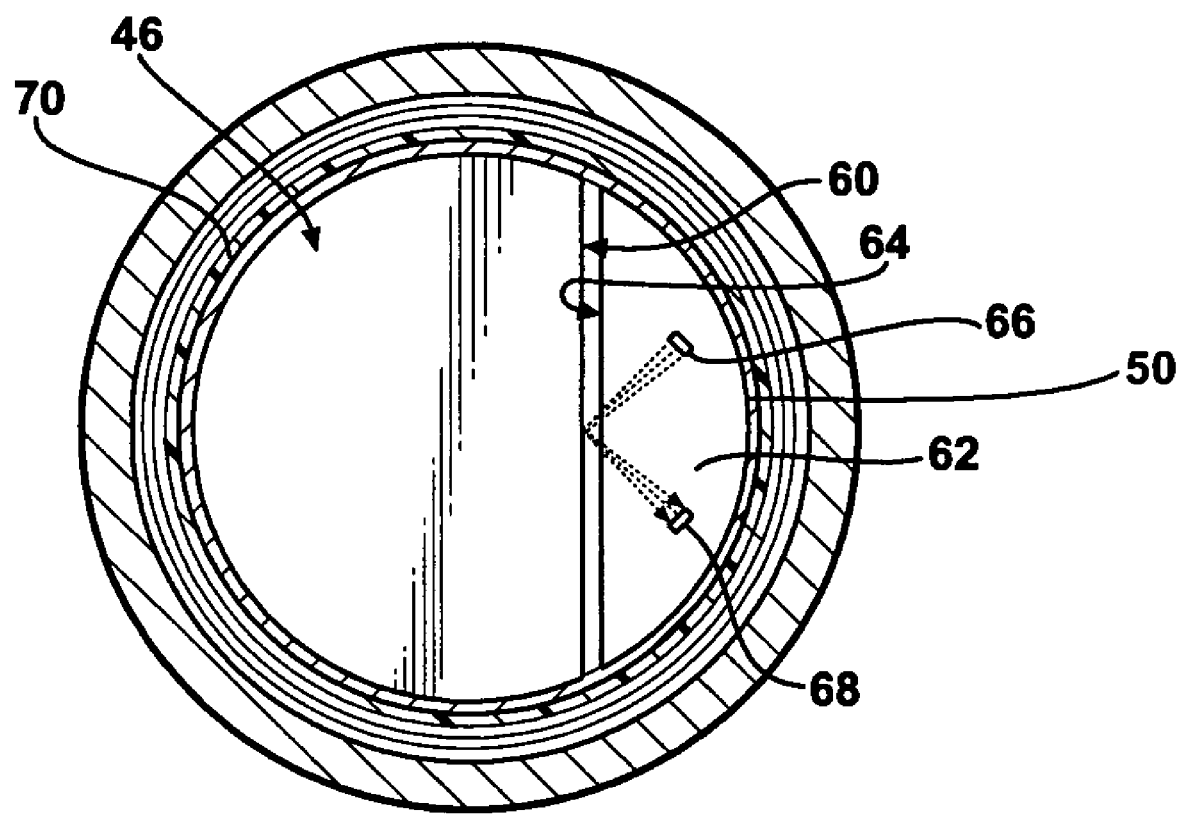
FIG. 7 is an enlarged transverse sectional view taken through the plunger height sensor shown in FIGS. 6A and 6B with a diagrammatic indication of one form of a plunger extension detector associated with the plunger.

FIGS. 6A, 6B, and 7 show details of the arrangement sensing the retraction travel of the plungers 46. Each plunger 46 has a flattened side 60 facing a sensor rod 62 also having a flattened side 64 facing plunger side 60. The flat side 60 of the plunger 46 has a reflective surface imprinted with non-reflective tracking patterns. A linear array of equidistantly spaced angled light emitters (e.g., LED devices) 66 is embedded along the length of the sensor rod 62 directed at the flattened side 60 of the plunger 46, and a similar linear array of equidistantly spaced angled photoelectric receivers 68 is embedded along the length of the sensor rod 62 positioned to receive light from a respective emitter reflected from the side 60.

As the plunger 46 moves up and down through the cavity formed by the solenoid coil windings 70 and sensor rod 62, the photoelectric emitter 66/receiver 68 sensor array determines the displacement distance of the plunger 46 by tracking the changing patterns of received reflected light. To eliminate false readings caused by reflections from the solenoid spring 48 when it occupies the plunger 46 position, the spring 48 has a matte, non-reflective surface (finish).

Increasing the density, the number of height sensor plungers 46 per sensor bar 16B, may be accomplished by incorporating additional plunger 46 units along the existing linear array of plunger 46 units which span the sensor bar 16B. One or more rows of plungers 46 may also be placed adjacent to each other either with the individual sensors staggered or side by side to form a two-dimensional array of height sensor plunger 46 units. Calculations requiring the position of each plunger 46 incorporate offset distance factors to account for these (adjacent) offset sensor positions. The increased sensor density enables the collection of more coordinate data points per given surface area of item 14, and hence increases the overall accuracy of the volume and resultant weight and cost (based on weight) calculations.

Referring to FIGS. 3A and 4, sensor bar support posts 52 are provided at each end of the sensor bar 16F (and 16B) which may also be retractable for a purpose to be described below. A displacement detector arrangement for generating signals corresponding to the extent and direction of displacement of the sensor bar 16F (or 16B) in a plane parallel to the support surface 12 during stroking thereof. This arrangement includes displacement detectors 54 at the bottom of each support post 52, examples of suitable detectors 54 described in detail below. Each detector 54 generates electronic signals corresponding to the position and extent of horizontal travel of the end of each post 52 when the sensor bar 16F (or 16B) is stroked across the table surface 12 from a start position beyond one end of the item 14. As the sensor bar 16F (or 16B) is stroked across the table surface 12, the bottom end of each support post 52 is kept in constant contact with the table surface 12.

Sensor bar support post 52 displacement detectors 54 may be based on many different technologies such as (but not limited to) optical, optical-mechanical, electromagnetic, mechanical, and pressure-sensitive (tactile). Some of the various types of post displacement detectors are outlined in the section titled Additional Support Post Displacement Detector Technologies. Following is a description of an optical based support post displacement detector and an optical-mechanical based support post displacement detector.

Theory and Operation of the Optical Support Post Displacement Detector

Figure 8A:
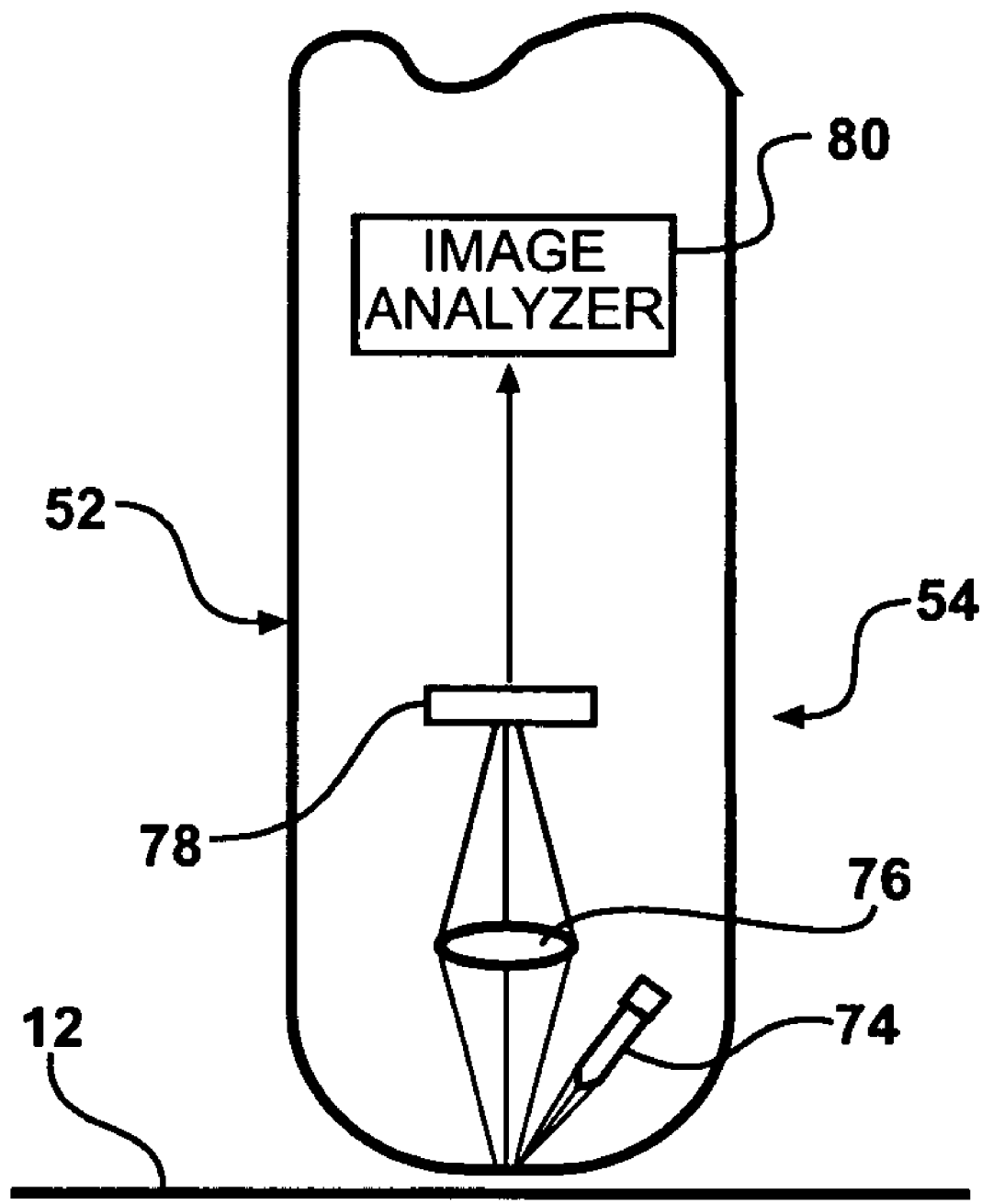
FIG. 8A is a fragmentary elevational view of the lower end of a support post with a diagrammatic representation of displacement detector components.

FIG. 8A depicts diagrammatically an optical support post displacement detector 54 associated with each support post 52. This embodiment includes a light emitter 74 such as a LED which directs a light beam onto the table surface 12 through an opening in the support post 52, a focusing lens 76 which receives light reflected from the table surface 12, a light sensitive receiver or sensor 78 which generates electronic signals corresponding to the reflected light images which are transmitted to an image analyzer 80.

Figure 8B:
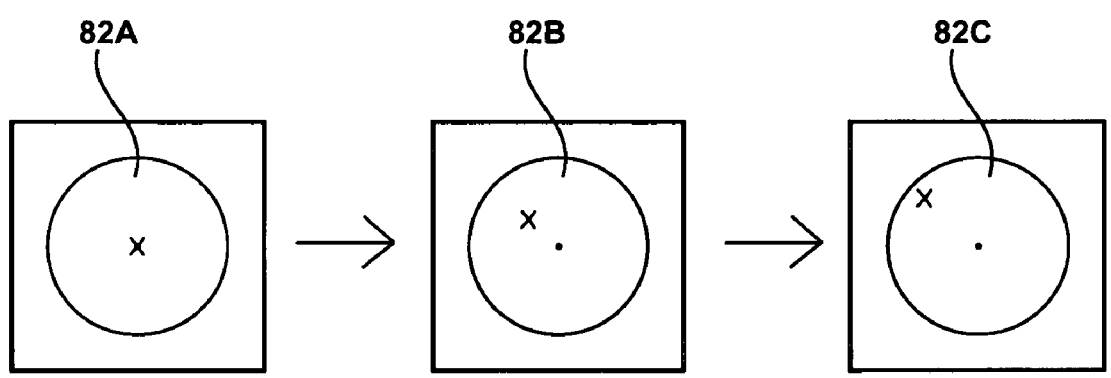
FIG. 8B is a diagrammatic representations of successive tracking patterns utilized by the displacement detector depicted in FIG. 8A.

As each support post 52 traverses the table surface 12 while sensor bar 16F (or 16B) is passed over the item 14, successive frame images 82A, 82B, 82C (FIG. 8B) of the surface 12 are generated. Fine surface details, (e.g., texture, color, contrasts, etc.) inherent on the table surface 12 are analyzed to determine the extent and direction of displacement of each support post 52 as it is moved over the table surface 12.

The above described optical displacement detector technology is non-mechanical, requires no moving parts, requires no preprinted (embedded, engraved, etc.) tracking patterns on the table surface 12, and is compatible with a wide variety of conventional "off-the-shelf" cutting boards, tables, etc.

Such a displacement detector is currently used in many computer mouse devices. As examples of commercially available components of this type, are Agilent Technologies reflective optical sensor HDNS-2000, lens HDNS-2100, LED assembly clip HDNS-2200 and 5 mm red LED HLMP-ED80. See also Agilent Technologies Application Note 1179, entitled "Solid-State Optical Mouse Sensor with PS/2 and Quadrature Outputs" for further operational details.

Figure 9B:
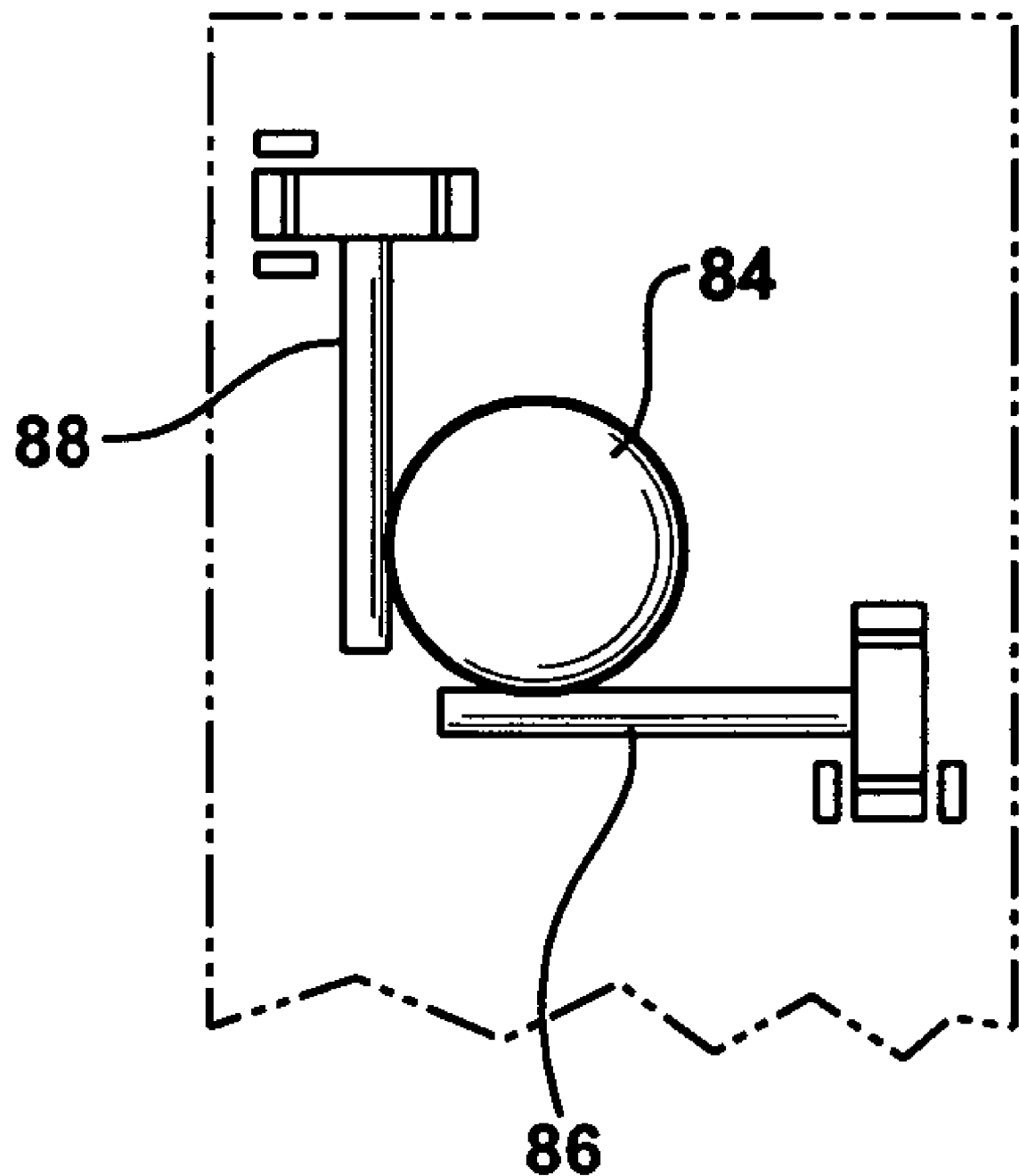
FIG. 9B is an enlarged representation of the certain components of the displacement detector embodiment shown in FIG. 9A.
Figure 9C:
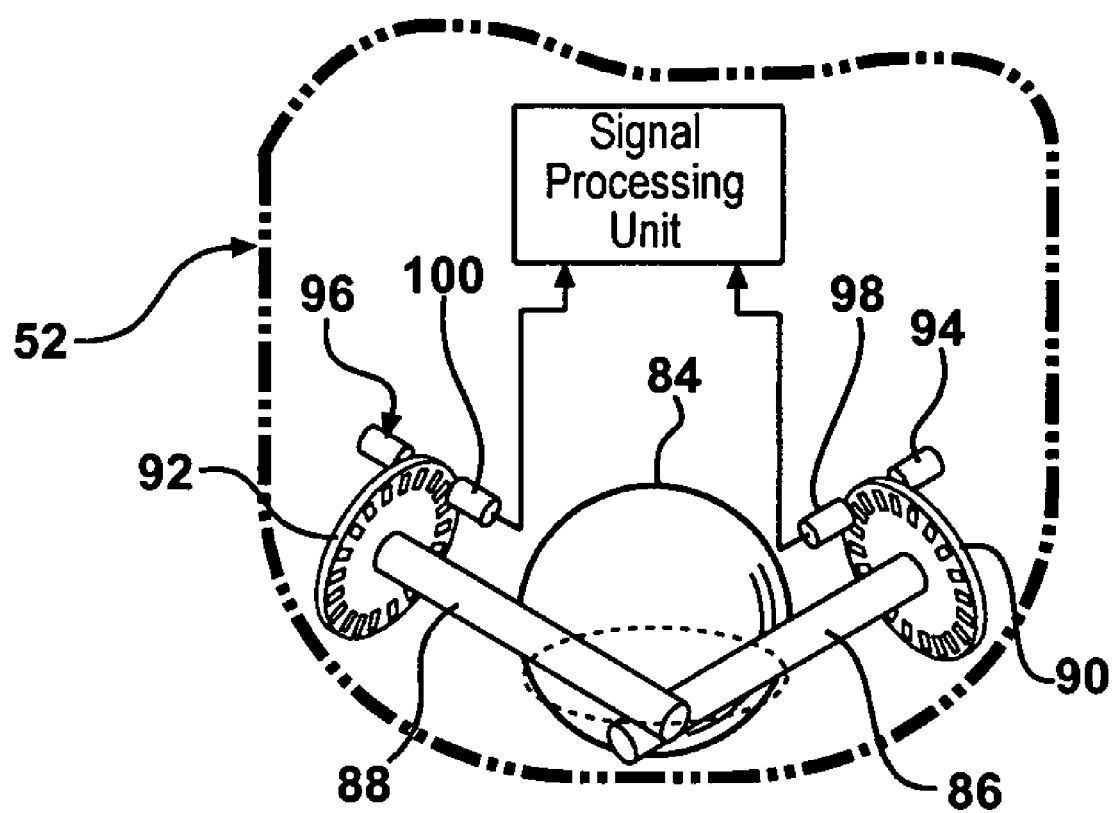
FIG. 9C is a perspective view of other components of the displacement detector embodiment shown in FIG. 9A with the support post shown in phantom lines.

Theory and Operation of the Optical-Mechanical Support Post Displacement Detector An optical-mechanical displacement detector 54A is shown in FIGS. 9A, 9B and 9C, which includes a ball 84, an X axis roller 86, a Y axis roller 88, attached X axis perforated optical encoder disc 90 and Y axis perforated optical encoder disc 92, optical emitters 94, 96 and optical receivers 98, 100. As the ball 84 rolls along the (non slip) table surface 12, the rollers 88 and/or 86 are rotated by frictional contact with the ball 84, causing the discs 90, 92 to also be rotated. The perforations in each optical encoder disc create a number of light and dark patches from light emitted by emitters 94, 96 which are detected by receivers 98, 100 and analyzed. This produces electrical signals corresponding to the displacement of the post 52 along either X and Y axis.

The above described mechanical displacement detector technology requires no preprinted (embedded, engraved, etc.) tracking patterns on the table surface 12, and is compatible with a wide variety of conventional "off-the-shelf" cutting boards, tables, etc. Such displacement detectors are well known in the art, are currently used in many computer mouse devices.

As the sensor bar 16F (or 16B) is stroked across the item 14 surface, the signals corresponding to the position of each support post 52 as well as the corresponding sensor 38F (or mechanical plunger 46) height positions are continuously captured and transmitted to a signal processor 300 in the case 26. The contoured height positions of the item 14 (data from the height sensors) as well as the corresponding underlying surface area (calculated from positions of the support posts 52) enables the continuous calculation and display of the volume of each segment defined by the sensor bar 16F (or 16B) as it traverses from one end of the item 14 to each successive position in being stroked along the item 14. As the density of each type of item 14 is recorded in the signal processor 300 memory, the real-time calculated volume, weight (volume×density), and associated cost (weight×cost per weight) is continuously displayed on the display 30. Display 30 has an ergonomic swivel and tiltable base 31 to establish a desired viewing angle for ease of operator and customer viewing.

Intermittently reversing the direction of movement of the sensor bar 16F (or 16B) as it the item 14 is mathematically accounted for by subtracting or adding the traversed volume of the item 14 during the backwards or forwards movements respectively. This enables a continuous readout of the weight and cost (based on weight) of the item 14 as the sensor bar 16F (or 16B) moves forwards or backwards, enabling the operator to accommodate an on-looking consumer's specific requests as per the particular portion desired based on the item 14 physical appearance, weight, and cost BEFORE the item 14 is cut!

FIG. 1 shows the attachment of knife blade 15 to the sensor bar 16, utilizing protrusions 102 snap fitted into corresponding holes in the knife blade 15, which also has ends snapped into recesses 104 adjacent at each end of the sensor bar 16. The knife blade 15 is received into a recess 106 in one side face of 108 of the sensor bar 16 to be located flush therewith. Easy attachment/detachment of the knife blade 15 enables the use of different types of knife blades for the requirements of differently composed items 14.

In the case of sensor bar 16F, when the position of sensor bar 16F reaches the desired weight (or cost) of the item 14, the operator manually applies a downward pressure on the sensor bar 16F causing both retractable posts 52 to retract upwards resulting in knife 15 moving downwards and making contact with the item 14. Simultaneously applying a continued downward pressure and exerting a back and forth sawing motion across the item 14 surface results in the item 14 being completely cut to form the desired segment. Knife blade 15 may also be used only to mark (score) the item 14 surface whereupon an independent cutting tool may be used to perform the final cutting of the item 14.

After the item 14 is completely cut (or scored) and the sensor bar 16F is again elevated by action of the spring-loaded retractable posts 52 fully extending themselves, the operator depresses the appropriately designated "reset" pushbutton 56A–56K causing the display 30 to clear and the signal processor 300 to ready the sensor bar 16F for new item 14 data. The sensor bar 16F is now ready to be stroked over a new item 14.

In the case of sensor bar 16B, when the position of the sensor bar 16B reaches the desired weight (or cost) of the item 14, the operator depresses the appropriately designated "cut" pushbutton 56A–56K. Referring to FIGS. 6A and 6B, a brief pulse of electric power is applied to each solenoid coil windings 70 resulting in the complete retraction of all plungers 46 into the sensor bar 16B, thus compressing spring 48 to bring the stem 47 of plunger 46 against a permanent magnet 72. Each plunger 46 (stem 47) becomes "latched" (held adjacent) to the permanent magnet 72. The plungers 46 remain retracted, aligned next to permanent magnet 72 without further application of electric power solely due to the attractive force of the permanent magnet 72. As described latter, the retracted position of each plunger 46 can be further secured by use of side-mounted solenoid plungers.

With all plungers 46 in their fully retracted position, the cutting edge of the knife 15 becomes completely exposed. By manually applying a downward pressure on the sensor bar 16B, both retractable posts 52 retract upwards causing the knife 15 to move downward and make contact with the item 14. Simultaneously applying a continued downward pressure and exerting a back and forth sawing motion across the item 14 surface results in the item 14 being completely cut to form the desired segment. Knife blade 15 may also be used only to mark (score) the item 14 surface whereupon an independent cutting tool may be used to perform the final cutting of the item 14.

After the item 14 is completely cut (or scored) and the sensor bar 16B again elevated by action of the spring-loaded retractable posts 52 fully extending themselves, the operator depresses the appropriately designated "reset" pushbutton 56A–56K causing a brief pulse of electric power of the opposite polarity (of that initially used to retract each plunger 46) to be applied to each solenoid coil windings 70 enclosing the plungers 46. Each of the plungers 46 is thus released from the permanent magnet 72 hold and resumes a fully extended position by overcoming the attraction of the permanent magnet 72 and the automatic extension of the compressed springs 48 to their normally extended configuration. The simultaneous action of this "reset" pushbutton is to also cause the display 30 to clear and the signal processor 300 to ready the sensor bar 16B for new item 14 data. The sensor bar 16B is now ready to be stroked over a new item 14.

Various industrial applications may utilize different cutting methods in place of the above described knife 15. For example, items 14 may pass via a conveyor belt (FIG. 5B) under a stationary sensor bar 16A whereupon an automatic chopping blade, laser, rotary blade, or high-pressure water cutter cuts the items 14 into specific portions based on weight or cost. Alternatively, a movable sensor bar 16A may traverse over stationary single or multiple items 14 whereupon the items 14 are cut by the aforementioned cutting tools. In either case, as the plungers 46 never need to be retracted into the sensor bar 16 in order to expose a knife 15, the solenoid latching mechanism is omitted. Similarly, the knife 15 may be omitted from the sensor bar 16 in these configurations.

As mentioned above, the sensor bar 16 controller signal processor 300 case 26 may have a mercury tilt indicator switch 24 (or similar level indicator) that sounds an alarm 302 (FIG. 1A) when the sensor bar 16 tilts more than a predefined maximum angle from the vertical (90 degree) position in relation to the table surface 12. As the sensor bar 16 traverses the item 14, an out-of-bounds tilt angle will cause the alarm 302 to sound indicating that the item scan will need to be redone. Alternatively, acceptable out-of-bounds tilt angles can be measured and mathematically compensated for in the volume calculations so that the item scan can proceed without interruption. Along with the signal processor controller 300, tilt switch 24, and sensor bar 16 battery supply 306, the alarm 302 is also contained within the controller-signal processor case 26.

Disallowed sensor bar 16 movements are also detected by electrical signals from displacement detectors 20A and 22A corresponding to positions of support posts 20 and 22. An example is when the operator holds the sensor bar 16 in too great of a horizontal instead of a more perpendicular position in relation to the operator. Another example is if the operator moves the sensor bar 16 too fast or too slow, or lifts one/both support posts 20, 22 off the table surface 12. The detected support post coordinate positions or lack of coordinate positions causes the alarm 302 to sound indicating that the item 14 scan will need to be redone.

Intermittently reversing the direction of movement of the sensor bar 16 as it traverses the item 14 is mathematically accounted for by subtracting or adding the traversed volume of the item 14 during the backwards or forwards movements respectively. This enables a continuous readout of the weight and cost (based on weight) of the item 14 as the sensor bar 16 moves forwards or backwards, enabling the operator to accommodate an on-looking consumer's specific requests as per the particular portion desired based on the item 14 physical appearance, weight, and cost BEFORE the item 14 is cut!

The controller signal processor 300 may be a commercially available programmable microprocessor based computer chip contained within the case 26. The microprocessor signal processor 300 is programmed to perform coordinate, position, volume, weight, cost and other required computations as described herein. The inputting of initial data (e.g., density, cost per weight, product code number, bar code pattern, etc.) into the signal processor 300 memory is accomplished via the control panel keypad 27. Data can also be uploaded from an external source (e.g., desktop, laptop, or palm computers) to the corresponding data I/O (input/output) ports 58 via a wireless data link (e.g., infrared) or other interface connections, e.g., USB (universal serial bus).

The data I/O (input/output) ports 58 may also be used to transmit data (e.g., weight, cost, product code number, bar code pattern, etc.) to external devices such as Point-Of-Sale (POS) terminals, customer readout displays, external computers, receipt and bar code printers, etc. The use of ports 58 is critical when integrating the sensor bar 16 into industrial portioning operations. For example, a production line that simultaneously utilizes many sensor bars 16 may have all collected weight data stored/analyzed by a central computer. Each signal processor 300 can be programmed, via keypad 27 or an external computer communicating via ports 58, to append a unique prefix identifying number to the data stream transmitted to the central computer.

As the sensor bar 16 traverses the item 14 and the segment weight (or cost) is displayed, the corresponding perpendicularly (in relation to the base of the sensor bar 16) projected positions of the height sensors 38 onto the item 14 upper surface indicate the exact location where the item 14 should be cut in order to produce the segment of the displayed weight (or cost). In the embodiment of FIGS. 1, 3A, and 4, the knife 15 is parallel to (and hence does not coincide) with this position. In the embodiment of FIG. 2A, a separate knife (not shown) may be used to cut the selected item segment using the side surface 17 of uprights 36A and 36B as a guide. This side surface is parallel to (and hence does not coincide) with the exact cutting position.

Similarly, in the embodiment of FIGS. 2B, 2C, and 2D, the cutting location of the rotary blade, guillotine chopping blade, and laser cutter respectively, are also parallel to (and hence do not coincide) with the exact cutting position. In the aforementioned embodiments, if this small positional difference between the cutting instrument and the exact cutting line is not taken into account, the resultant cut segment weight (or cost) would be slightly different than that indicated on the scan display 30. In many applications this difference may be considered insignificant. In applications such as when quickly estimating a weight or cost, a final weighing (and pricing) using a conventional scale may be performed after the item 14 segment is cut. Nonetheless, this difference can be eliminated for both manual as well as automated industrial applications.

In the context of automated industrial applications, since programmed cutting tools (e.g., automatic chopping blade, laser, rotary blade, or high pressure water jet) are used in place of the knife 15, these tools are simply aligned with the height sensor 38 positions whereupon the item 14 is cut on the exact cutting line as the sensor bar 16 reaches the desired portioning position. In partially automated or manual applications, the use of various marking/scoring technologies enables the marking (scoring) of the representative perpendicularly (in relation to the sensor bar 16) projected height sensor 38 positions onto the upper surface of the item 14 whereby blade 15 or a separate cutting tool or knife can then cut the item 14 along the score marks resulting in the weight (or cost) indicated on display 30.

Marking (Scoring) Item 14 on the Exact Segmenting Line:

Item 14 can be segmented by first marking/scoring the upper surface of the item 14 along the perpendicularly (in relation to the base of the sensor bar 16) projected sensor 38 positions (or linearly located positions between sensor 38 positions), and then cutting the item 14 along these score marks with blade 15 or a separate cutting tool or knife. Many different technologies may be utilized to mark/score the upper surface of item 14 to indicate this cutting line.

Examples include (but are not limited to) ink dispensing mechanisms (e.g., piezoelectric based, thermal bubble based, mechanical based, electromechanical based, etc.), thermal/burning electric elements, laser burning emitters, and sharp-ended implements.

Following are detailed descriptions of ink dispensing marking mechanisms as well as marking/scoring mechanisms based on thermal/burning electric elements, laser burning emitters, and sharp-ended solenoid plungers. All of these marking mechanisms may be incorporated in either I) normally retracted mechanical solenoid marking plungers 46C (e.g., FIG. 4) that are parallel to and positioned in-between the positions of height sensors 38, and used exclusively for marking/scoring the item 14 surface, or in II) normally extended mechanical solenoid height sensor plungers 46 that are also used to determine item 14 heights. The advantage that the normally retracted marking plungers 46C have over the later described marking/scoring mechanisms located within mechanical height sensor plungers 46 is that due to limited physical contact with the item 14 surface, the marking plungers 46C have a reduced possibility of becoming obstructed due to possible surface debris on the upper surface of item 14.

I) Marking Plungers 46C—Used Exclusively For Marking/Scoring—Located In-Between Height Sensor 38 Positions a) Ink Dispensing Marking Mechanism 127

Referring to FIG. 10A-1, each normally retracted marking plunger 46C contains an ink dispensing mechanism cavity 126 that contains an electrically controlled ink dispensing mechanism 127 that sprays ink 128 through nozzle 132 onto the upper surface of item 14 forming ink mark 134. The cone shaped collar 145 separates the ink dispensing nozzle 132 from the upper surface of item 14, thus reducing the opportunity of possible item 14 surface debris from obstructing the operation of nozzle 132.

Ink dispensing mechanisms 127 may be based on many different technologies including (but not limited to) piezoelectric, thermal bubble, mechanical, and electro-mechanical. Following is a description of ink dispensing mechanisms 127 based on piezoelectric and thermal bubble inkjet technologies. These two technologies are widely employed in current inkjet printer devices.

Figure 12A:
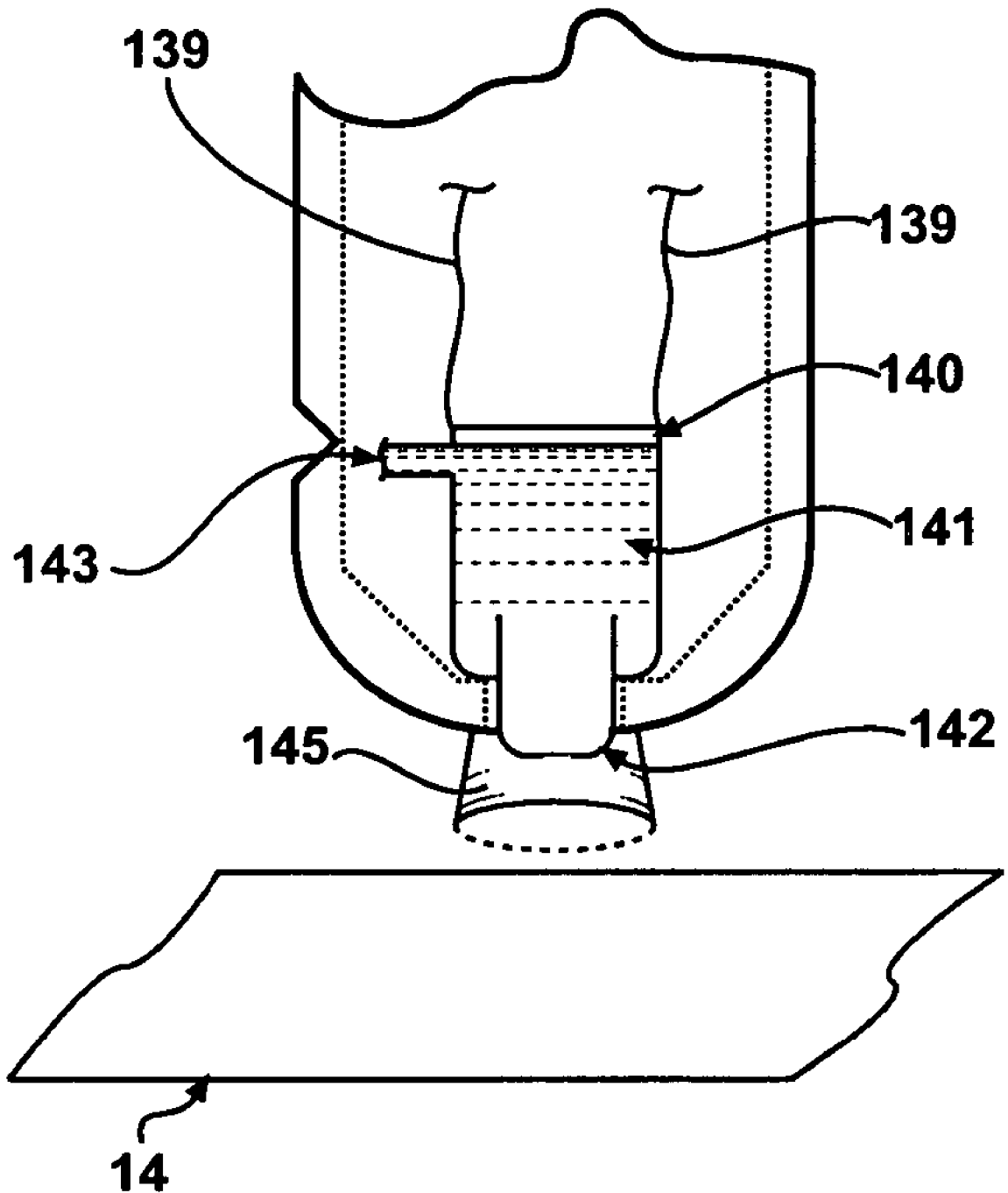
FIG. 12A is a fragmentary elevational view of a piezoelectric ink jet marker mechanism for ink jet marking in its initial state, with a fragmentary portion of an item to be marked.
Figure 12B:
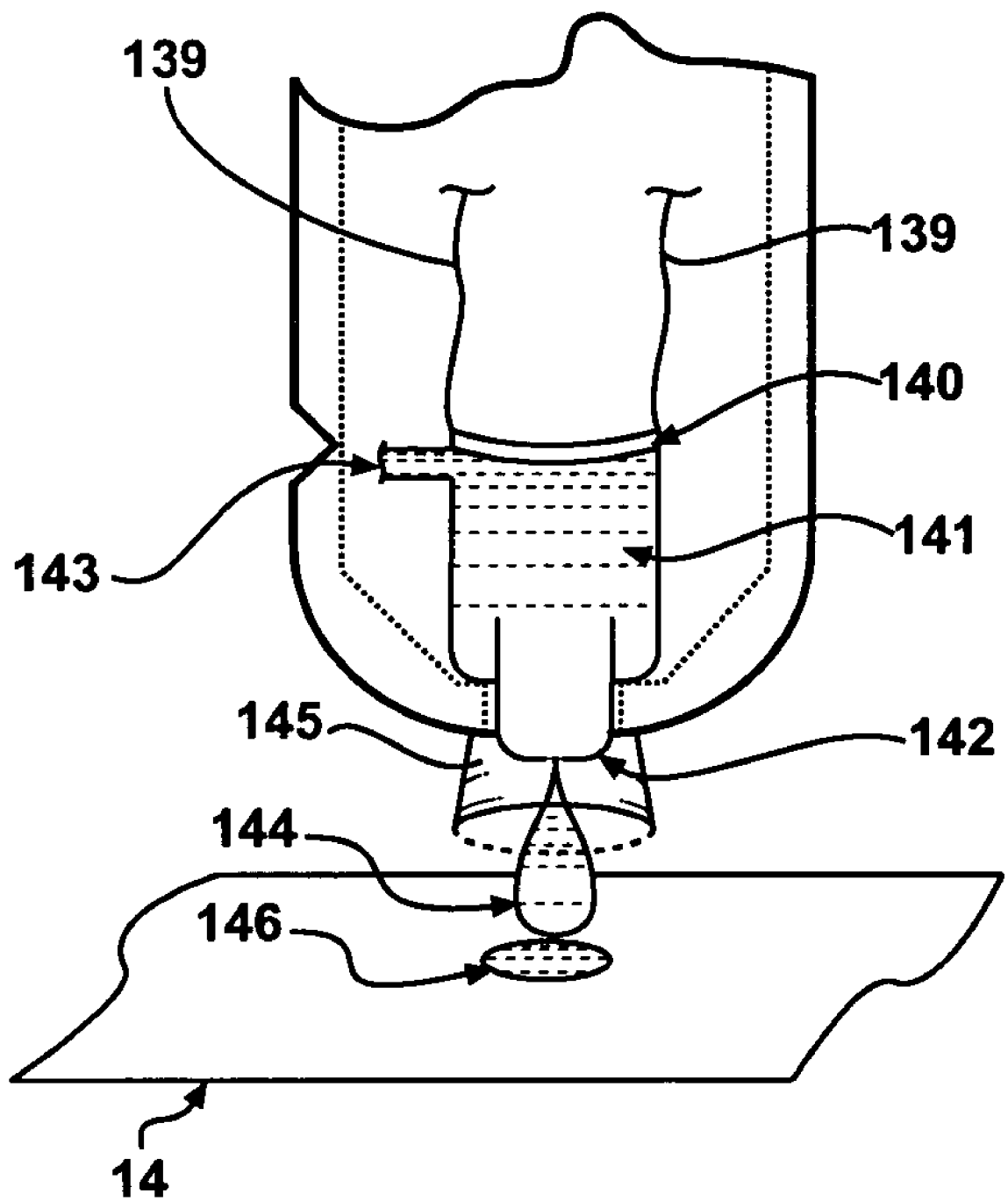
FIG. 12B is a fragmentary elevational view of the piezoelectric ink jet dispensing mechanism shown in FIG. 12A, in the ink discharging condition depositing on ink droplet on the item to be marked.
Figure 12C:
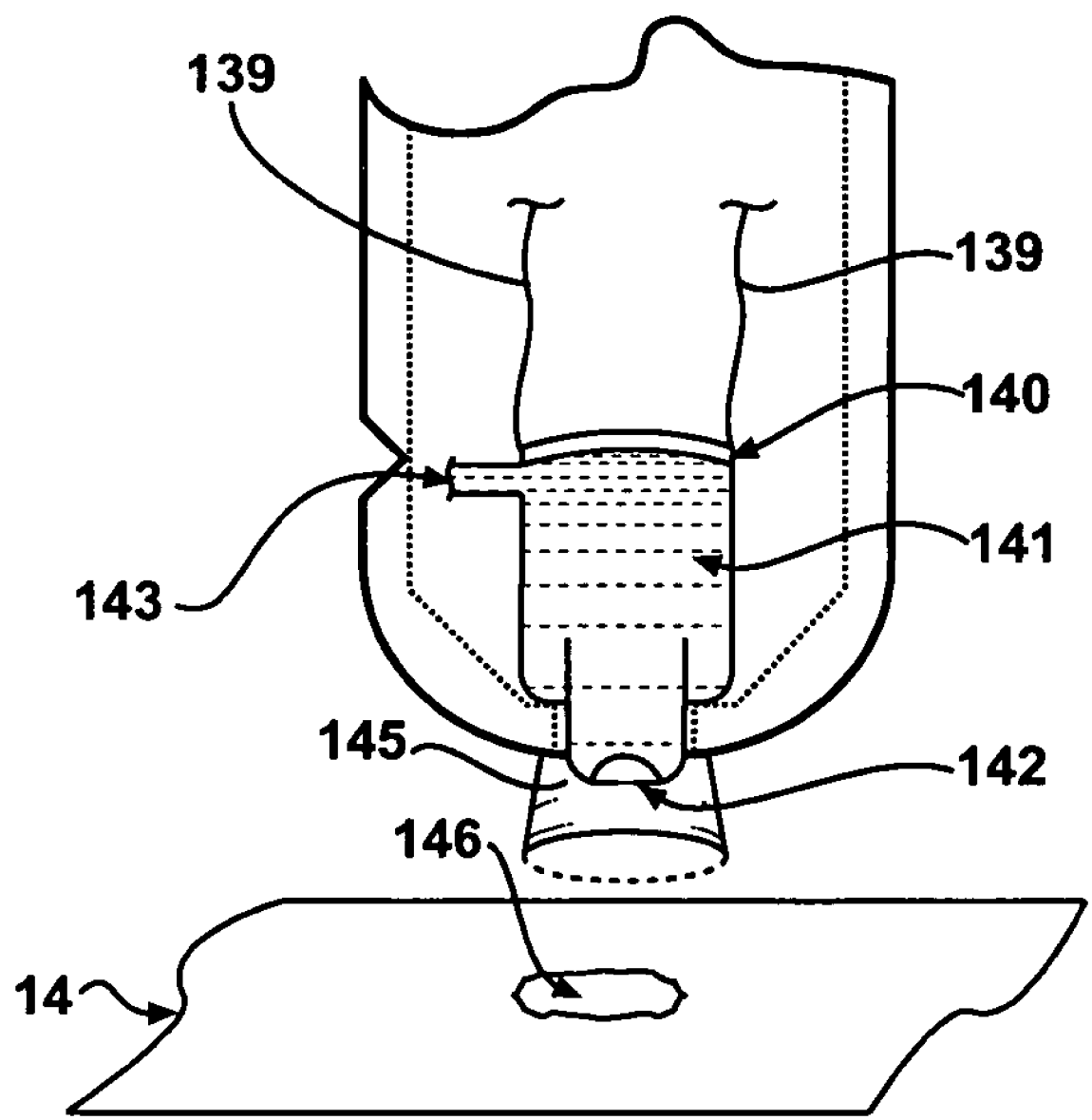
FIG. 12C is a fragmentary elevational view of the piezoelectric ink jet dispensing mechanism shown in FIG. 12A in the ink charging condition with an ink mark on an item marked.

Theory and Operation of the Piezoelectric Based Ink Dispensing Mechanism 127:

FIG. 12A illustrates a piezoelectric based ink dispensing mechanism 127 in its initial state whereby no current is applied to transducer 140 via electrical leads 139. In this state, transducer 140 remains in a flattened configuration. The application of electrical current to transducer 140 causes it to vibrate in an alternating downward and upward direction. Referring to FIG. 12B, as transducer 140 flexes downwards, ink 141 is forced out of the nozzle 142 creating ink droplet 144 which forms ink mark 146 on the item 14 upper surface. Referring to FIG. 12C, as the transducer 140 flexes upwards, ink 141 is drawn out of an ink reservoir (not shown) via conduit 143 thus replacing the ink just released through nozzle 142.

The cone shaped collar 145 separates the ink dispensing nozzle 142 from the upper surface of item 14, thus reducing the opportunity of possible item 14 surface debris from obstructing the operation of nozzle 142.

Figure 13A:
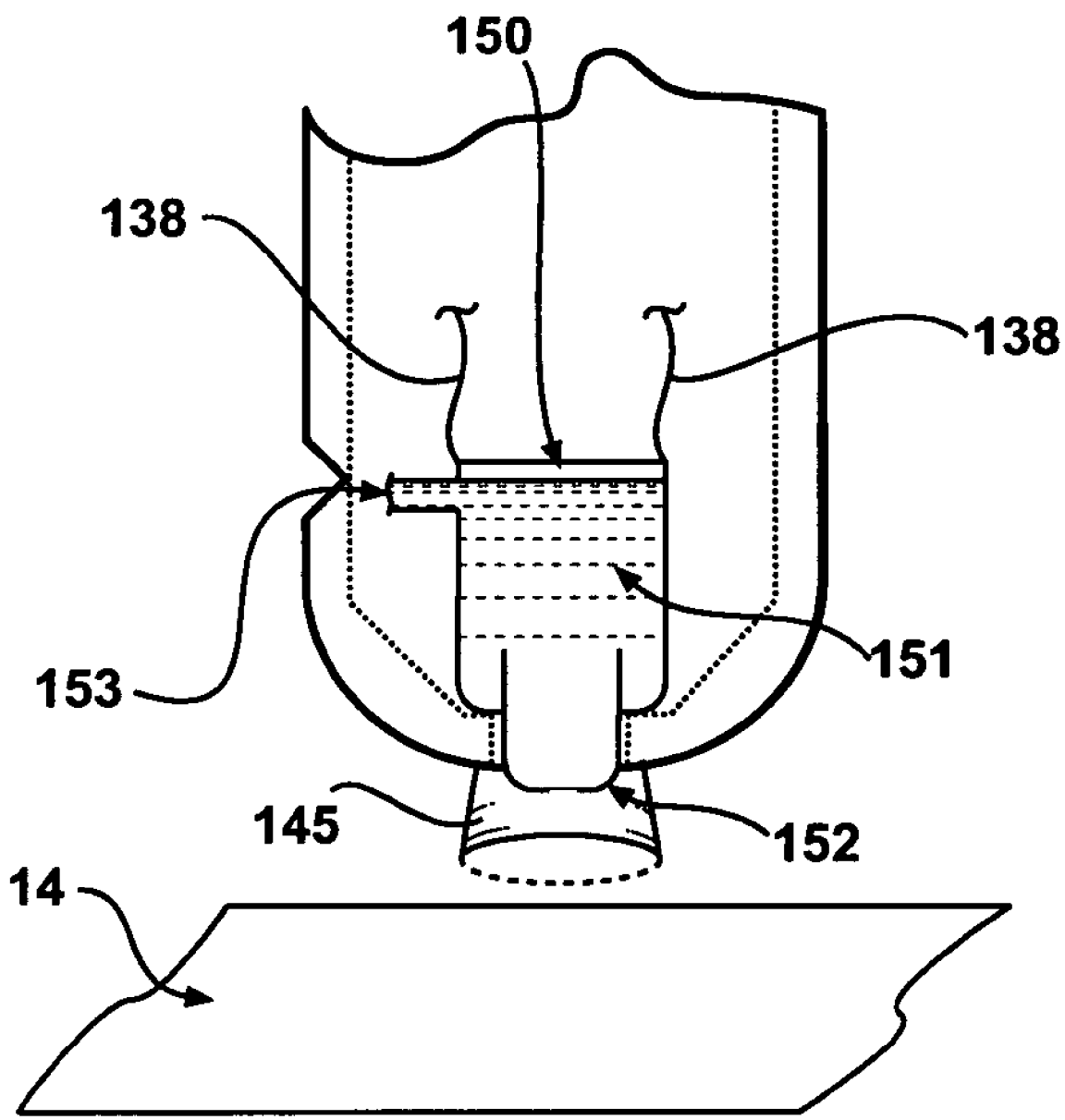
FIG. 13A is a fragmentary elevational view of a thermal bubble ink jet marking mechanism in its initial state adjacent an item to be marked.
Figure 13B:
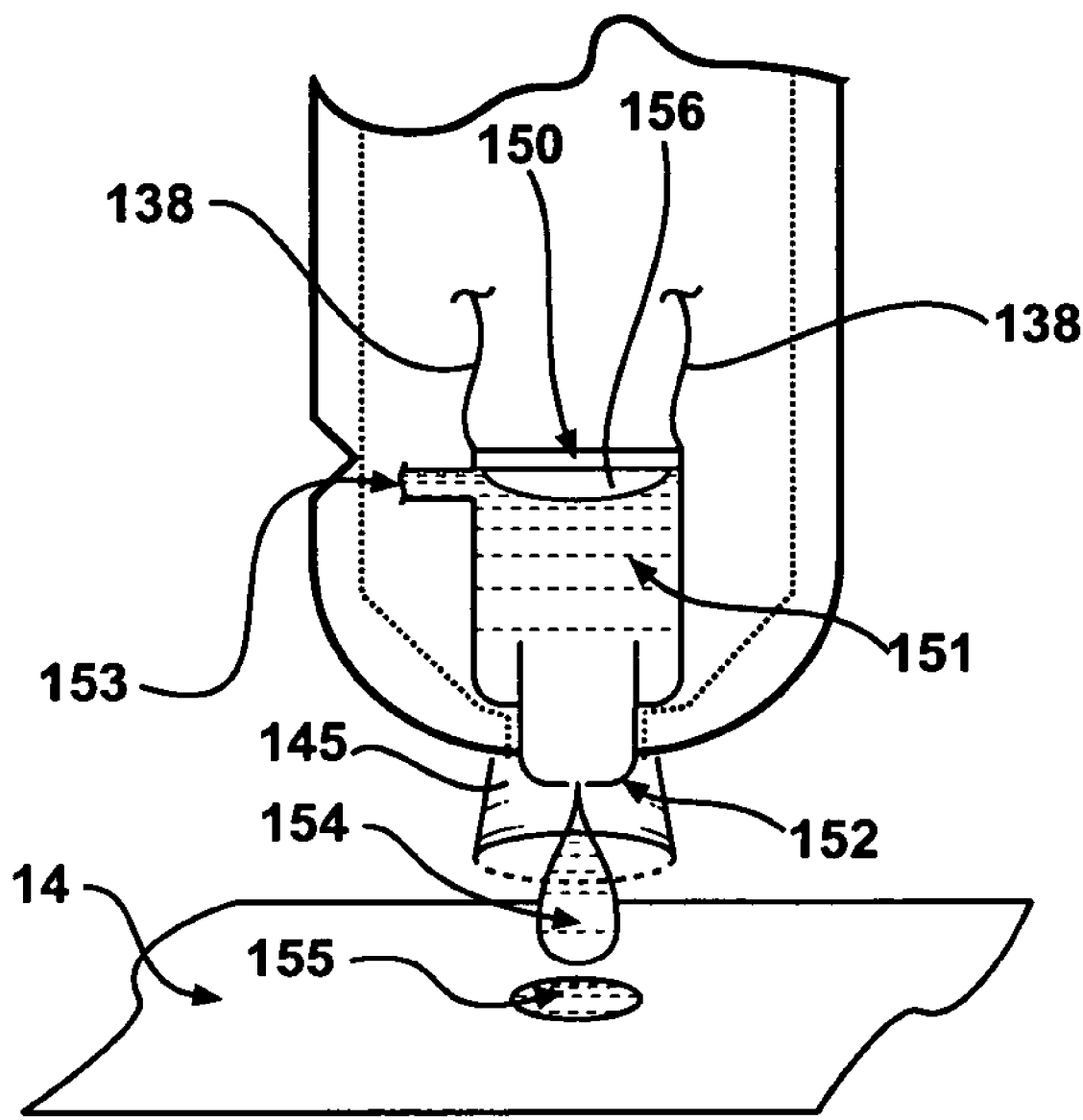
FIG. 13B is a fragmentary elevational view of a thermal bubble ink jet marking mechanism in its ink discharging condition depositing a droplet on an adjacent item to be marked.

Theory and Operation of the Thermal Bubble Based Ink Dispensing Mechanism 127:

FIG. 13A illustrates a thermal bubble based ink dispensing mechanism 127 in its initial state whereby no current is applied to heating element 150 via electrical leads 138. Referring to FIG. 13B, the application of electrical current via electrical leads 138 to heating element 150 heats ink 151. A portion of ink 151 vaporizes resulting in the formation of bubble 156. The increased pressure created by bubble 156 forces ink 151 out of nozzle 152 creating ink droplet 154 which forms ink mark 155 on the upper surface of item 14. Referring to FIG. 13C, the subsequent collapse of bubble 156 creates a vacuum that results in additional ink 151 being drawn out of an ink reservoir (not shown) via conduit 153 thus replacing the ink just released through nozzle 152.

The cone shaped collar 145 separates the ink dispensing nozzle 152 from the upper surface of item 14, thus reducing the opportunity of possible item 14 surface debris from obstructing the operation of nozzle 152.

Referring to FIGS. 10A-1, 10A-2, 10A-3, 11A, and 11B, and briefly summarized here, but subsequently described in detail, the normally retracted position (FIGS. 10A-2 and 11A) of marking plungers 46C separates the ink dispensing mechanisms 127 from the proximity of the upper surface of item 14 as the sensor bar 16 traverses the item 14. This reduces the opportunity of possible item 14 surface debris from obstructing ink nozzles 132. When the sensor bar 16 reaches the desired weight (or cost) of item 14, the operator presses the appropriately designated "mark" pushbutton 56A–56K causing each normally retracted marking plunger 46C to extend downwards (FIGS. 10A-3 and 11B) and make contact with the upper surface of item 14, whereby ink 128 is automatically sprayed through nozzle 132 onto the upper surface of item 14 forming ink mark 134. Two or more ink marks from two or more ink dispensing mechanisms 127 contained within marking plungers 46C indicate the exact cutting line used to segment item 14 into the desired weight (or cost based on weight). Again referring to FIGS. 10A-2 and 11A, after each marking plunger 46C dispenses an ink mark onto the item 14 surface, plungers 46C are automatically retracted into their respective solenoid coil windings 70C within the sensor bar 16 housing whereby the marking plunger stems 47C at the top of each plunger 46C are held adjacent to permanent magnets 72C by the attractive force of the permanent magnets 72C. Plungers 46C are further secured by the automatic extension of side-mounted solenoid plungers 116C which engage into saw-tooth indentations 110C located on the side of plungers 46C facing side-mounted solenoid plungers 116C.

Figures 2, 10A:
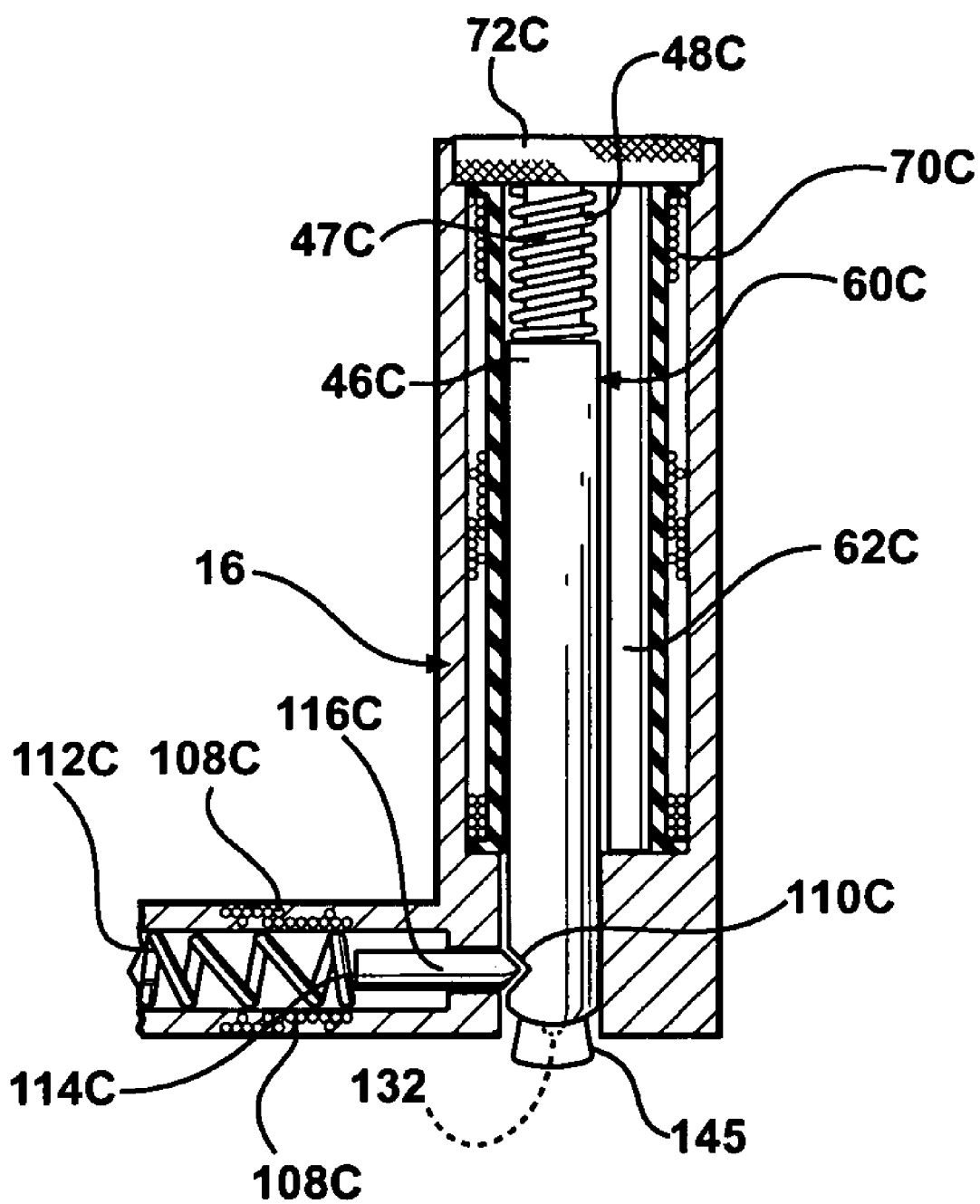
Figures 3, 10A:
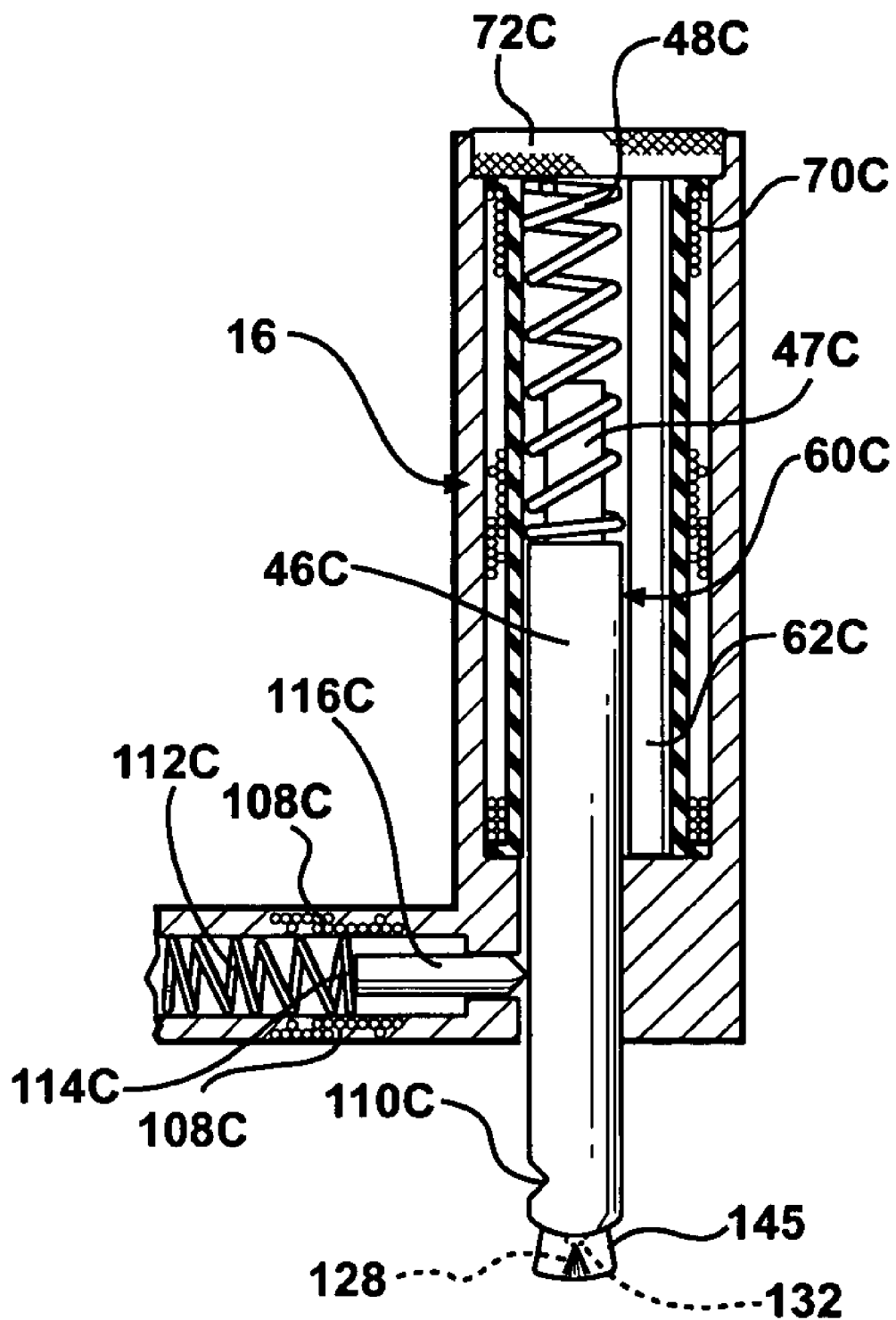
Figures 4, 10A:
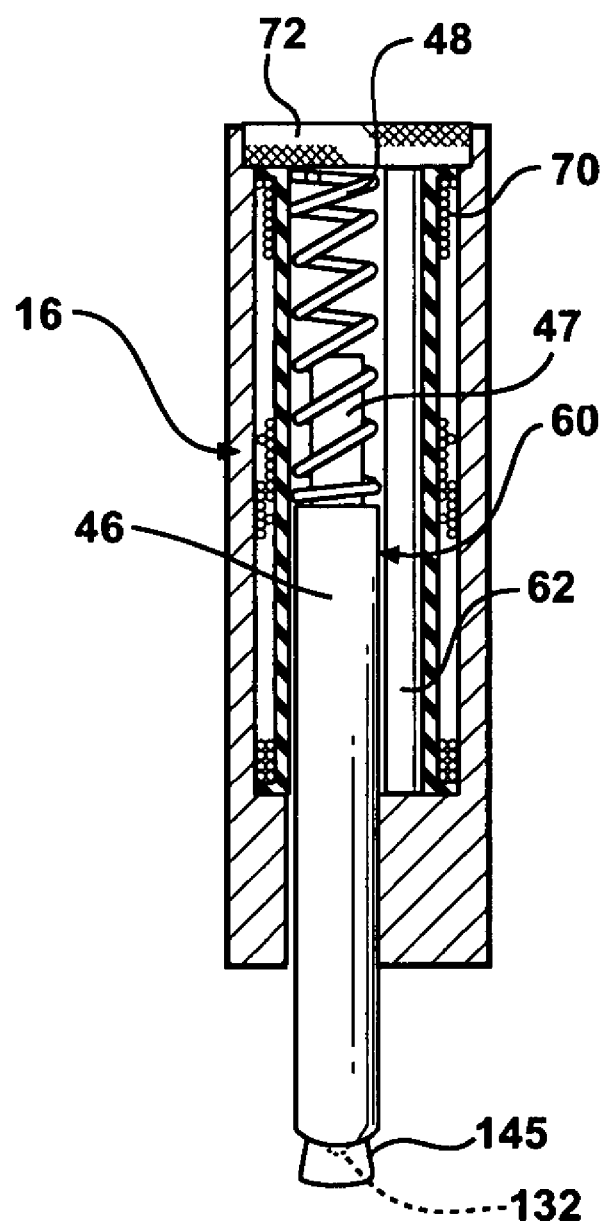
Figures 5, 10A:
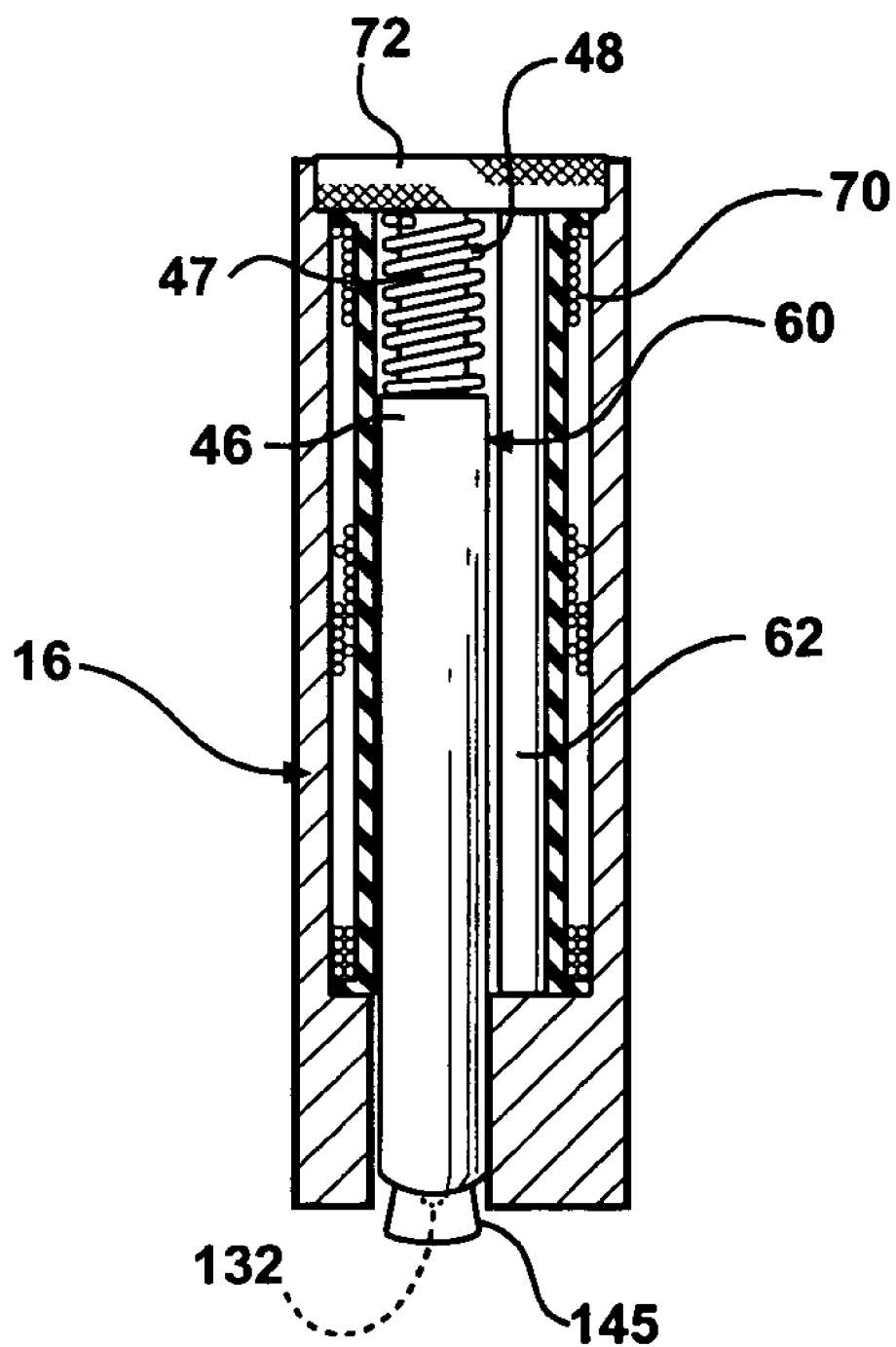
Figure 11A:
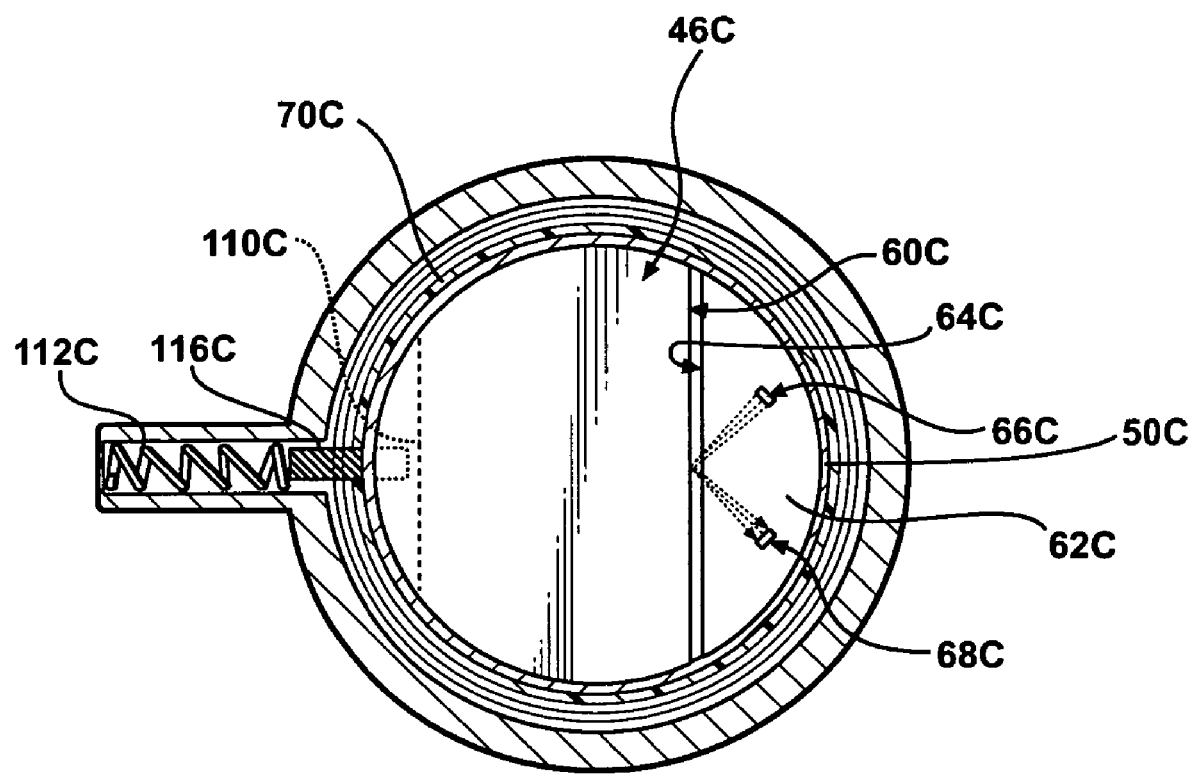
FIG. 11A is a transverse sectional view of a marking plunger, showing a side locking pin in engagement.
Figure 11B:
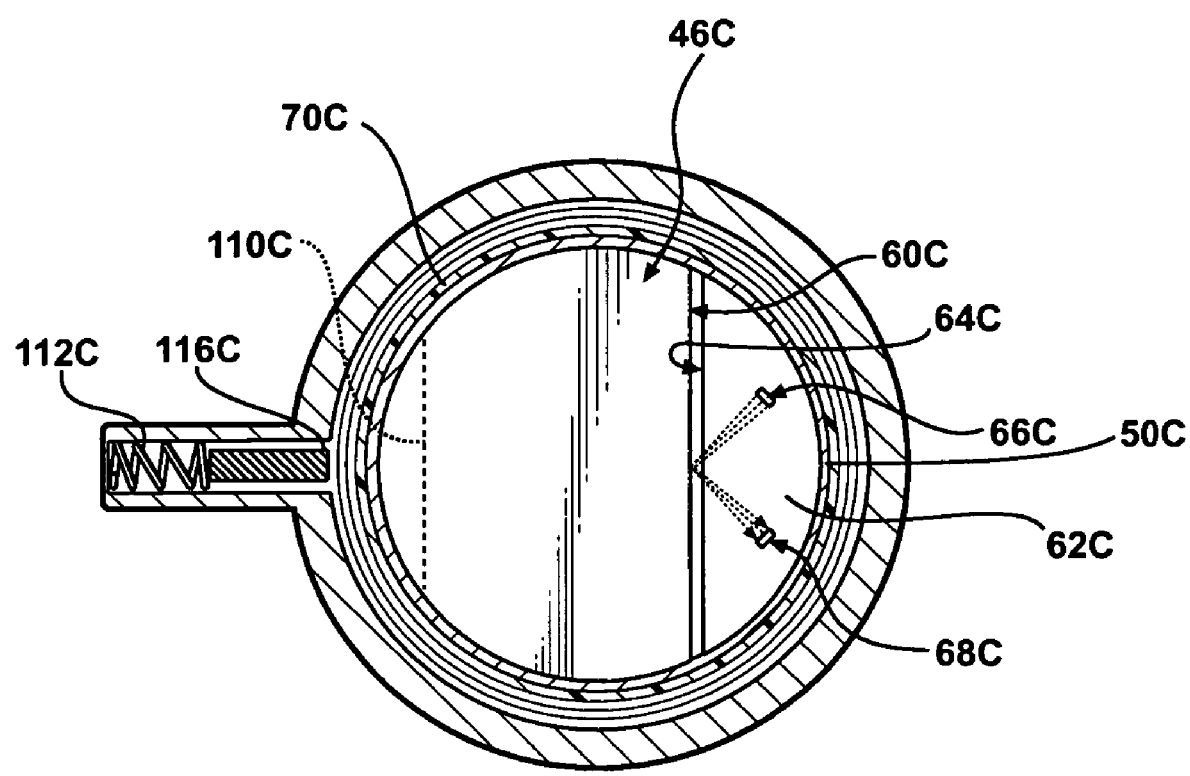
FIG. 11B is a transverse sectional view of the marking plunger shown in FIG. 11A but with the locking pin in the retracted position.

In detail, the normally retracted state of marking plunger 46C is illustrated in FIGS. 10A-2 and 11A. The stem 47C at the top of each marking plunger 46C is held adjacent to permanent magnet 72C by the attractive force of the permanent magnet 72C. As illustrated, marking plunger 46C is further secured by the normally extended spring 112C which applies force to base 114C of side-mounted plunger 116C which engages plunger 46C indentation 110C. As the sensor bar 16 traverses the item 14 and reaches the desired weight (or cost based on weight), the appropriately designated "mark" pushbutton 56A–56K is depressed causing the simultaneous application of electrical power to solenoid coil windings 108C and a brief pulse of electrical power to solenoid coil windings 70C. As shown in FIGS. 10A-3 and 11B, this causes the retraction of each side-mounted plunger 116C from its engaged holding position in indentation 110C of plunger 46C and simultaneously the holding force of permanent magnet 72C on stem 47C of marking plunger 46C is overcome and compressed spring 48C is thus extended forcing each spring-loaded marking plunger 46C towards the upper surface of item 14.

FIGS. 10A-2, 10A-3, 11A, and 11B show details of the arrangement that senses the extension travel of the plungers 46C. Each plunger 46C has a flattened side 60C facing a sensor rod 62C also having a flattened side 64C facing plunger side 60C. The flat side 60C of the plunger 46C has a reflective surface imprinted with non-reflective tracking patterns. A linear array of equidistantly spaced angled light emitters (e.g., LED devices) 66C is embedded along the length of the sensor rod 62C directed at the flattened side 60C of the plunger 46C, and a similar linear array of equidistantly spaced angled photoelectric receivers 68C is embedded along the length of the sensor rod 62C positioned to receive light from a respective emitter reflected from the side 60C.

As the plunger 46C moves up and down through the cavity formed by the solenoid coil windings 70C and sensor rod 62C, the photoelectric emitter 66C/receiver 68C sensor array determines the displacement distance of the plunger 46C by tracking the changing patterns of received reflected light. To eliminate false readings caused by reflections from the solenoid spring 48C when it occupies the plunger 46C position, the spring 48C has a matte, non-reflective surface (finish).

When the above described optical reflection based displacement sensor detects no movement of the extended plunger 46C for a pre-determined amount of time (e.g., 1 second) then plunger 46C is known to have reached its final resting position lying on the upper surface of item 14. The signal processor 300 then automatically applies electrical current to the ink dispensing mechanism 127 causing ink 128 to be ejected out of nozzle 132 onto the item 14 upper surface forming ink mark 134. The cone shaped collar 145 separates the ink dispensing nozzle 132 from the upper surface of item 14, thus reducing the opportunity of possible item 14 surface debris from obstructing the operation of nozzle 132.

Referring to FIGS. 10A-2, 10A-3, 11A, and 11B, after ink 128 has been ejected onto the item 14 surface, the signal processor 300 applies a brief electrical current to solenoid coil windings 70C causing marking plungers 46C to be fully retracted into the sensor bar 16 housing. Marking plunger stems 47C located at the top of marking plungers 46C are held adjacent to the permanent magnets 72C by the attractive force of permanent magnets 72C without further application of electrical current to solenoid coil windings 70C. When the above described optical reflection based displacement detector measures the ceasing of vertical movement of marking plungers 46C while returning into the sensor bar 16 housing, the signal processor 300 automatically stops the application of electrical current to the side-mounted coil windings 108C. This results in the extension of the spring-loaded side-mounted plungers 116C into the corresponding marking plunger 46C saw-tooth indentation 110C resulting in further securing the plungers 46C in their retracted position. The signal processor 300 then clears display 30 and sensor bar 16 is readied to perform a new item 14 scan.

The aforementioned normally retracted marking plunger 46C incorporated an ink dispensing mechanism 127 (FIG. 10A-1) as its marking/scoring device. As described below, many other (non-ink dispensing) types of marking/scoring mechanisms may be incorporated into marking plungers 46C such as (but not limited to) thermal/burning heating elements (FIG. 10B-1), laser burning emitters (FIG. 10C-1), and sharp-ended scoring devices (FIG. 10D-1). The implementation of these additional marking/scoring mechanisms is similar to that of the ink dispensing mechanism just described. Thus, the extension, activation, and retraction of the marking plungers 46C and associated marking mechanisms ensures the accurate placement of score marks which indicate the position of the exact cutting line used to precisely portion the item 14.

b) Thermal/Burning Marking Mechanism 127A

Figures 1, 10B:
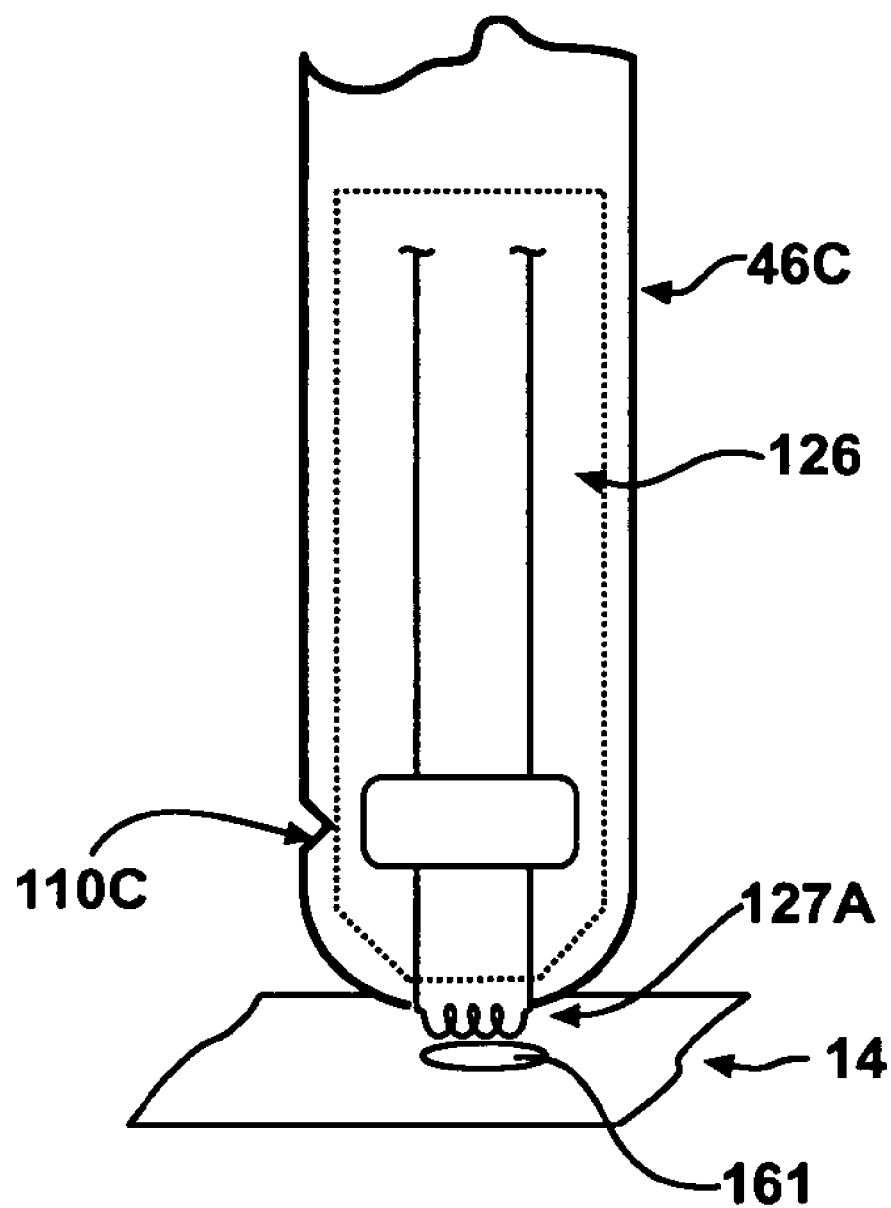
Figures 2, 10B:
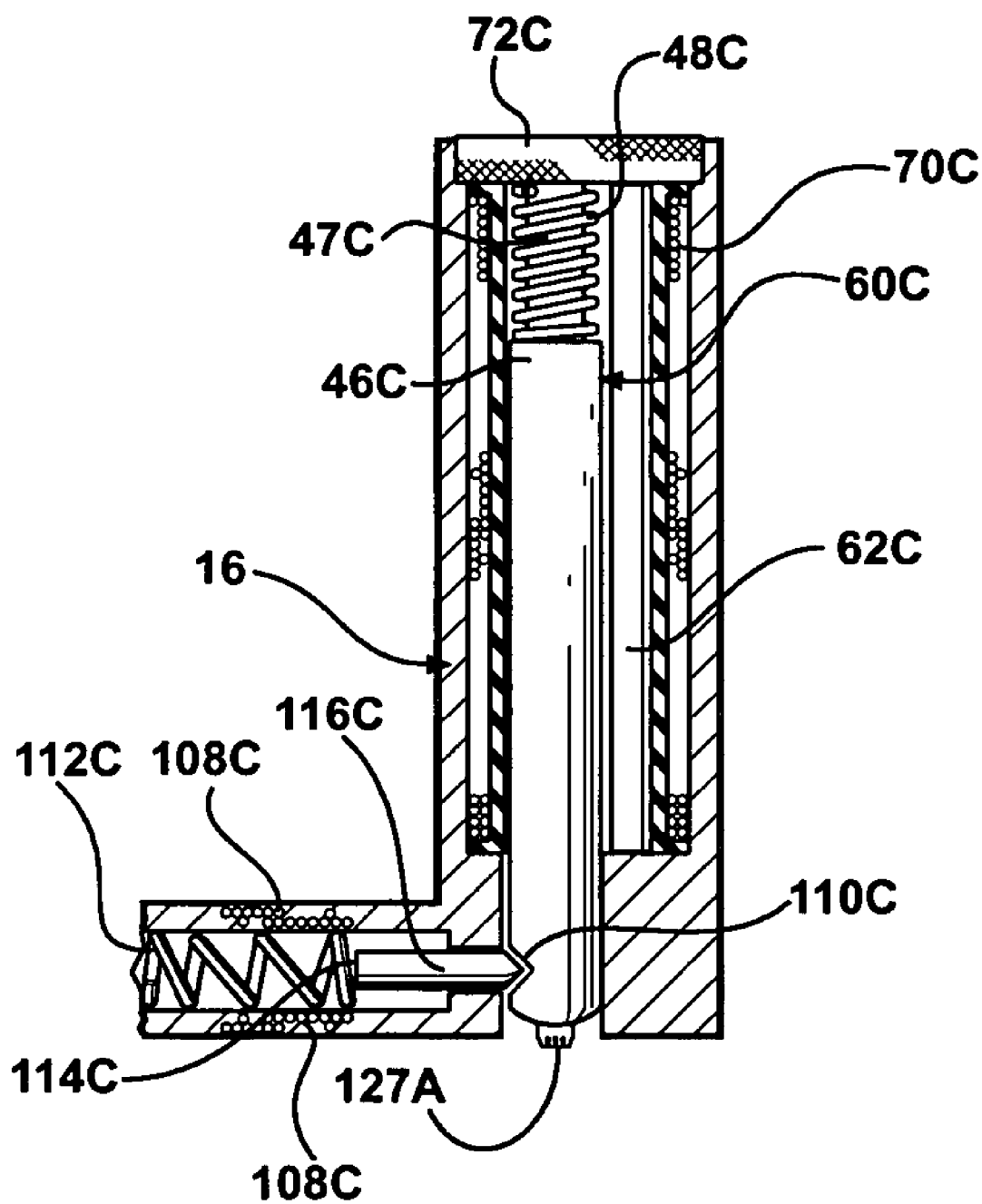
Figures 3, 10B:
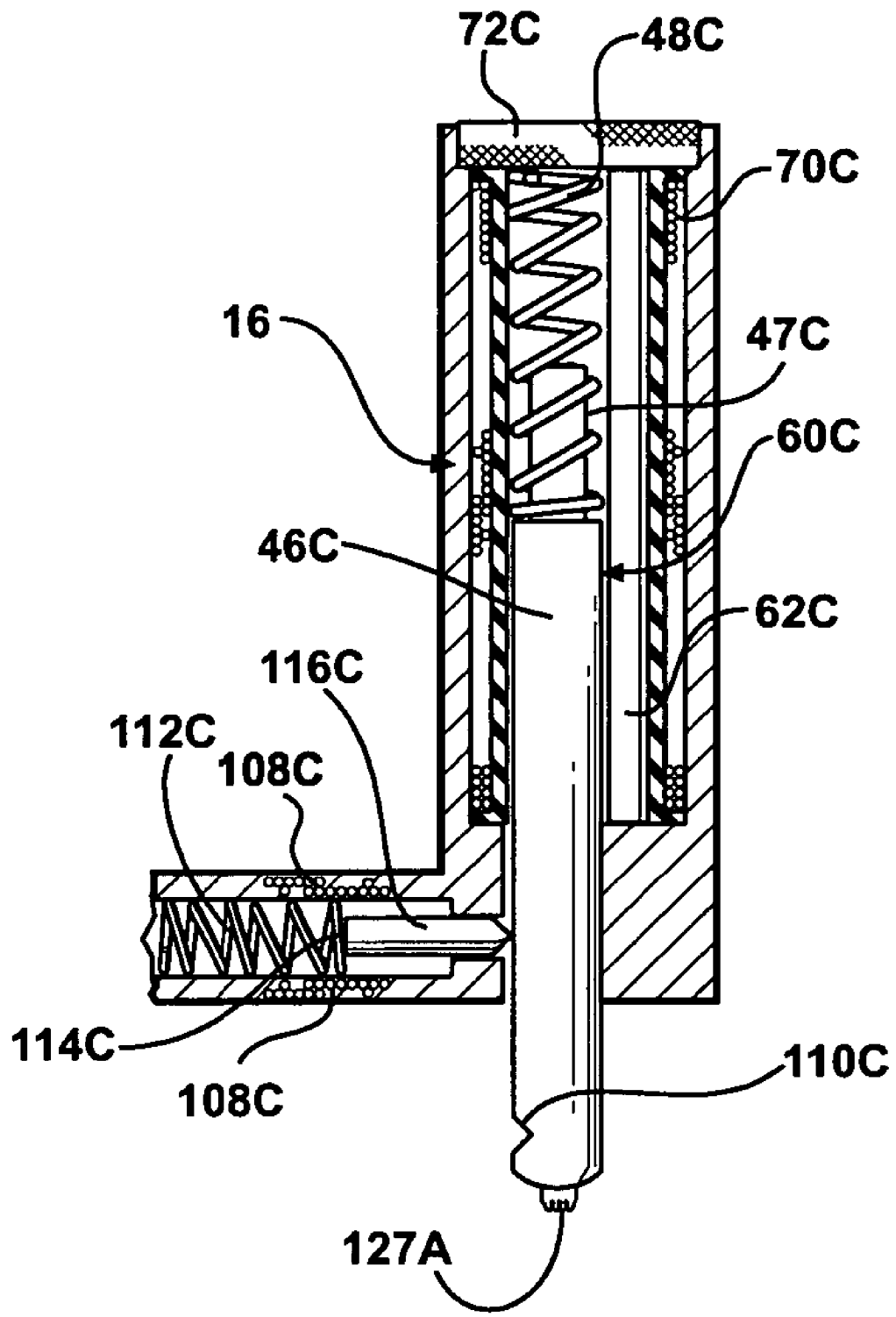
Figures 4, 10B:
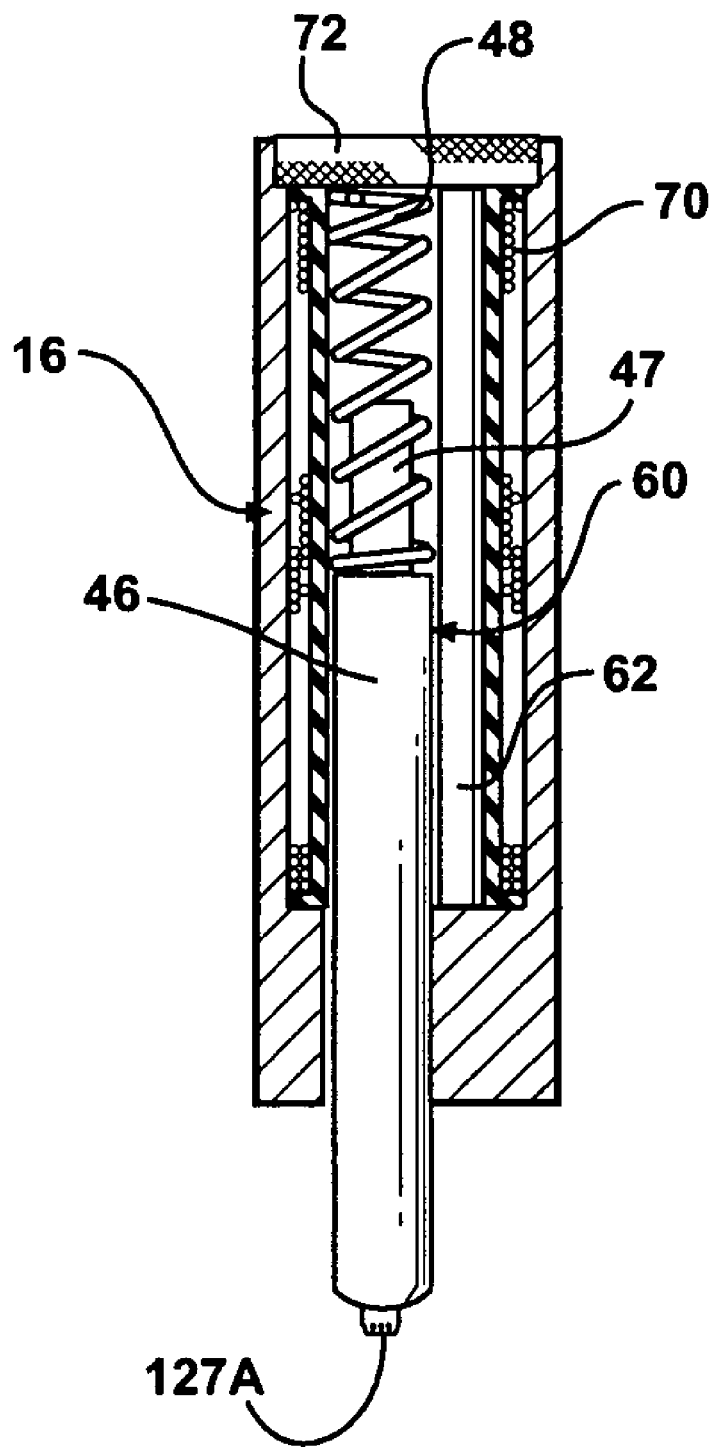
Figures 5, 10B:
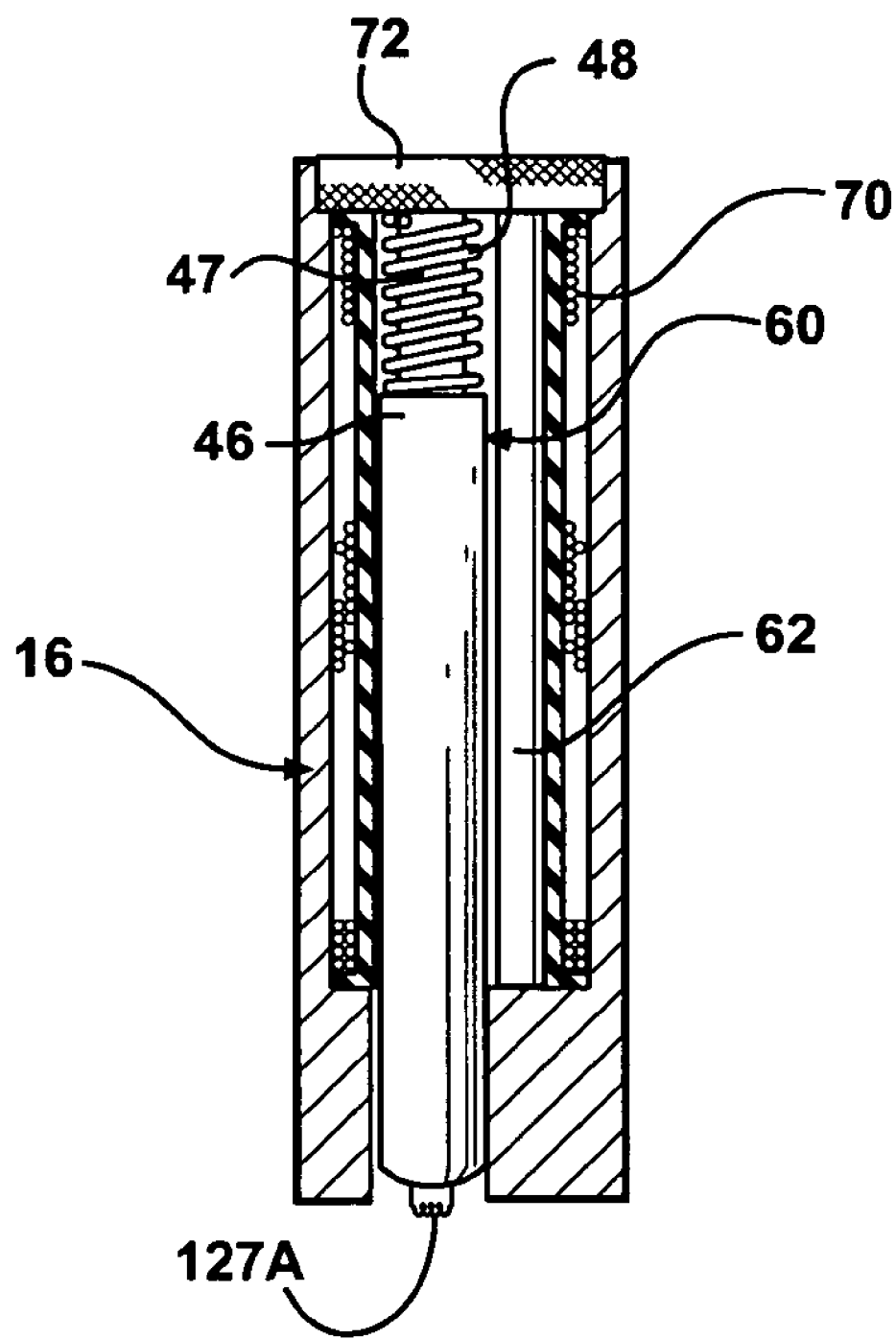

Referring to FIG. 10B-1, the normally retracted marking plunger 46C contains a cavity 126 that contains an electrically controlled heating element 127A that upon being energized and contacting the upper surface of item 14 burns a visible mark 161 on the upper surface of item 14.

c) Laser/Burning Marking Mechanism 127B

Figures 1, 10C:
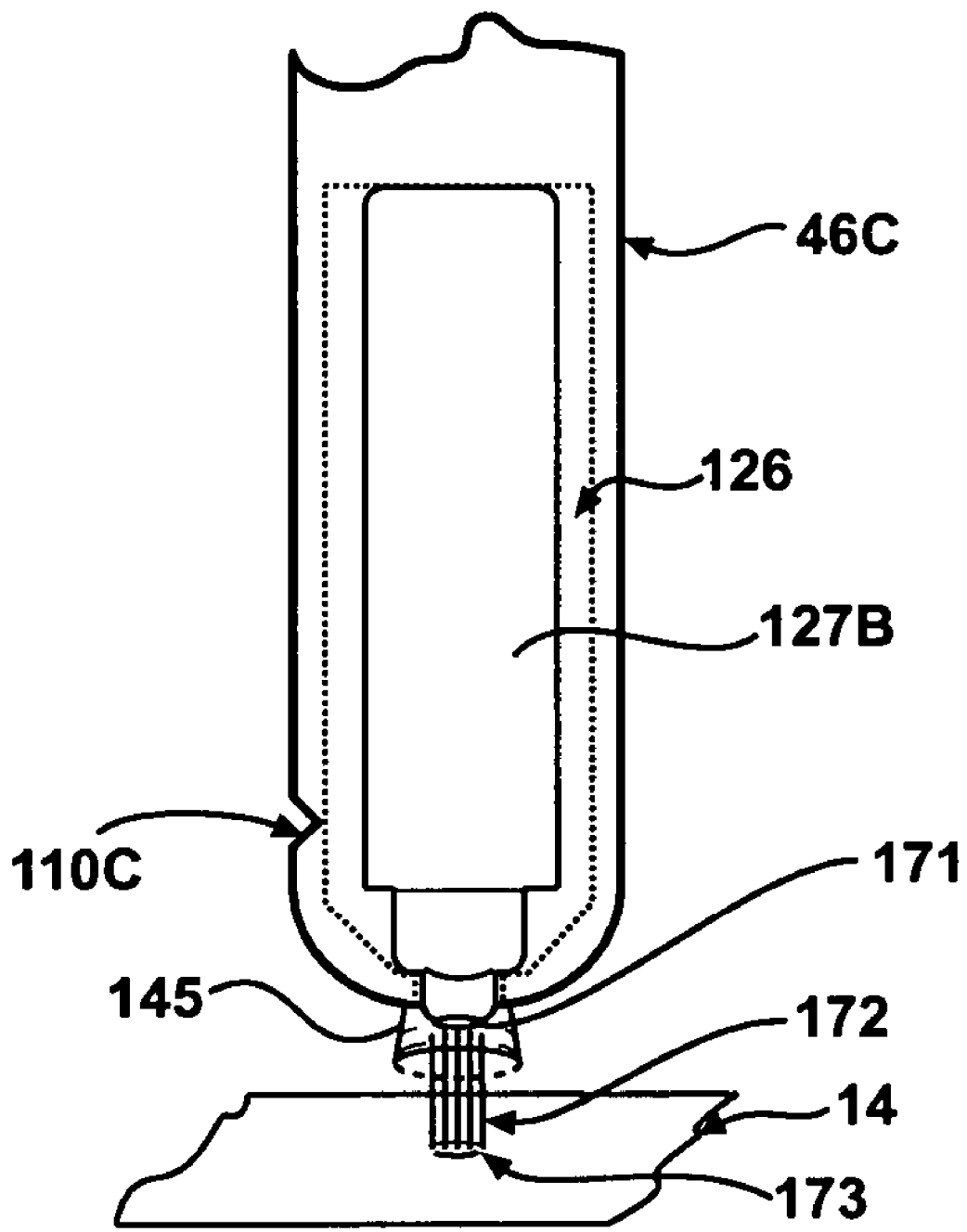
Figures 2, 10C:
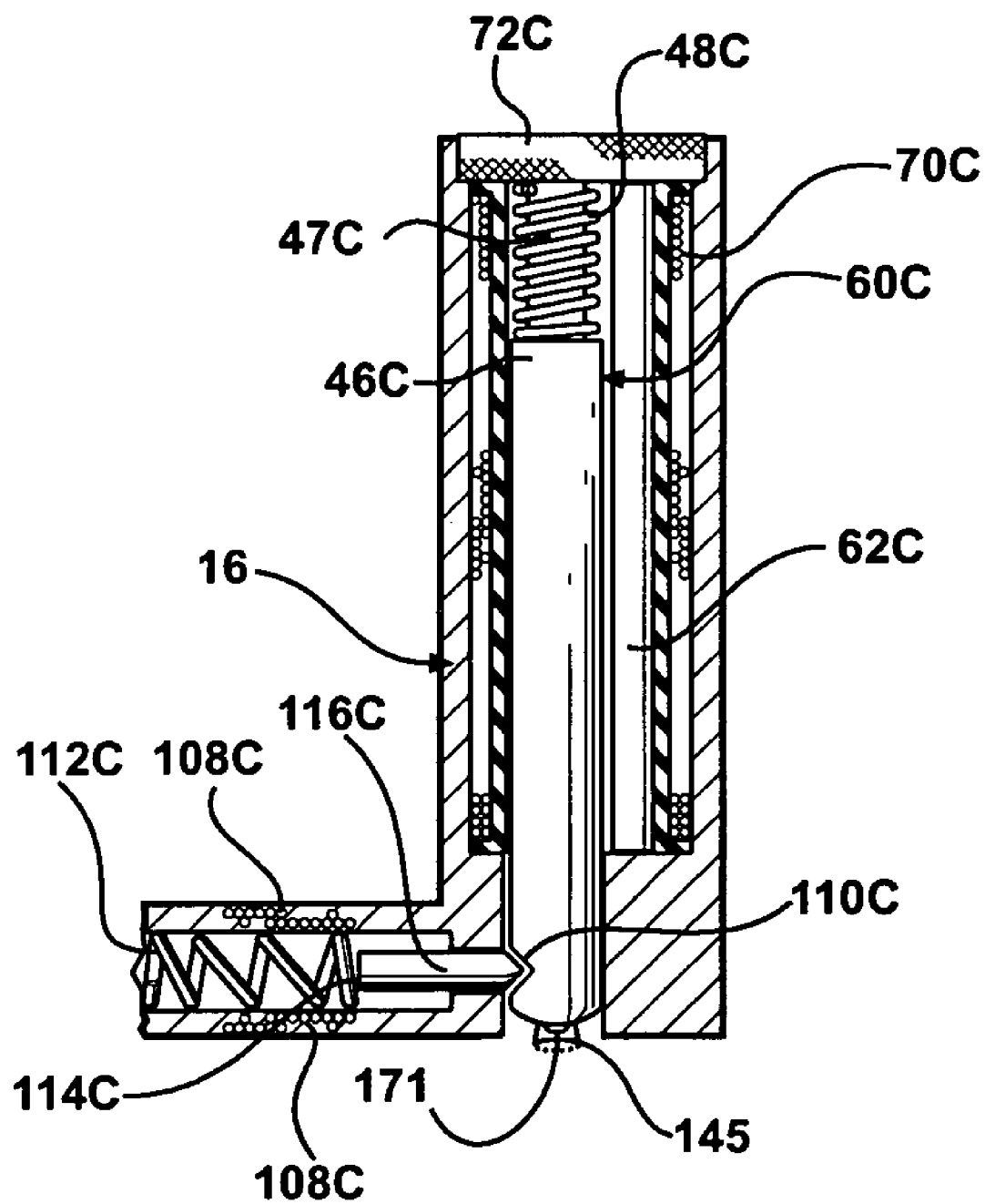
Figures 3, 10C:
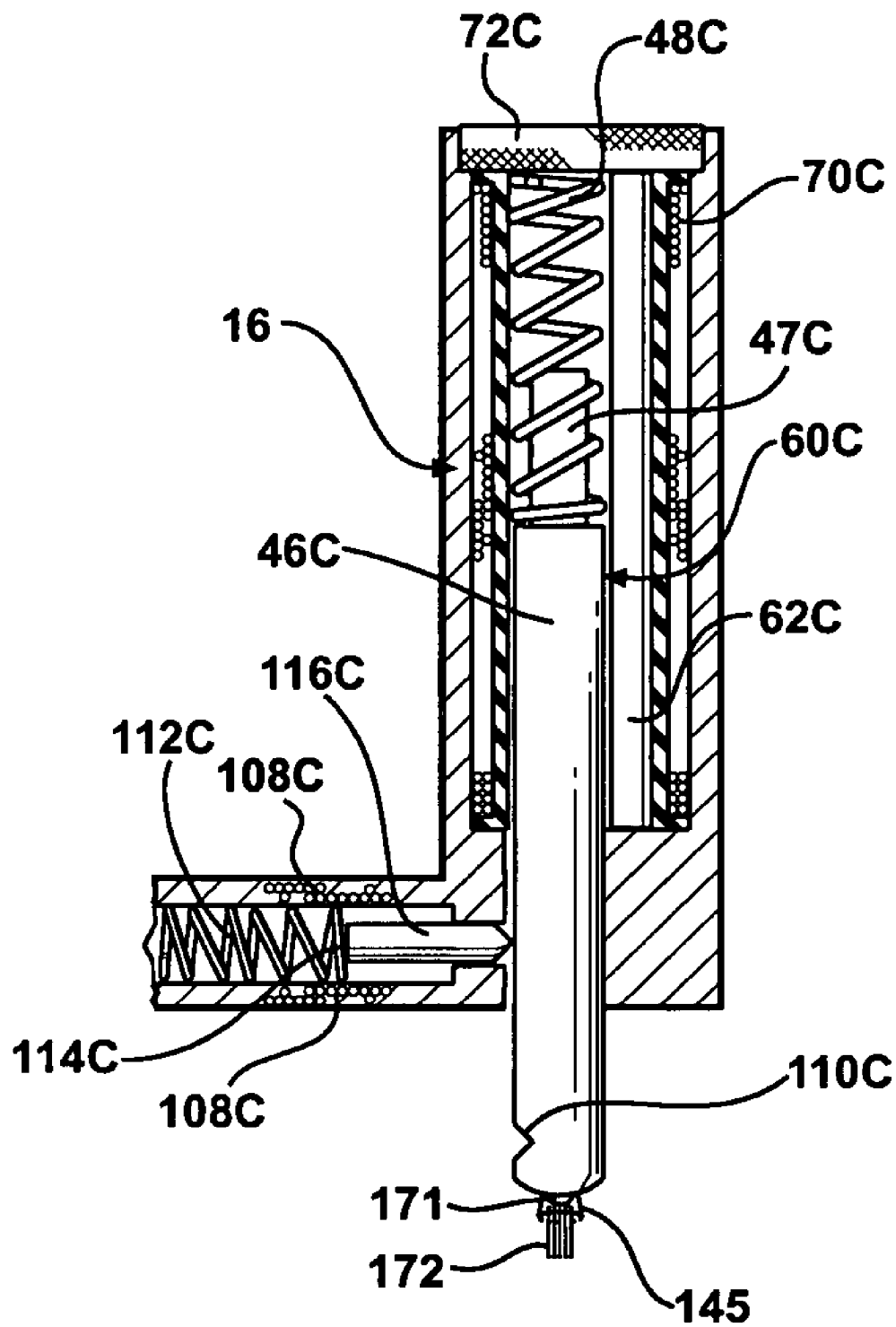
Figures 4, 10C:
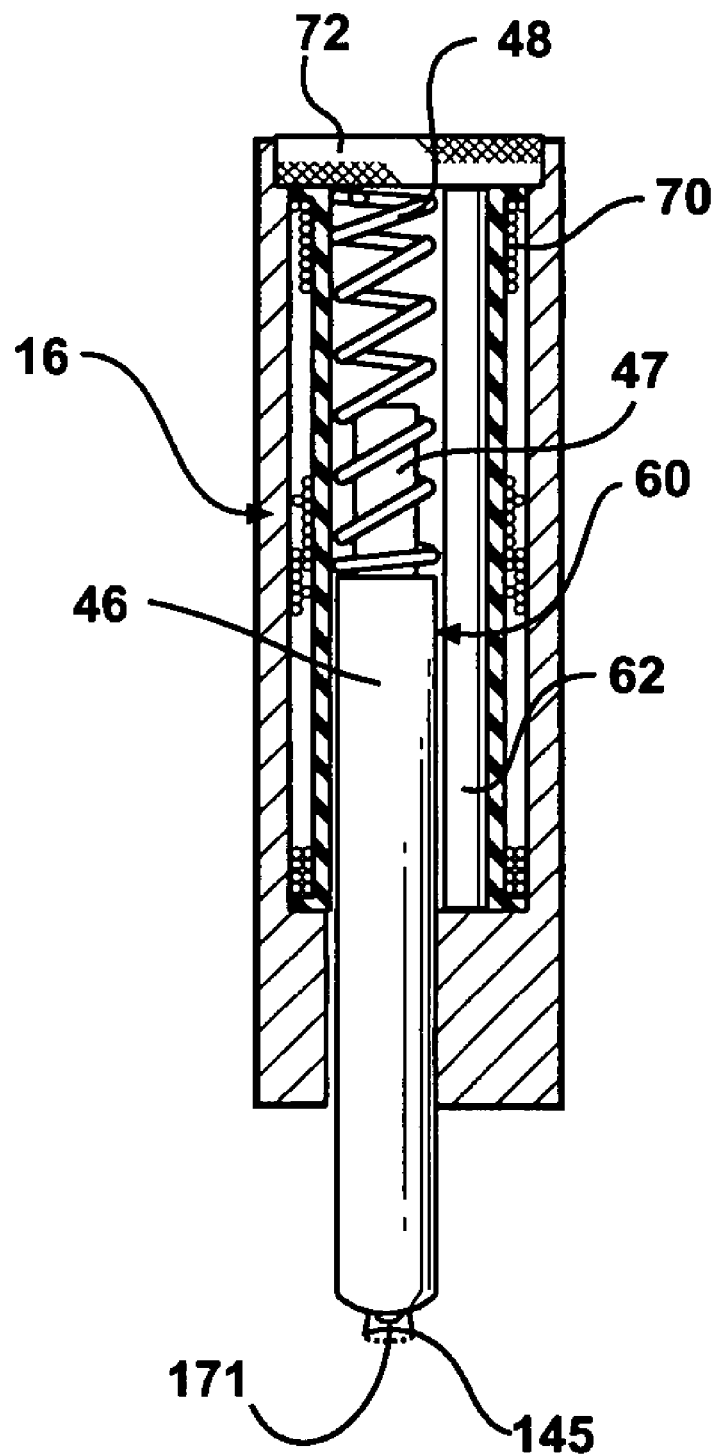
Figures 5, 10C:
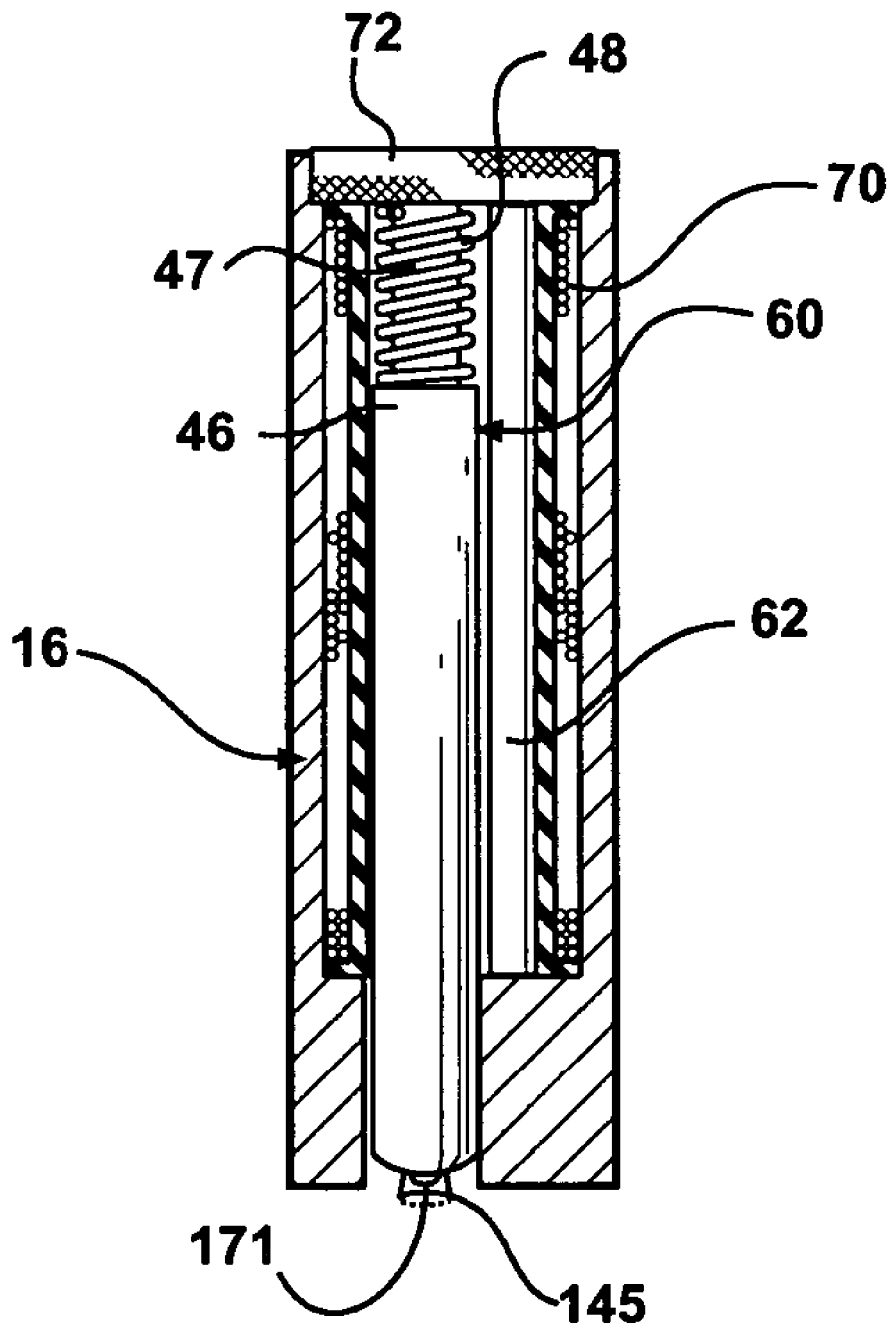
Figures 1, 10D:
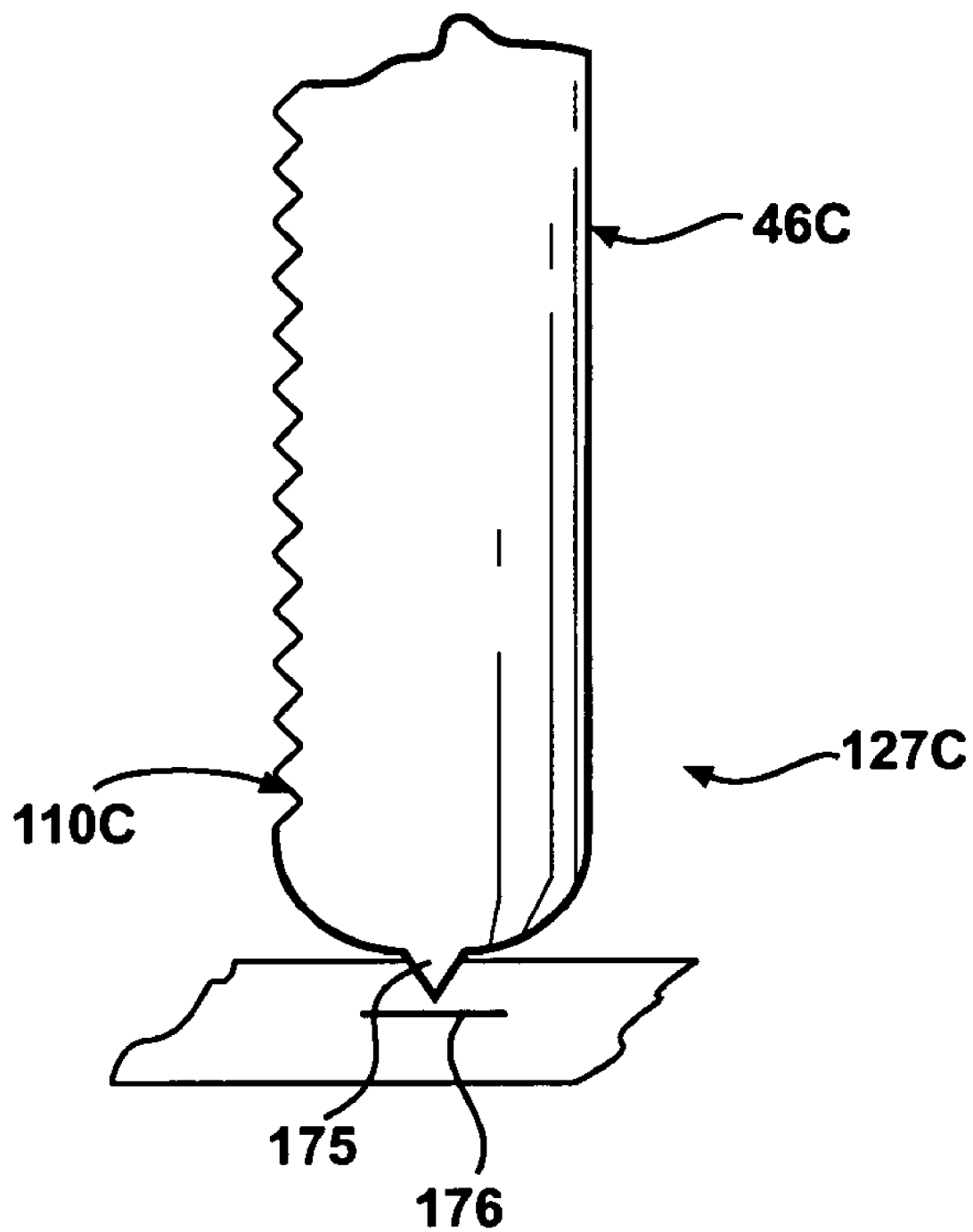
Figures 2, 10D:
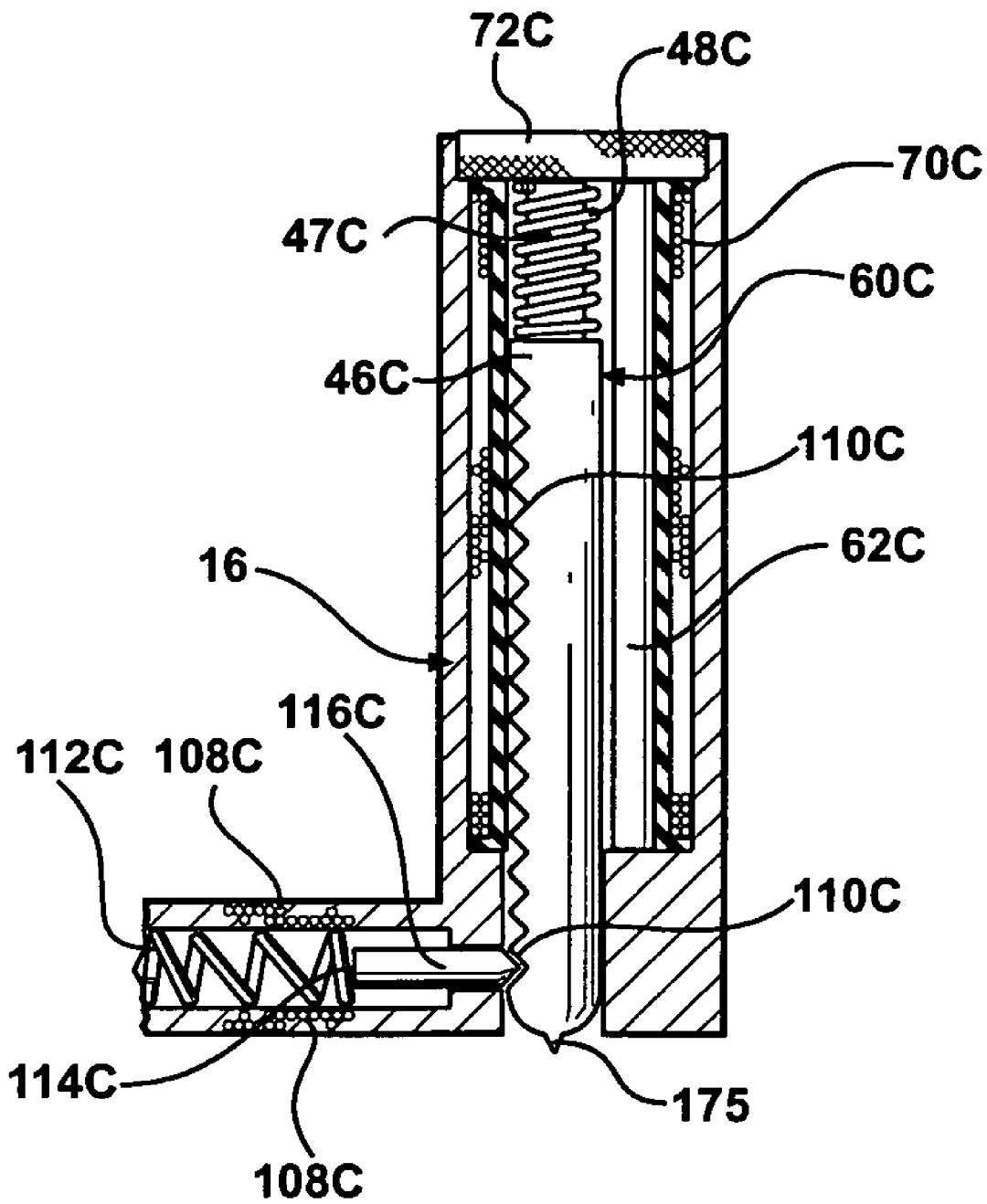
Figures 3, 10D:
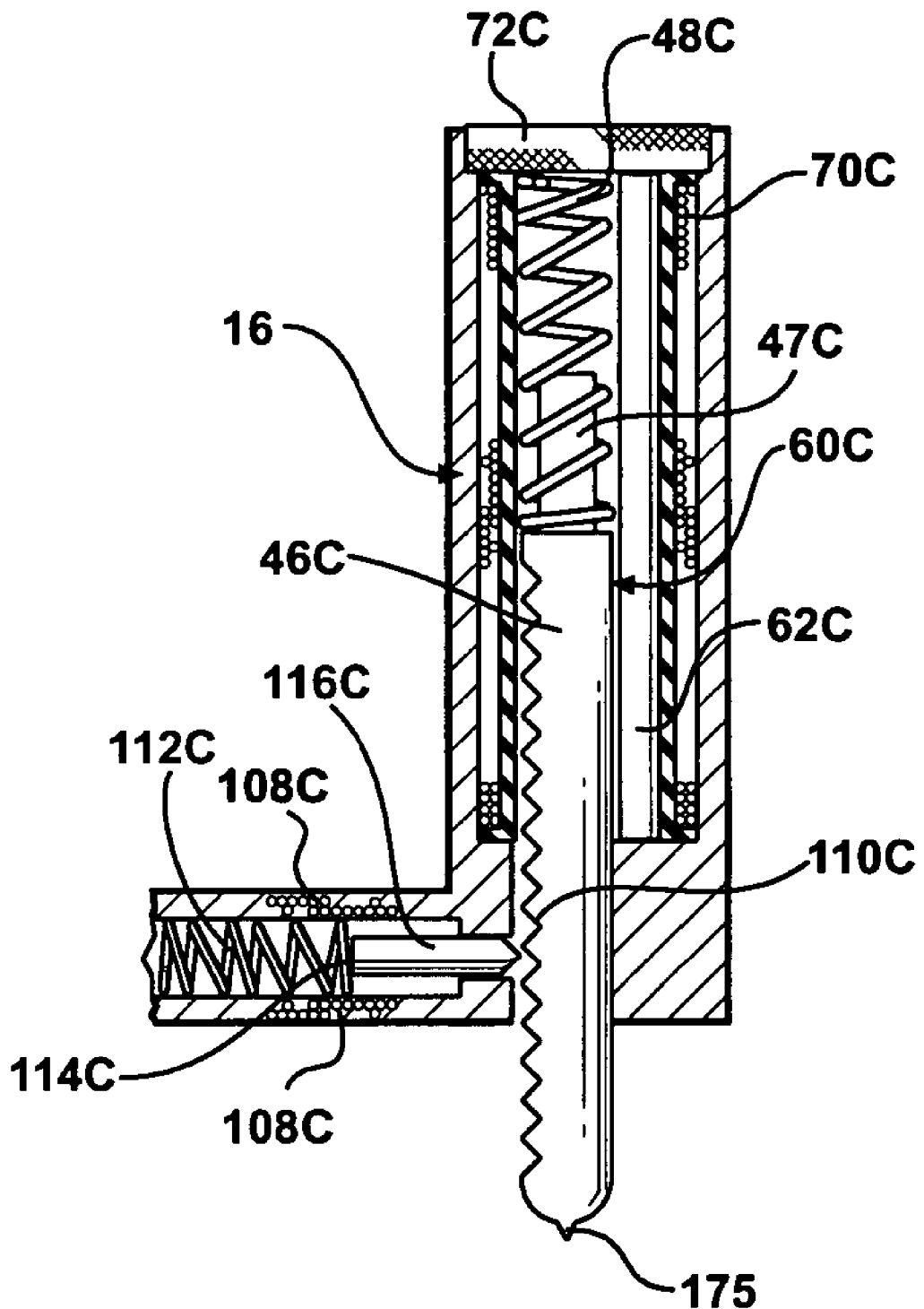
Figures 4, 10D:
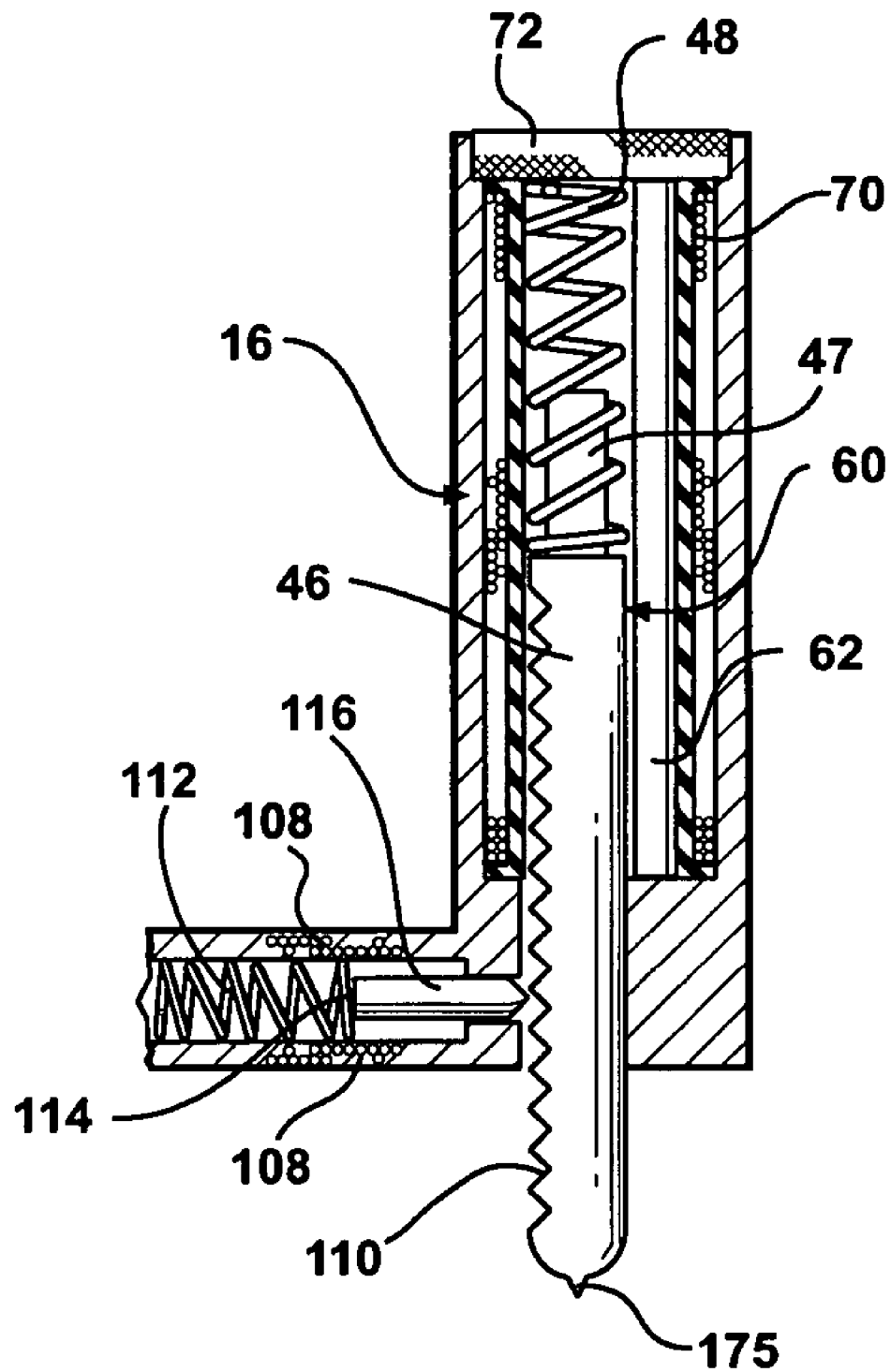
Figures 5, 10D:
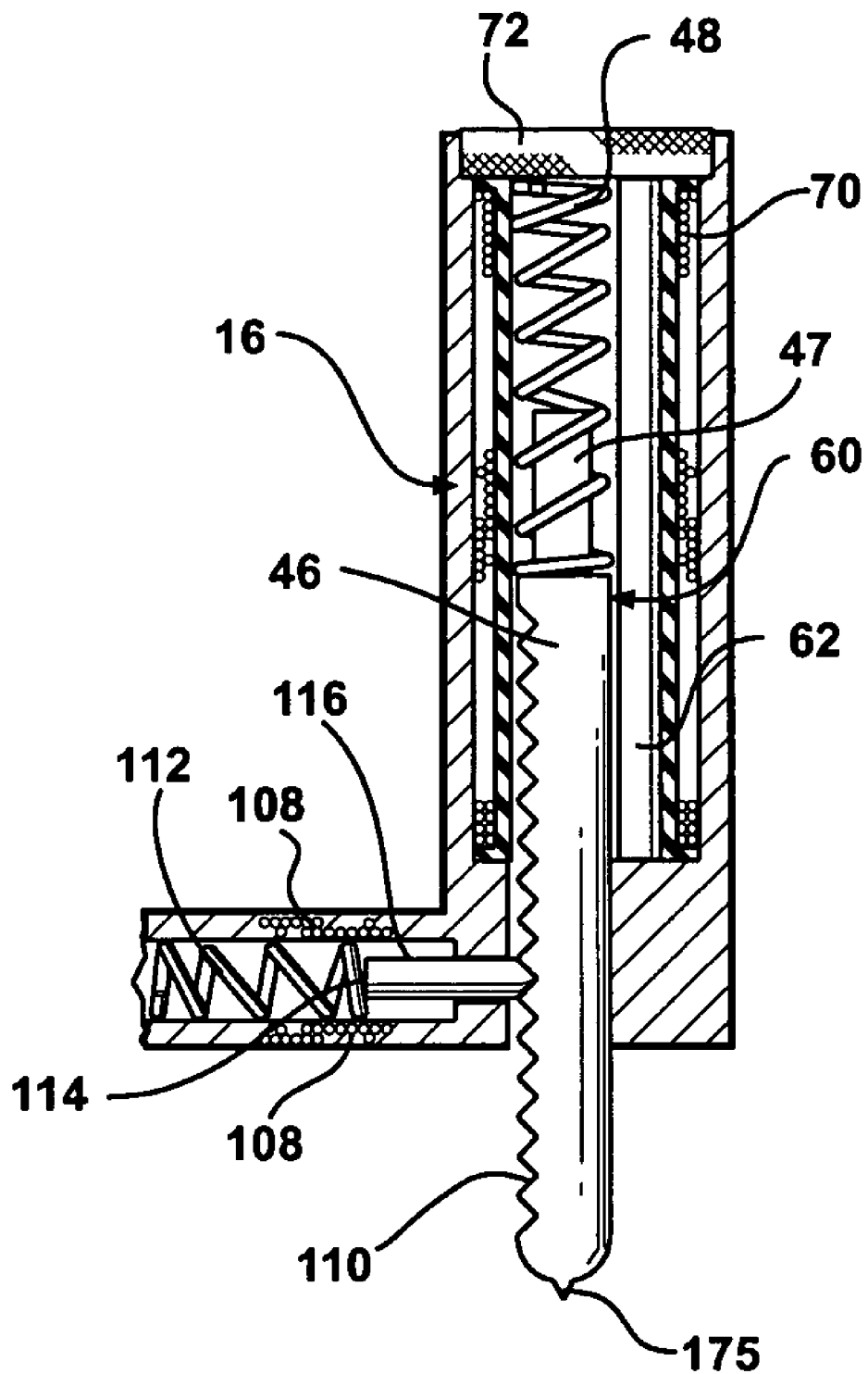

Referring to FIG. 10C-1, the normally retracted marking plunger 46C contains a cavity 126 that contains an electrically controlled laser mechanism 127B that upon being energized emits laser light 172 through focusing lens 171 that burns a visible mark 173 on the upper surface of item 14.

d) Sharp Pointed Marking/Scoring Mechanism 127C

Referring to FIG. 10D-1, the normally retracted marking plunger 46C consists of a marking/scoring mechanism 127C that has at its bottom outside surface a sharp pointed protrusion 175 that upon making contact with and moved bi-directionally (while being progressively lowered) over the item 14 creates a visible score mark 176 on the upper surface of item 14.

As in the above detailed description of the operation of ink dispensing marking mechanisms 127, as the sensor bar 16 traverses the item 14 and the desired segment weight (or cost based on weight) is reached, the operator presses the appropriately designated "mark" pushbutton 56A–56K causing each normally retracted marking plunger 46C to extend downwards (FIGS. 10D-2, 10D-3, 11A, and 11B) and make contact with the upper surface of the item 14.

The surface of some items 14 may be difficult to score or mark due to their hard, rough, slippery, or otherwise non-accommodating surface texture. In these cases, the above described sharp protrusions 175 would not sufficiently penetrate the item 14 surface in order to create a visible score mark. A downward pressure exerted on the sensor bar 16 would not apply additional pressure from the plungers 46C to the item 14 surface as the plungers 46C would automatically raise into the sensor bar 16. By holding the plungers 46C stationary in their final positions, sharp protrusions 175 can easily score any type of item 14 surface with the application of a bi-directional motion and a downward pressure on the sensor bar 16 (causing it to be lowered).

When the above described optical reflection based displacement detector measures the ceasing of downward vertical movement as the marking plungers 46C descend upon the upper surface of the item 14, the signal processor 300 automatically removes the application of electrical current to the side-mounted coil windings 108C resulting in the removal of the compression force that plungers 116C exert on springs 112C. The resultant expansion of the normally expanded springs 112C applies a continued force applied to the base 114C of plungers 116C thus moving side-mounted plungers 116C into the adjacent marking plungers 46C saw-tooth indentations 110C. Each marking plunger 46C is now held stationary in its position on the item 14 upper surface. The application of a bi-directional horizontal motion and a downward pressure on the sensor bar 16 (causing it to be lowered) will provide sufficient force for the sharp protrusions 175 to penetrate the item 14 upper surface, thus scoring/marking the exact cutting line contour onto the item 14 surface.

To retract the marking plungers 46C back into the sensor bar 16 housing, the operator depresses the appropriately designated "retract" button 56A–56K causing the signal processor 300 to apply a brief electrical current to solenoid coil windings 70C and solenoid coil windings 108C. The application of current to solenoid coil windings 108C causes plungers 116C to retract from the holding indentations 110C and compress the normally expanded springs 112C, while the application of current to solenoid coil windings 70C causes marking plungers 46C to be fully retracted into the sensor bar 16 housing as springs 48C compress. Marking plunger stems 47C located at the top portion of marking plungers 46C are held adjacent to permanent magnets 72C by the attractive force of permanent magnets 72C and without further application of electrical current to solenoid coil windings 70C.

When the above described optical reflection based displacement detector measures the ceasing of vertical movement of marking plungers 46C while returning into the sensor bar 16 housing, the signal processor 300 automatically stops the application of electrical current to the side-mounted coil windings 108C resulting in the removal of the compression force that plungers 116C exert on springs 112C. The resultant expansion of the normally expanded springs 112C applies a continued force applied to the base 114C of plungers 116C thus moving side-mounted plungers 116C into the adjacent marking plungers 46C saw-tooth indentations 110C, thus further securing the plungers 46C in their retracted position.

The above described "retract" pushbutton enables the retraction of marking plungers 46C back into the sensor bar 16 at the operator's preferred time. Alternatively, the marking plungers 46C may automatically retract into the sensor bar 16 housing without operator intervention whereby the signal processor 300 automatically initiates the retraction sequence after a predetermined time interval, e.g., 15 seconds from when the marking plungers 46C rest upon the item 14 upper surface. In either case, the display 30 is cleared and the signal processor 300 is readied to perform a new item 14 scan.

After the score marks have been imparted onto the item 14 surface, the operator can cut the item 14 in the most appropriate manner. In the case of sensor bar 16B implementations, the operator first retracts the plungers 46 (FIG. 10D-2) utilizing the appropriate "retract" pushbutton 56A–56K, then aligns the knife 15 on the score marks and cuts the item 14 by and then applying a downward as well as a back and forth motion on the sensor bar 16B. Alternatively, a separate knife may be employed to cut the item 14 along the score marks.

As the use of sharp pointed marking/scoring mechanism 127C requires that the sensor bar 16 move bi-directionally in a sawing motion over the item 14, the implementation of this specific marking/scoring mechanism is suited to sensor bars 16 similar to the configuration illustrated in FIG. 1 as compared to those of FIG. 2A.

For applications that operate only on soft easily penetrated items 14, the use of the knife 15 as a cutting or scoring tool is not necessary and it can simply be detached. In these cases, the sharp-ended protrusions 175 cut (versus only score) the item 14 into the desired portion.

As the use of sharp pointed marking/scoring mechanism 127C requires that the sensor bar 16 move bi-directionally in a sawing motion over the item 14, the implementation of this specific marking/scoring mechanism is suited to sensor bars 16 resembling the configuration illustrated in FIG. 1 as compared to those of FIG. 2A.

The preceding section described ink dispensing marking mechanisms as well as marking/scoring mechanisms based on thermal/burning electric elements, laser burning emitters, and sharp-ended solenoid plungers. These marking mechanisms were all incorporated inside two or more normally retracted dedicated marking plungers 46C that are located in-between and parallel to the positions of height sensors 38. For sensor bars 16B utilizing mechanical height sensor plungers 46, the above described marking mechanisms can be incorporated inside two or more normally extended height sensor plungers 46 while still enabling the plungers 46 to perform their height determination functions. The base (bottom portion) of the marking mechanism thus becomes the base (bottom portion) of the plunger 46 for height calculation purposes. The following section describes this implementation of various marking mechanisms:

II) Height Sensor Plungers 46—Incorporating Marking/Scoring Mechanisms a) Ink Dispensing Marking Mechanism 127

FIG. 10A-4 illustrates a normally extended height sensor plunger 46 that contains an ink dispensing marking mechanism 127 whose components and operation were detailed in the above description of FIG. 10A-1. As the sensor bar 16B traverses the item 14, all height sensor plungers 46 are in contact with the item 14 surface. When the position of the desired segment weight (or cost based on weight) is reached, the operator presses the appropriate "marking" pushbutton 56A–56K causing electrical power to be applied to each ink dispensing mechanism 127 resulting in ink being expelled through nozzle 132 onto the upper surface of item 14 thus forming an ink mark. The cone shaped collar 145 separates the ink dispensing nozzle 132 from the upper surface of item 14, thus reducing the opportunity of possible item 14 surface debris from obstructing the operation of nozzle 132.

After the score marks have been imparted onto the item 14 surface, the operator can cut the item 14 in the most appropriate manner. In the case of sensor bar 16B implementations, the operator first retracts the plungers 46 by depressing the appropriate "retract" pushbutton 56A–56K.

Referring to FIGS. 10A-4 and 10A-5, a brief pulse of electric power is applied to each solenoid coil windings 70 resulting in the complete retraction of all plungers 46 into the sensor bar 16B, thus compressing spring 48 to bring the stem 47 of plunger 46 against a permanent magnet 72. Each stem 47 of plunger 46 becomes "latched" (held adjacent) to the permanent magnet 72 solely due to the attractive force of the permanent magnet 72 and without further application of electric power. The operator then aligns the knife 15 on the score marks and cuts the item 14 by applying a downward as well as a back and forth motion on the sensor bar 16B.

Alternatively, a separate knife may be employed to cut the item 14 along the score marks. In the case of sensor bar 16A implementations as illustrated in FIGS. 2A, 2B, 2C, and 2D, the cutting tool (separate knife, rotary cutting blade, guillotine chopping blade, laser cutter, etc) is aligned on the score marks whereupon the item 14 is cut.

The aforementioned normally extended height sensor plungers 46 incorporated an ink dispensing mechanism 127 (FIG. 10A-1) as its marking/scoring device. As described below, many other (non-ink dispensing) types of marking/scoring mechanisms may be incorporated into height sensor plungers 46 such as (but not limited to) thermal/burning heating elements (FIG. 10B-1), laser burning emitters (FIG. 10C-1), and sharp-ended scoring devices (FIG. 10D-1). The implementation of these additional marking/scoring mechanisms is similar to that of the ink dispensing mechanism just described. Thus, the activation and retraction of the height sensor plungers 46 and associated marking mechanisms ensures the accurate placement of score marks which indicate the position of the exact cutting line used to precisely portion the item 14.

b) Thermal/Burning Marking Mechanism 127A

FIG. 10B-4 illustrates a normally extended height sensor plunger 46 that contains a thermal/burning marking/scoring mechanism 127A whose components and operation were detailed in the above description of FIG. 10B-1. As the sensor bar 16B traverses the item 14, all height sensor plungers 46 are in contact with the item 14 surface. When the position of the desired segment weight (or cost based on weight) is reached, the operator presses the appropriate "marking" pushbutton 56A–56K causing electrical power to be applied to each heating element 127A resulting in a visible burn mark formed on the upper surface of item 14.

After the score marks have been imparted onto the item 14 surface, the operator can cut the item 14 in the most appropriate manner. In the case of sensor bar 16B implementations, the operator first retracts the plungers 46 (FIG. 10B-5) utilizing the appropriate "retract" pushbutton 56A–56K, then aligns the knife 15 on the score marks and cuts the item 14 by applying a downward as well as a back and forth motion on the sensor bar 16B. Alternatively, a separate knife may be employed to cut the item 14 along the score marks. In the case of sensor bar 16A implementations as illustrated in FIGS. 2A, 2B, 2C, and 2D, the cutting tool (separate knife, rotary cutting blade, guillotine chopping blade, laser cutter, etc) is aligned on the score marks whereupon the item 14 is cut.

c) Laser Burning/Scoring Mechanism 127B

FIG. 10C-4 illustrates a normally extended height sensor plunger 46 that contains a laser burning/scoring 127B whose components and operation were detailed in the above description of FIG. 10C-1. As the sensor bar 16B traverses the item 14, all height sensor plungers 46 are in contact with the item 14 surface. When the position of the desired segment weight (or cost based on weight) is reached, the operator presses the appropriate "marking" pushbutton 56A–56K causing electrical power to be applied to each laser burning/scoring mechanism 127B resulting in a visible burn mark formed on the upper surface of item 14. The cone shaped collar 145 separates the focusing lens 171 from the upper surface of item 14, thus reducing the opportunity of possible item 14 surface debris from obstructing the operation of lens 171.

After the score marks have been imparted onto the item 14 surface, the operator can cut the item 14 in the most appropriate manner. In the case of sensor bar 16B implementations, the operator first retracts the plungers 46 (FIG. 10C-5) utilizing the appropriate "retract" pushbutton 56A–56K, then aligns the knife 15 on the score marks and cuts the item 14 by and then applying a downward as well as a back and forth motion on the sensor bar 16B. Alternatively, a separate knife may be employed to cut the item 14 along the score marks. In the case of sensor bar 16A implementations as illustrated in FIGS. 2A, 2B, 2C, and 2D, the cutting tool (separate knife, rotary cutting blade, guillotine chopping blade, laser cutter, etc) is aligned on the score marks whereupon the item 14 is cut.

d) Sharp Pointed Marking/Scoring Mechanism 127C

FIG. 10D-4 illustrates a normally extended height sensor plunger 46 that consists of a marking/scoring mechanism 127C whose components and operation were detailed in the above description of FIG. 10D-1.

The surface of some items 14 may be difficult to score or mark due to their hard, rough, slippery, or otherwise non-accommodating surface texture. In these cases, the above described sharp protrusions 175 would not sufficiently penetrate the item 14 surface in order to create a visible score mark. A downward pressure exerted on the sensor bar 16B would not apply additional pressure from the marking plungers 46 to the item 14 surface as the marking plungers 46 would automatically raise into the sensor bar 16B. By holding the marking plungers 46 stationary in their final positions, sharp protrusions 175 can easily score any type of item 14 surface with the application of a bi-directional motion and a downward pressure on the sensor bar 16B (causing it to be lowered).

Referring to FIGS. 10D-4 and 10D-5, as the sensor bar 16B traverses the item 14, all plungers 46 are in contact with the item 14 surface. When the desired segment weight (or cost based on weight) is reached, the operator presses the appropriately designated "mark" pushbutton 56A–56K causing the signal processor 300 to initiate the application of electrical current to the side-mounted coil windings 108 resulting in the engagement of the side-mounted plungers 116 into the adjacent plungers 46 saw-tooth indentations 110 and the corresponding expansion off the normally compressed springs 112 resulting in continued force applied to the base 114 of plungers 116 thus further securing plungers 116 in their engaged position in indentations 110 of marking plungers 46. This causes each marking plunger 46 to be held stationary in its position on the item 14 upper surface. The application of a bi-directional horizontal motion and a downward pressure on the sensor bar 16B (causing it to be lowered) will provide sufficient force for the sharp protrusions 175 to penetrate the item 14 upper surface, thus scoring/marking the exact cutting line contour onto the item 14 surface.

To disengage the plungers 46 from their vertically fixed position, the operator depresses the appropriately designated "release" button 56A–56K causing the signal processor 300 to terminate the application of electrical current to side-mounted plunger solenoid coil windings 108 thus removing the pulling force causing the expansion of springs 112. This results in the automatic compression of the normally compressed springs 112 which causes the disengagement of plungers 116 from indentations 110 of marking plungers 46. Plungers 46 are thus no longer held in their fixed vertical position by plungers 116.

The above described "release" pushbutton releases marking plungers 46 from their fixed vertical position at the operator's preferred time. Alternatively, the marking plungers 46 may automatically release from their static position without operator intervention by having the signal processor 300 automatically initiate the retraction sequence after a pre-determined time interval, e.g., 15 seconds after the plungers 46 were secured in their vertical positions. In either case, the signal processor 300 clears display 30 and is readied to perform a new item 14 scan.

After the score marks have been imparted onto the item 14 surface, the operator can cut the item 14 in the most appropriate manner. In the case of sensor bar 16B implementations, the operator first retracts the plungers 46 (FIG. 10D-5) utilizing the appropriate "retract" pushbutton 56A–56K, then aligns the knife 15 on the score marks and cuts the item 14 by and then applying a downward as well as a back and forth motion on the sensor bar 16B. Alternatively, a separate knife may be employed to cut the item 14 along the score marks.

As the use of sharp pointed marking/scoring mechanism 127C requires that the sensor bar 16B move bi-directionally in a sawing motion over the item 14, the implementation of this specific marking/scoring mechanism is suited to sensor bars similar to the configuration illustrated in FIG. 1 as compared to those of FIG. 2A.

For applications that operate only on soft easily penetrated items 14, the use of the knife 15 as a cutting or scoring tool is not necessary and it can simply be detached. In these cases, the sharp-ended protrusions 175 cut (versus only score) the item 14 into the desired portion.

Dedicated Marking/Scoring Sensor Bar

FIG. 5 illustrates a stabilized four support post sensor bar 16 configuration used for marking/scoring an item 14 on the precise cutting line used to cut the item 14 at a desired weight (or cost based on weight). The sensor bar 16 depicted in FIG. 5 is constructed of a clear see-through material enabling the operator to view the item 14 through the sensor bar 16 as the sensor bar 16 traverses the item 14. Once marked/scored, a separate knife (not shown) may be used to cut the selected item segment. As each of the four support posts has the same height, the sensor bar 16 is constrained in a level horizontal position. This configuration helps eliminate inexperienced operators from introducing unwanted sensor bar orientations as the item 14 is traversed.

Again referring to FIG. 5, displacement detectors 20A, 22A associated with each support post 20, 22, produce signals corresponding to the displacement of the sensor bar 16 while being stroked over the item 14. Support posts 52Y do not contain displacement detectors and are employed solely to provide a horizontally stable sensor bar 16 configuration. A linear array of height sensors 38 generates electronic signals corresponding to the height of points on the upper surface of the item 14 lying below the respective sensor 38. A knife blade is not incorporated into this sensor bar configuration, therefore none of the four support posts are retractable.

As the sensor bar 16 traverses the item 14, the weight (or cost based on weight) of the item 14 is continuously displayed on screen 30. When the position of the desired weight (or cost) is reached, the operator depresses one of the appropriately designated "mark" pushbuttons 56A–56K to control the application of electrical power to the marking/scoring devices. The activated scoring/marking devices place physical marks on the item 14 upper surface indicating the exact location where the item 14 should be cut in order to produce a portion of the desired weight (or cost). Many different marking/scoring technologies may be employed such as (but not limited to) ink deposition, heating/burning element marking, laser scoring, and sharp pointed implements used to penetrate and mark the item 14 surface. After the item 14 has been marked/scored, the operator uses a separate knife or cutting tool to cut along the score marks to produce an item 14 portion of the desired weight (or cost).

Wireless Communication Between Sensor Bars and External Devices

Figure 1A:
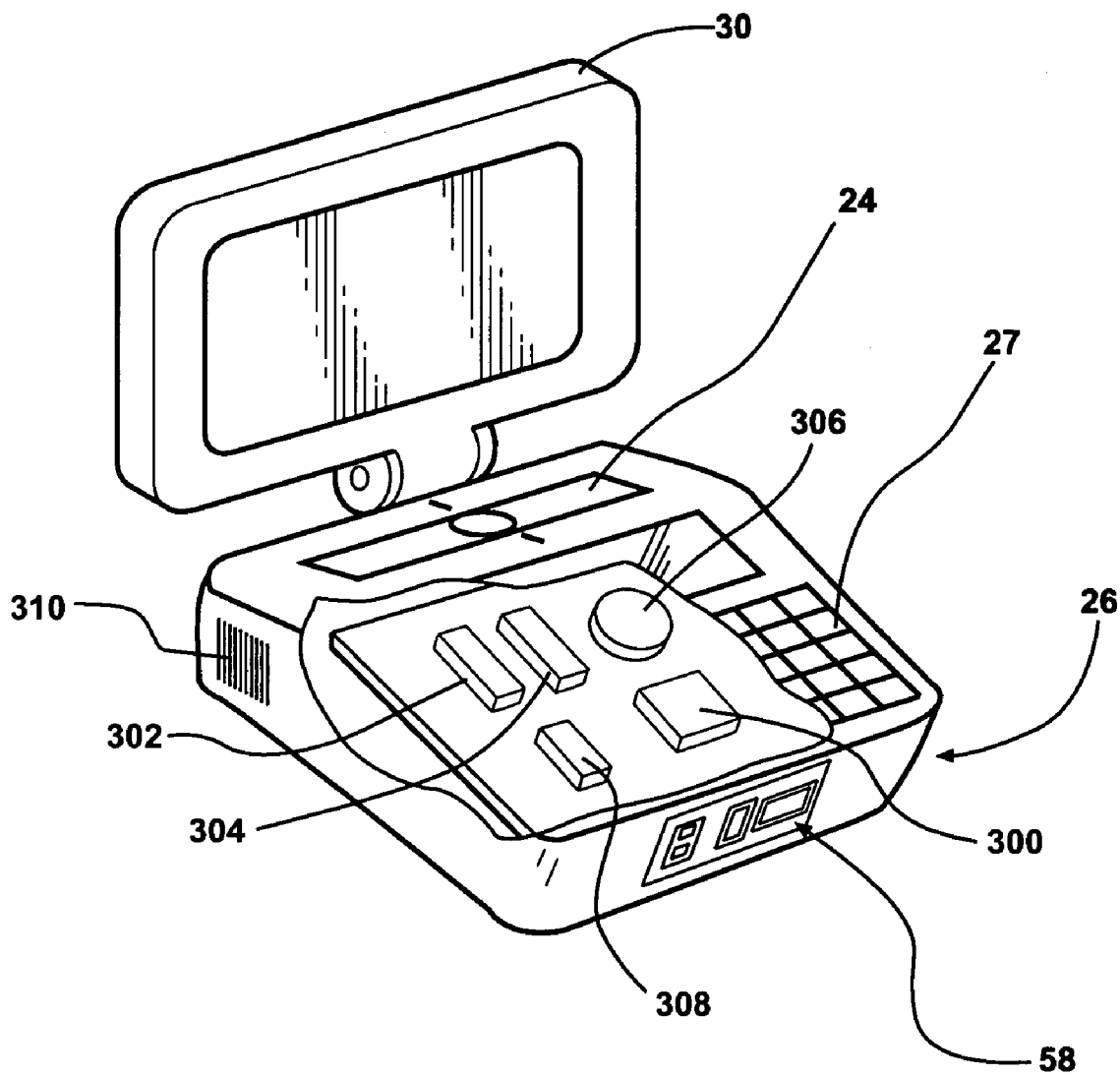
FIG. 1A is an enlarged pictorial view of a control case component of the apparatus shown in FIG. 1 partially broken away to show internal components thereof.
Figure 1B:
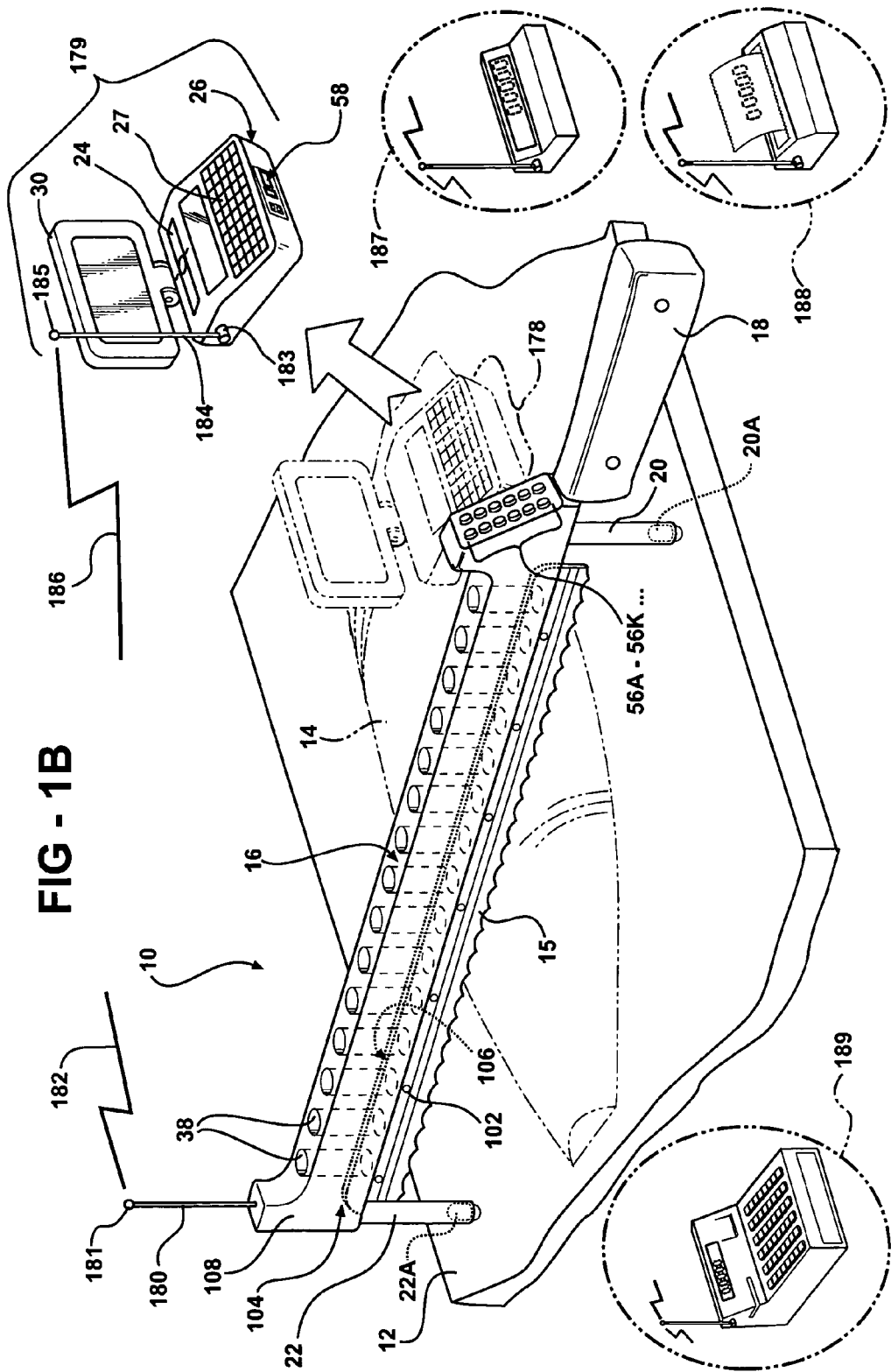
FIG. 1B is a partially exploded view of another embodiment of an apparatus according to the present invention with an item to be segmented shown in phantom lines in position on a supporting table surface shown in fragmentary form.

As illustrated in FIG. 1B, the operator may interact with sensor bar 16 via pushbuttons 56A–56K, as well as controller 178. This figure shows that by utilizing an infrared, radio frequency, or other wireless interface, controller 178 (original position) may be detached from sensor bar 16 and moved to a new position (denoted by label 179) whereby the controller may interact with the sensor bar 16 from a distance. Furthermore, wireless peripheral devices such as customer Point-Of-Sale (POS) displays 187, receipt printers 188, cash registers 189, and computer controlled inventory systems (not shown) may similarly communicate with each other. Such configurations enable a modular approach to designing measurement based systems that can be customized to varied applications. Detaching controller 178 from the sensor bar 16 housing also confers a lighter weight sensor bar 16 and provides for less chance of sensor bar 16 damage due to rough handling or cleaning regimens.

Again, referring to FIG. 1B, sensor bar 16 has at its distal end (in relation to the operator) a vertically mounted rod-like structure 180. For an infrared based wireless interface, structure 180 is a hollow tube containing electrical wires that originate from the sensor bar 16 embedded wireless communications module 308 (FIG. 1A). At the top of structure 180, such wires are attached to an omni-directional infrared emitter/receiver array 181 comprised of, e.g., LED infrared emitters and photosensitive receivers. Infrared array 181 bi-directionally communicates via infrared signals 182 with controller 179 (and optionally other devices). Similarly, controller 179 communicates via vertically mounted hollow rod-like structure 184 which is attached to an omni-directional infrared emitter/receiver array 185 comprised of, e.g., LED infrared emitters and photosensitive receiving elements. Structure 184 is connected via connector 183 to a wireless communications module 308 contained within case 26.

For a radio frequency based wireless interface, structures 180 and 181 comprise an antenna connected at its base to electrical wires that originate from the sensor bar 16 embedded wireless communications module 308. The antenna bi-directionally communicates via electromagnetic signals 182 to controller 179 (and optionally other devices). Similarly, controller 179 communicates via structures 184 and 185 which comprise an antenna attached via connector 183 to a wireless communications module 308 contained within case 26.

The above referenced sensor bar 16 transmitter/receiver interface (e.g., infrared or radio frequency) may be embedded into various locations within the sensor bar 16 such as in a hollowed-out handle 18, within the vertical protrusion at the distal end (in relation to the operator) of the sensor bar 16, adjacent to the height sensors 38, and/or under pushbuttons 56A–56K.

Although the above described implementation of wireless devices was presented in relation to sensor bar 16, the same operational and technical principles are applicable to all other sensor arms described in this application.

As previously described, the controller 178 (or 179) interface 58 also contains I/O (input/output) ports such as USB and infrared. The interface 58 infrared ports enable bi-directional communication between the controller 178 (or 179) and other devices that are positioned within a "line-of-sight" of the interface 58 as compared to the more flexible omni-directional array 181 (or 185) that contains multiple infrared emitters and receivers positioned in numerous orientations enabling the transmission and receiving of infrared signals from a variety of differently orientated (positioned) devices.

Additional Features of Ink Dispensing Mechanisms 127 (FIG. 10A-1)

Segmenting applications (whether food or non-food) often involve different types of items 14 whose surface colors vary considerably, e.g., red fish filets, white fish filets, or dark blue fish filets. Currently available ink dispensing technologies based on the already described piezoelectric and thermal bubble mechanisms enable the controlled simultaneous discharge of multiple colors of ink that when combined together form virtually any color. A pre-programmed look-up table containing specific item 14 types, colors, and corresponding high contrast (and hence highly visible) marking colors is stored in the signal processor 300 memory. As the operator indicates via the keypad 27 the specific type of item 14 to be processed, the sensor bar 16 signal processor 300 automatically selects an appropriate ink from the look-up table that ensures high visibility score marks against the item 14 surface colors and sends appropriate electrical signals to the ink dispensing mechanism 127. Thus, when segmenting a light colored fish filet, dark colored ink would be employed. The operator has the ability to override pre-selected colors and use alternative colors by entering preferences via keypad 27.

The above described selection of the optimally visible ink color for the specific item 14 being marked can be entirely automated thus eliminating both operator intervention and the use of item specific pre-stored color look-up tables. Along the underside of the sensor bar 16B that contains the height sensors 38, a photosensitive CCD sensor 75 (FIG. 4) is installed facing downward towards the upper surface of the item 14. When an operator depresses the appropriately designated "mark" pushbutton 56A–56K, this sensor analyzes an image of the item 14 upper surface to determine its color characteristics, whereupon the sensor bar 16B signal processor 300 utilizes a non item specific color look-up table to select the most contrasting/visible marking color. The signal processor 300 then sends electrical signals to ink mechanism 127s specifying the color to be applied to the item 14 surface.

For food segmenting applications, non-toxic inks are employed. For non-food applications, various inks such as (but not limited to) indelible, removable, fluorescent, or magnetic may be employed. The use of "interactive" marking inks such as (but not limited to) fluorescent or magnetic may be used so that after the item 14 is marked, sensors can detect the marks positions and instruct automated cutting tools where to perform the final cutting. Various automated cutting tools such as (but not limited to) automatic chopping blades, lasers, rotary blades, and high-pressure water cutters may be employed to perform the final segmenting cuts.

Accuracy Considerations

The sensor bar 16 determined volume of each item 14 segment traversed is multiplied by a density factor for the particular item type to arrive at segment weight values for each position of the sensor bar 16 in its stroke. The accuracy of sensor bar 16 determined weights can easily be verified by weighing a sample item 14 with a traditional calibration scale and comparing the result to the weight determined by the sensor bar 16.

Additionally, the sensor bar 16 can scan pre-made "calibration molds" of various contours and pre-determined weights and volumes to verify the overall accuracy of the sensor bar 16 as well as to interact with built-in diagnostic software to test and calibrate individual sensor components to certify that they are functioning properly and are operating within specified tolerances.

Calibration of the sensor bar 16 for a specific item 14 material is accomplished by adjusting the density value for the specific item 14 material stored in the memory of the signal processor 300. The operator interacts via the control panel keyboard 27 and associated control panel display with a built-in calibration software program by entering the item 14 weight as determined by a traditional calibration scale. The program divides this weight by the item 14 volume as determined by the sensor bar 16. The resultant density value (weight/volume) replaces the existing density value stored for the specific item 14 material.

Density values for different item 14 materials can be acquired by using pre-calculated values or by basic experimental measurement, e.g., displacing a volume of water by a weighed item 14, whereby the density is expressed as the weight divided by the measured displaced volume of water.

Prominent factors that enable increased accuracy of the sensor bar 16 determined volumes (and hence, weights and costs) include increasing the number and resolution of the height sensors per sensor bar 16 and increasing the resolution of the displacement detectors.

When a marking device (e.g., FIG. 10A-1) rests on a flat portion of the item 14 surface, the marking element is located directly over the desired position and marks it accordingly. When the marking element rests on a steep slanted portion of the item 14 surface, the steep angle may cause the resultant mark to the item 14 surface to be angled in appearance. As the relative width (diameter) of each marking device is relatively small, this effect should not cause the operator to misinterpret the position indicated by any marks. The method to creating perfectly formed marks on an item 14 that consists of steep surfaces is to place the marking device at the tip end of each plunger 46C (or 46) whereupon it can freely rotate (pivot) so that the marking device rests perpendicularly against the steep portion of the item 14 surface.

Dimensions of Sensor Bar

Sensor bars may have various dimensions, e.g., height and length etc., as well as the number of height sensors 38 employed, to accommodate various applications as well as gross differences in item 14 dimensions.

Calculations—Introduction

Following is a description of specific case calculations utilized to compute the volume of an item 14 whose data was obtained by use of sensor bars 16A mechanically constrained in their lateral movements as illustrated by FIGS. 2A, 2B, 2C, and 2D. While traversing the item 14, these sensor bars 16A are also not able to move away from or towards the operator. The calculation presented is based on the determination of the cross sectional areas of sections of the item 14 lying beneath successive sets of height sensors 38. These areas are determined by obtaining the contour of adjacent sections of the item 14 as determined by adjacent sensors 38, as well as the adjacent coordinate positions of these perpendicularly projected sensor 38 positions onto the table surface 34. Such areas are then multiplied by the incremental distances moved by the sensor bar 16A as determined by displacement detectors 40, thus providing the volume of each section traversed by the sensor bar 16A. The cumulative total displacement produced by successive sensor bar 16A movements in traversing the item 14 segment yields the total volume of the item 14 traversed. Multiplying the total volume by the predetermined density of the item 14 yields the weight of the segment of the item 14 up to the current position of the sensor bar 16A. The weight is then multiplied by the cost per unit weight to obtain the cost of the thus far traversed item 14 segment. Either or both are displayed.

After the calculations regarding sensor bars 16A that are constrained in their movements (e.g., FIGS. 2A, 2B, 2C, and 2D) are presented, generalized calculations will be described which enable the computation of the volume of an item 14 from data obtained from any of the various sensor bars 16 appearing in this application, whether such sensor bars are constrained in their movements or not.

These calculations accommodate irregular sensor bar 16 movements across the table surface 12 as the sensor bar 16 passes over the item 14. For example, the operator may skew or shift the sensor bar 16 while passing the sensor bar over the item 14. That is, during this motion, the sensor bar 16 may be moved towards the operator or away from the operator. Or, the near support post 20 may alternately be ahead of the far support post 22 (e.g., the near support post would have an x-axis coordinate value larger than the x-axis coordinate value of the far support post) or behind the far support post 22 (e.g., the near support post would have an x-axis coordinate value smaller than the x-axis coordinate value of the far support post).

Thus, even though the support posts may be displaced unequally, the volume of the item section traversed is correctly computed. Of course, at all times the base of both support posts must make contact with the table surface 12 and the sensor bar 16 maintaining a near vertical position in relation to the supporting table surface 12. The use of such an adaptable device to measure item segment weights (based on volume) and costs (based on weight) eliminates the need for bulky traditional weight scales that waste valuable counter space.

Furthermore, its ease of use enables the device to be operated by relatively inexperienced personnel and to be carried to different work areas where the cost of a traditional weight scale might not be justified.

These calculations are based on a different approach to calculating volumes as that described above. Specifically, successive section contours defined by successive sets (from successive sensor bar 16 positions) of item 14 heights and the associated perpendicularly projected height sensor positions (onto the table surface 12) define geometrical solids whose volumes may be calculated. As the calculations used to determine the volumes of the geometric solids do not require specific pre-determined height sensor (or associated perpendicularly projected height sensor 38 positions onto the table surface 12) positions, the sensor bar 16 is not limited to moving in a regular constrained motion in passing over across the item 14.

Figure 14:
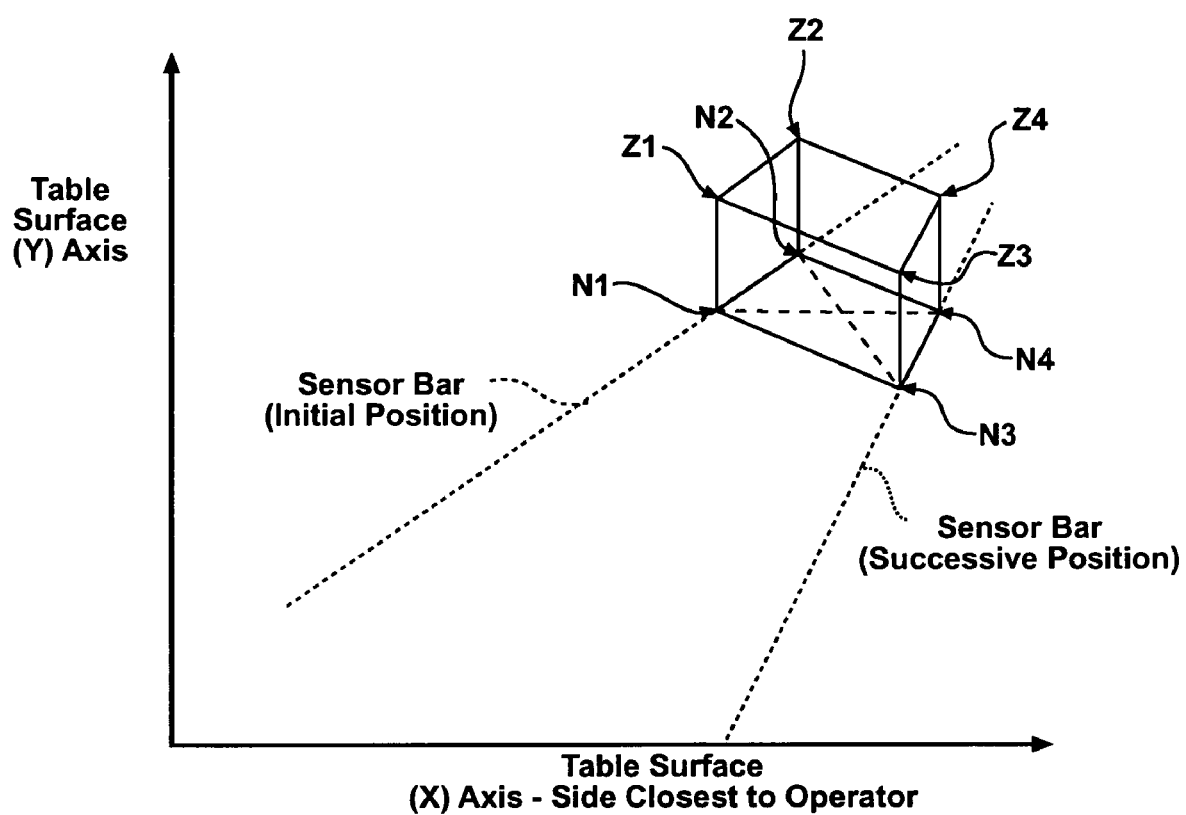
FIG. 14 is a diagrammatic representation of Cartesian points set by the height and displacement sensors carried by the sensor bar of a section of an item traversed by the sensor bar, the volume of which is to be determined by the signal processor.

Calculation of Item 14 Volumes for Mechanically Constrained Sensor Bars 16A (e.g. FIGS. 2A, 2B 2C and 2D):

Referring to FIG. 14, for the initial sensor bar 16A position, the first height sensor 38 (closest to the operator) measures an item 14 height value represented by Z1. The position of this height sensor projected perpendicularly onto the table surface 34 is represented by N1. Similarly, the next adjacent height sensor 38 (in the direction away from the operator) measures an item 14 height value represented by Z2. The position of this height sensor projected perpendicularly onto the table surface 34 is represented by N2. Thus, for the initial sensor bar 16A position, the cross sectional area below the first two height sensors is represented by the area bound by the four vertices N1, Z1, N2, and Z2. For the successive sensor bar 16A position, these same two adjacent height sensors 38 measure item 14 height values of Z3 and Z4 corresponding respectively to height sensor positions N3 and N4 projected perpendicularly onto the table surface 34. These calculations are repeated with adjacent sensor 38 height sensors along the length of the sensor bar 16A as the sensor bar 16A traverses the item 14 surface.

To approximate the volume of the item 14 lying under the path traversed by these two height sensors 38, the cross sectional area defined by vertices N1, Z1, Z2, and N2 is multiplied by the incremental distance that the sensor bar 16A moves as determined by the displacement detector 40. Various calculations may be employed to determine the item 14 volume underlying the sensor bar 16A positions. The calculations presented herewith utilize basic geometry and algebra.

Figure 14A:
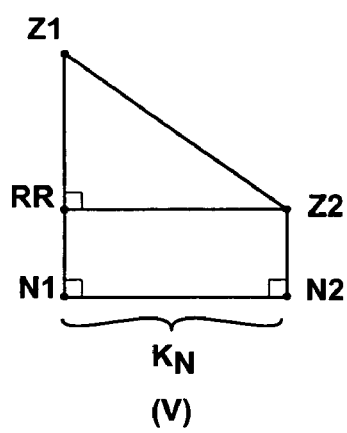
FIG. 14A is a diagrammatic depiction of various shapes defined by the item segment represented in FIG. 14.
Figure 14A:
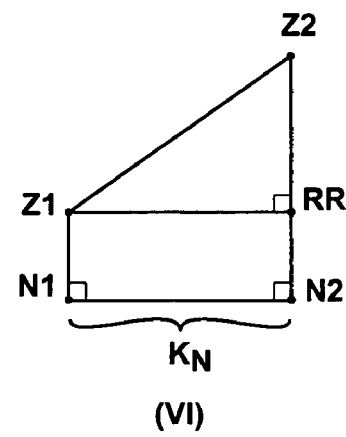
Figure 14A:
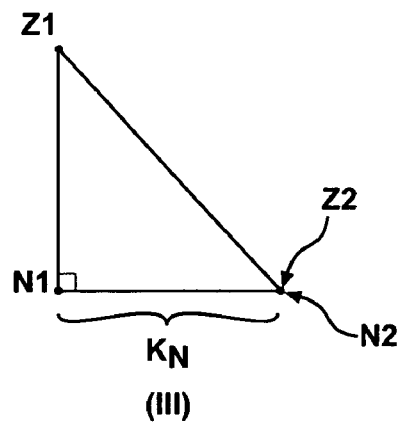
Figure 14A:
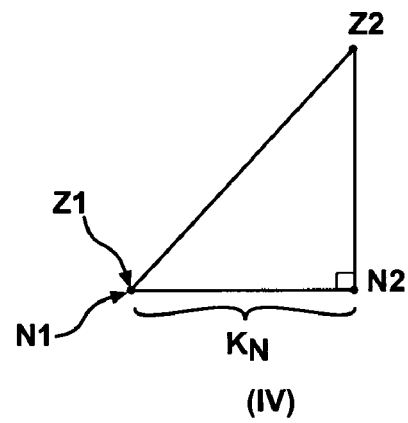
Figure 14A:
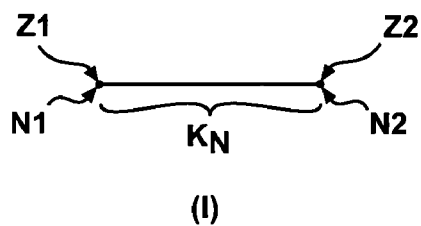
Figure 14A:
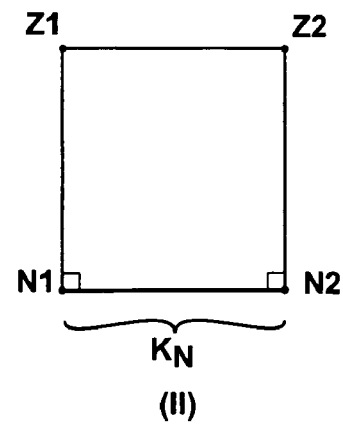

FIG. 14A illustrates basic shapes corresponding to the areas bound by (N1, Z1, Z2, N2). The constant/fixed distance between two adjacent height sensors 38 is denoted as $K_N$.

Shape (I) is defined by both item 14 heights, Z1 and Z2 being zero. Thus, the cross sectional area of the item 14 lying beneath the two height sensor 38 positions corresponding to this shape is zero, indicating that the item 14 is not present beneath the two height sensors.

Shape (II) is defined by both item 14 heights, Z1 and Z2, being equivalent (and not zero). Thus, the cross sectional area of the item 14 lying beneath the two height sensor 38 positions is defined by a rectangular (or square) shape and is calculated as the product of the fixed distance between the two height sensors, $K_N$ and the item 14 height Z1 (or Z2).

Shape (III) is defined by item 14 height of Z1 being greater than zero and the adjacent item 14 height of Z2 having a height of zero. Thus, the cross sectional area of the item 14 lying beneath the two height sensor 38 positions is defined by a right triangular shape and is calculated as one half of the product of the fixed distance between the two height sensors, $K_N$ and the height Z1.

Shape (IV) is defined by item 14 height of Z2 being greater than zero and the adjacent item 14 height of Z1 having a height of zero. Thus, the cross sectional area of the item 14 lying beneath the two height sensor 38 positions is defined by a right triangular shape and is calculated as one half of the product of the fixed distance between the two height sensors, $K_N$ and the height Z2.

Shape (V) is defined by item 14 height of Z1 being greater than the height of the adjacent item 14 height of Z2, where the height of Z2 is greater than zero. Referring to FIG. 14A-(V), an imaginary line with endpoints RR and Z2 perpendicularly intersects the line with endpoints N1 and Z1 at point RR, and is parallel to the line with endpoints N1 and N2. Thus, this imaginary line divides the shape (Z1, N1, N2, Z2) into a right triangular shape (Z1, RR, Z2) lying above a rectangular (or square) shape (RR, N1, N2, Z2). The area defined by the right triangular shape is calculated as one half of the product of the fixed distance between the two height sensors, $K_N$, and the height of the right triangle represented as the difference between Z1 and Z2, e.g., Z1–Z2. The area defined by the rectangular (or square) shape is calculated as the product of the fixed distance between the two height sensors, $K_N$, and the item 14 height Z2. Therefore, the cross sectional area of the item 14 lying beneath the two height sensor 38 positions is defined as the sum of the areas of the triangular shape and the rectangular (square) shape.

Shape (VI) is defined by item 14 height of Z2 being greater than the height of the adjacent item 14 height of Z1, where the height of Z1 is greater than zero. Referring to FIG. 14A-(VI), an imaginary line with endpoints RR and Z1 perpendicularly intersects the line with endpoints N2 and Z2 at point RR, and is parallel to the line with endpoints N1 and N2. Thus, this imaginary line divides the shape (Z1, N1, N2, Z2) into a right triangular shape (Z1, RR, Z2) lying above a rectangular (or square) shape (RR, N2, N1, Z1). The area defined by the right triangular shape is calculated as one half of the product of the fixed distance between the two height sensors, $K_N$, and the height of the right triangle represented as the difference between Z2 and Z1, e.g., Z2−Z1. The area defined by the rectangular (or square) shape is calculated as the product of the fixed distance between the two height sensors, $K_N$, and the item 14 height Z1. Therefore, the cross sectional area of the item 14 lying beneath the two height sensor 38 positions is defined as the sum of the areas of the triangular shape and the rectangular (square) shape.

Upon calculating the cross sectional areas lying beneath each set of adjacent height sensors 38 along the length of the sensor bar 16A, each cross sectional area is multiplied by the incremental displacement value of the sensor bar 16A as measured by displacement detector 40 to arrive at a total volume of the item 14 along the length of the current sensor bar 16A position. As the sensor bar 16A traverses the item 14, an aggregate or running total volume of the segment of the item 14 to the rear of each position of the sensor bar 16A is calculated.

This cumulative volume of each segment traversed is multiplied by a density factor for the particular item 14 type, which can be stored in the signal processor 300 and may be input on keyboard 27, to arrive at segment weight values for each position of the sensor bar 16A in its stroke, and a corresponding numeric display of weight continuously updated and displayed on an adjustable display 30. A cost on unit weight basis may also be calculated and displayed either alternatively or at the same time.

As the item 14 weight and cost (based on weight) is continuously calculated and displayed on display 30 during the sensor bar 16A movement, the operator may intermittently move the sensor bar 16A in the left direction (e.g., "back-up") or right direction in order to decrease or increase the portion size, weight, or cost, to satisfy the requirements of an observing customer. The signal processor 300 in controller case 26 automatically computes the decreasing or increasing volumes (hence weights and cost) in real time and provides the updated current information to the operator and consumer via display 30 thus enabling the operator to accommodate an on-looking consumer's specific requests as per the particular portion desired based on the item 14 physical appearance and associated weight or cost (based on weight) BEFORE the item 14 is cut.

Generalized Calculation of Item 14 Volumes for All Sensor Bars

Referring to FIGS. 1 and 14, as the sensor bar 16 traverses the item 14, displacement sensors 20A and 22A continuously capture each sensor bar 16 support post 20 and 22, respectively, coordinate positions. This data enables the calculation of the positional coordinates of each height sensor 38 that is perpendicularly projected onto the table surface 12 (N1, N2, N3, N4). Item 14 surface heights (Z1, Z2, Z3, Z4) corresponding to the projected position of each height sensor 38 (N1, N2, N3, N4) respectively, are obtained from corresponding height sensor 38 measurements. Adjacent sets of coordinate data, (N1, Z1, Z2, N2) and (N3, Z3, Z4, N4), from successive sensor bar 16 positions define three-dimensional geometric solid portions of the item 14 that span the length of the sensor bar 16.

The planar four-sided base of each geometric portion is defined by four (4) vertices lying in the plane of the table surface 12: two vertices (N1, N2) from an initial sensor bar 16 position and two vertices (N3, N4) from a successive adjacent sensor bar 16 position. The corresponding item 14 height values (Z1, Z2) from the initial sensor bar 16 position and the height values (Z3, Z4) from the succeeding adjacent sensor bar 16 position define the upper four (4) vertices of the geometric portion.

The determination of the eight coordinate positions (N1, N2, N3, N4, and Z1, Z2, Z3, Z4) enables the calculation of the volume of the geometric solid portions defined by the eight coordinate positions. The summation of the portioned volumes along the length of the sensor bar 16 and along the path of the sensor bar 16 as it traverses the item 14, yields the total volume of the item 14 segment up to the current position of the sensor bar 16. Multiplying the total volume by the predetermined density of the item 14 yields the weight of the segment of the item 14 up to the current position of the sensor bar 16. The weight is then multiplied by the cost per unit weight to obtain the cost of the thus far traversed item 14 segment.

Although the following calculations refer to the sensor bar 16 configuration exemplified by FIG. 1, similar calculations are performed for all sensor bar configurations described in this application.

Referring to FIGS. 1, 14, 15A, and 15B, as the sensor bar 16 traverses the item 14, the support post displacements detectors 20A and 22A continuously capture the near (nearest to the operator) support post 20 coordinate positions $CB_I$ ($X_I$, $Y_I$) and the far (farthest from the operator) support post 22 coordinate positions $CT_I$ ($X'_I$, $Y'_I$) respectively. Simultaneously, the item 14 surface heights (Z1, Z2, Z3, Z4) corresponding to each height sensor 38 (N1, N2, N3, N4) respectively are captured.

The following illustrates the method whereby the coordinate position of each height sensor 38 is calculated for any arbitrary position of the sensor bar 16 as the sensor bar 16 traverses the item 14. This information is required in order to specify the coordinates that define the geometric solid portions that comprise the item 14.

Figure 15A:
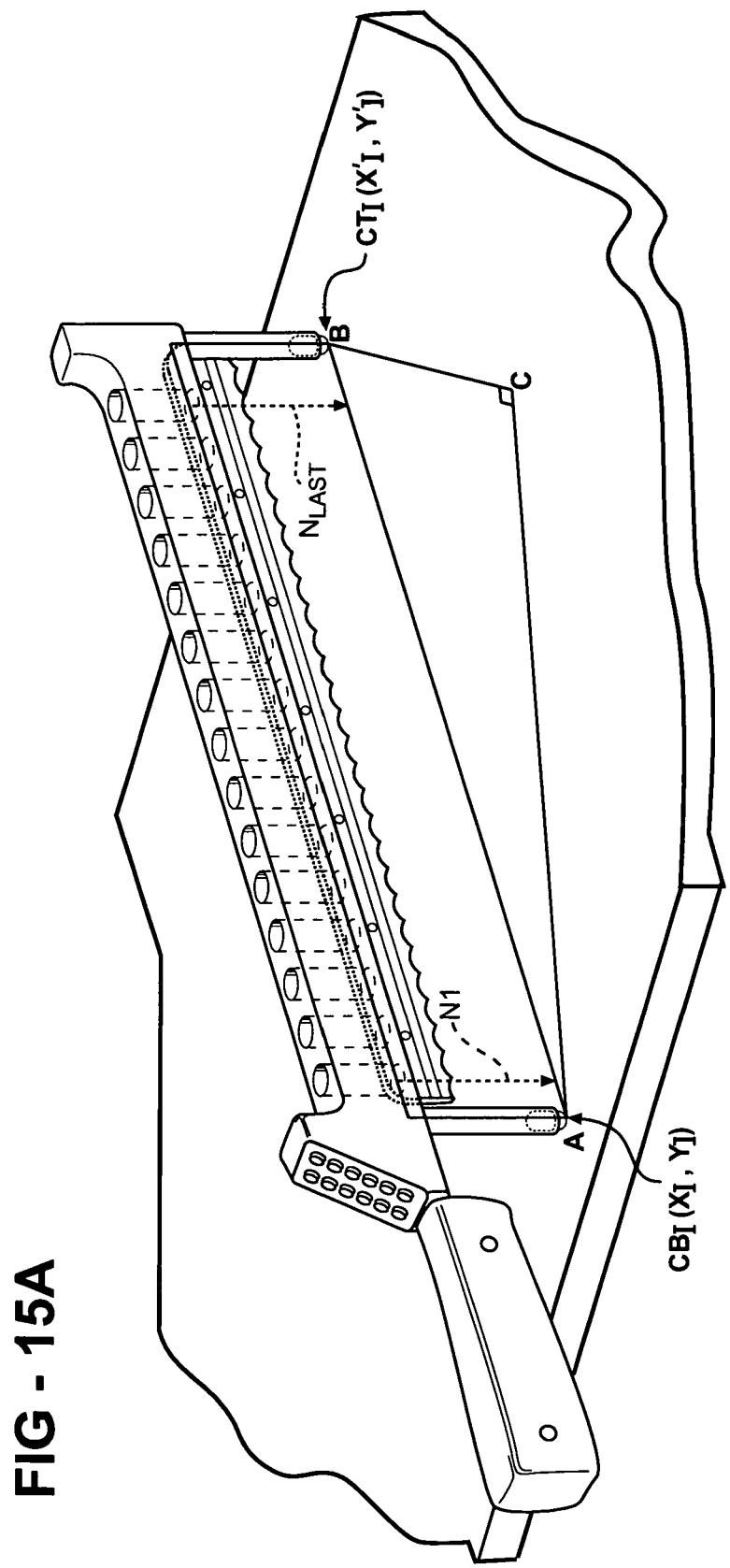
FIG. 15A is a pictorial representation of another embodiment of an apparatus according to the invention incorporating an unconstrained sensor bar with certain lines indicated thereon used to calculate an item section volume.
Figure 15B:
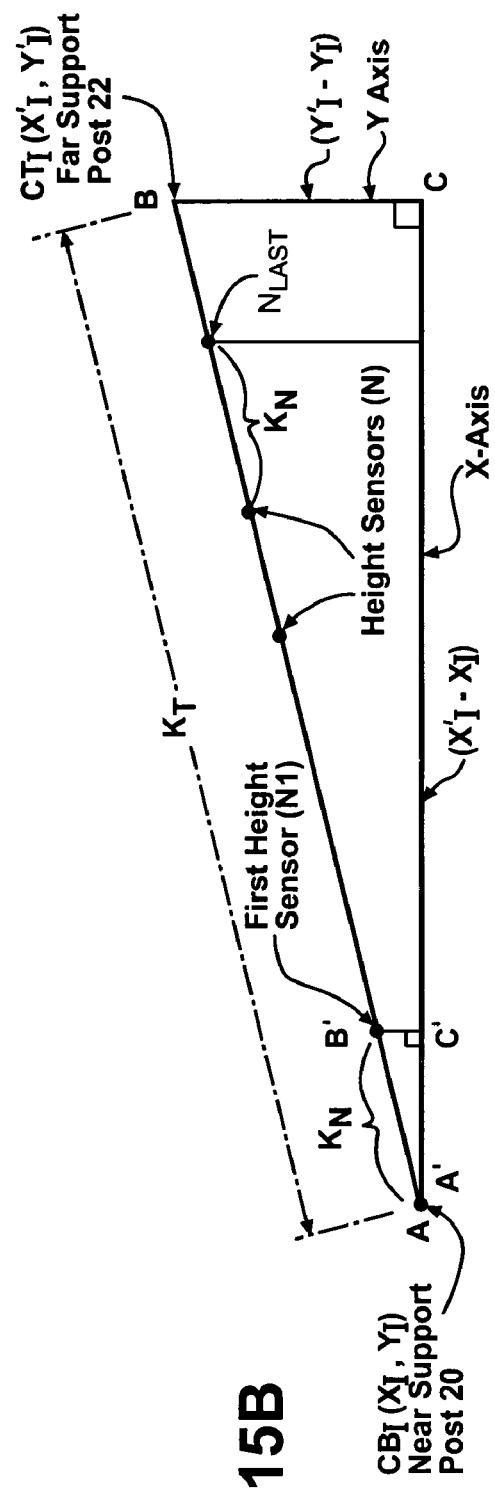
FIG. 15B is a diagram of certain sensor bar features illustrating distances used in a calculation of item section volumes.

Referring to FIGS. 15A and 15B, a right triangle is defined by line AB (the distance between the near support post 20, $CB_I$ ($X_I$, $Y_I$), and the far support post 22, $CT_I$ ($X'_I$, $Y'_I$)), line BC (the vertical distance between near support post 20 and the far support post 22), and line AC (the horizontal distance between the near support post 20 and the far support post 22). The length of line AB (denoted as $K_T$) is a known constant for the specific sensor bar 16 used. The length of $K_T$ includes the distance, $K_N$, which is the distance from the geometric center of the first height sensor 38 (N1) to the geometric center of the adjacent near support post 20 (coordinate position $CB_I$ ($X_I$, $Y_I$)). The length of $K_T$ also includes the same distance, $K_N$, measured from the geometric center of the last height sensor 38 ($N_{LAST}$) to the geometric center of the adjacent far support post 22 (coordinate position $CT_I$ ($X'_I$, $Y'_I$)). And finally, the length of $K_T$ also includes the sum of the distances between the geometric center of each successive height sensor 38 (beginning with N1 and ending with $N_{LAST}$). In FIG. 15B and the calculations presented, the distance $K_N$ is the same as the distance between each adjacent height sensor 38 (N) (e.g., the distance between N1 and N2, N2 and N3, . . . $N_{LAST-1}$ and $N_{LAST}$). The length of vertical line BC is calculated as the difference between the y coordinate positions ($Y'_I$−$Y_I$) of the far support post 22 and the near support post 20. Similarly, the length of horizontal line AC is calculated as the difference between the x coordinate positions $(X'_T - X_T)$ of the far support post 22 and the near support post 20.

The calculation of the coordinate position of each height sensor N that is projected perpendicularly onto the table surface 12 is achieved by applying the Law of Similar Triangles which states: "If two triangles are similar, then the length of their sides are proportional."

As triangle ABC is similar to the smaller triangle A'B'C', $AC/K_T$ is proportional to $A'C'/K_N$. Thus, $A'C'=(AC/K_T) \times K_N$, whereby the values of $K_T$ and $K_N$ are known constants and the value of AC is calculated by performing coordinate subtraction as described above. The derived value of A'C' is the horizontal coordinate of the first height sensor N1 whose position is projected perpendicularly onto the table surface 12.

Similarly, as $BC/K_T$ is proportional to $B'C'/K_N$, the value of B'C' is calculated by evaluating the expression $B'C'=(BC/K_T) \times K_N$, whereby the values of $K_T$ and $K_N$ are known constants and the value of BC is calculated by performing coordinate subtraction as described above. The derived value of B'C' is the vertical coordinate of the first height sensor N1 whose position is projected perpendicularly onto the table surface 12.

The above calculations yield the projected 2-dimensional coordinate position (onto the table surface 12) of the first height sensor N1 as $((AC/K_T) \times K_N, (BC/K_T) \times K_N)$.

The 3-dimensional (X,Y,Z) coordinate position of the item 14 upper surface that corresponds to the first height sensor N1 is represented as $((AC/K_T) \times K_N, (BC/K_T) \times K_N, Z)$, where Z is the item 14 height coordinate obtained from measurements made by the first height sensor N1. Applying the same procedures yields the 2-dimensional projected and 3-dimensional coordinate positions of all of the height sensors N1 through $N_{LAST}$.

As just described, the complete (X,Y,Z) coordinates of the eight vertices that define each item 14 geometric solid portion (FIG. 14) are calculated by using known constants and sensor bar 16 obtained measurements. This coordinate data enables the approximate volume calculation of each item 14 geometric solid portion that spans the length of the sensor bar 16. The successive sum of these sensor bar 16 portions yields the total volume of the item 14 segment up to the current sensor bar 16 position. Utilizing this volume value enables the calculation of the weight (volume×density) and cost (weight×cost per weight) of the thus far traversed segment of the item 14.

As described above, four item 14 height values (e.g., Z1, Z2, Z3, Z4) define the top surface vertices of each item 14 geometric solid portion. The top surface defined by these four vertices may be flat or irregularly shaped, e.g., convex, concave, or a combination of various contours. Various algorithms may be employed to optimize the accuracy of the volume calculation by taking into account specific topical surface characteristics of each type of item 14 medium.

When an operator specifies (via the keypad 27) the type of item 14 to be scanned, the sensor bar 16 signal processor 300 automatically selects the appropriate pre-programmed volume calculation algorithm. The selected algorithm (program) optimizes the volume calculations based on the top surface contour characteristics of the specific item 14 medium. Alternatively, a generalized volume approximation calculation may be performed based on the average of the four geometric solid upper surface height values (e.g., $Z_{AVERAGE}=(Z1+Z2+Z3+Z4)/4$). The use of $Z_{AVERAGE}$ provides an appropriate height approximation as the top surface contours of most common items, e.g., fish filets, have smoothly changing slopes versus erratic and jagged shifting contours. This average height, $Z_{AVERAGE}$, defines the height of a planar quadrilateral surface that is parallel and identical to the bottom planar quadrilateral surface of the geometric solid portion. Various computational methods may be employed to perform this volume calculation. The following calculations exhibit one method using only basic geometry and algebraic techniques.

Figure 14B:
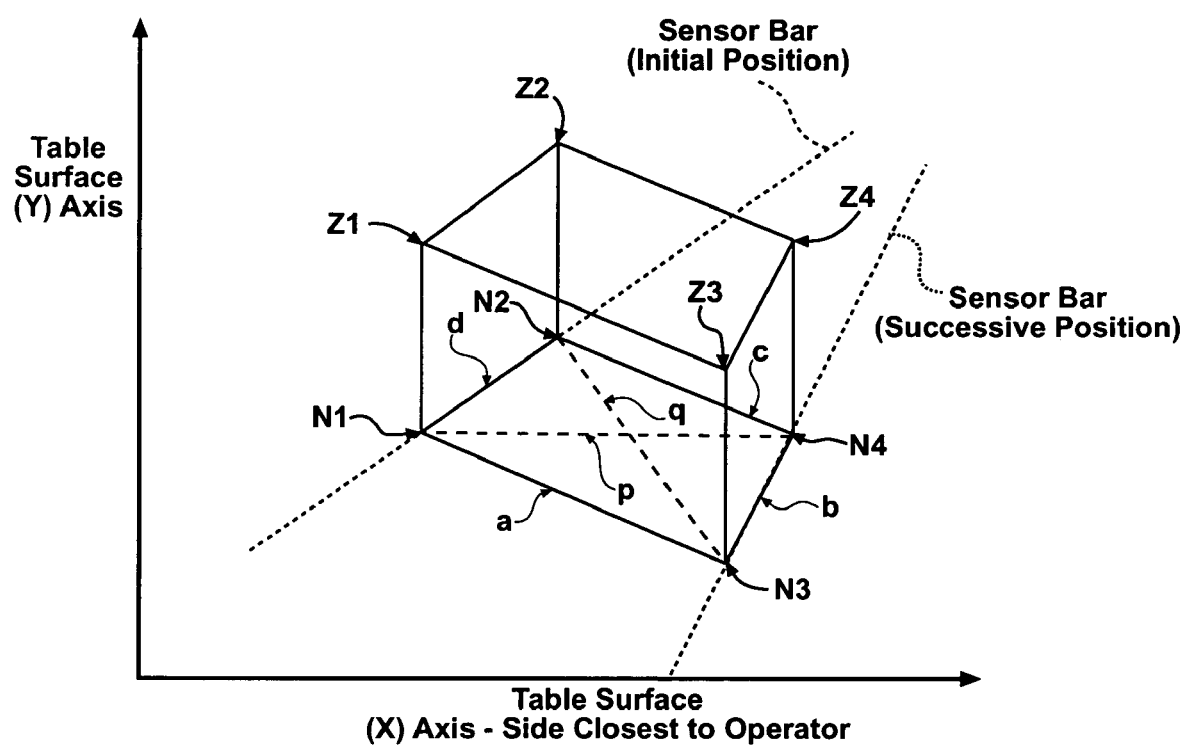
FIG. 14B is a view of the diagram of FIG. 14 with certain lines used to calculate the volume of the item segment represented.

As noted in FIG. 14B, adjacent sets of coordinate data (N1, Z1, Z2, N2) and (N3, Z3, Z4, N4) from successive sensor bar 16 positions define three-dimensional geometric solid portions of the item 14 that span the length of the sensor bar 16.

The four height values (e.g., Z1, Z2, Z4, Z3) define the top surface vertices of each geometric solid portion, whereas, the four perpendicularly projected (onto the table surface 12) height sensor 38 positions (N1, N2, N4, N3) define the bottom surface vertices of the solid. As described above, the average of the four upper surface height values, e.g., $Z_{AVERAGE}$ (where $Z_{AVERAGE}=(Z1+Z2+Z3+Z4)/4$), defines the height of the planar quadrilateral surface (Z1, Z2, Z4, Z3) that is parallel and identical to the bottom planar quadrilateral surface (N1, N2, N4, N3).

Determination of the area of the quadrilateral (N1, N2, N4, N3) and multiplying this value by the average height of the geometric solid, $Z_{AVERAGE}$, results in the approximate volume of the geometric solid portion traversed by two adjacent height sensors.

As illustrated in FIG. 14B, the quadrilateral defined by (N1, N2, N4, N3) has four sides labeled a, b, c, d. Various methods may be employed to calculate the area of this quadrilateral such as the use of Varignon's Theorem which states that a parallelogram is formed when the midpoints of the sides of a convex quadrilateral are joined in order. The area of the parallelogram is half of the area of the original quadrilateral. The area of the parallelogram is determined by the product of its base and height, whereby, this value is doubled to obtain the value of the original quadrilateral.

A simpler method of determining the area of the quadrilateral involves use of Bretschneider's Formula which states that for a given general quadrilateral with side lengths a, b, c, d, and diagonal lengths p and q, the area, A, is given by:

$$A=(\tfrac{1}{4})sqrt(4p^2q^2-(b^2+d^2-a^2-c^2)^2)$$

Figure 14C:
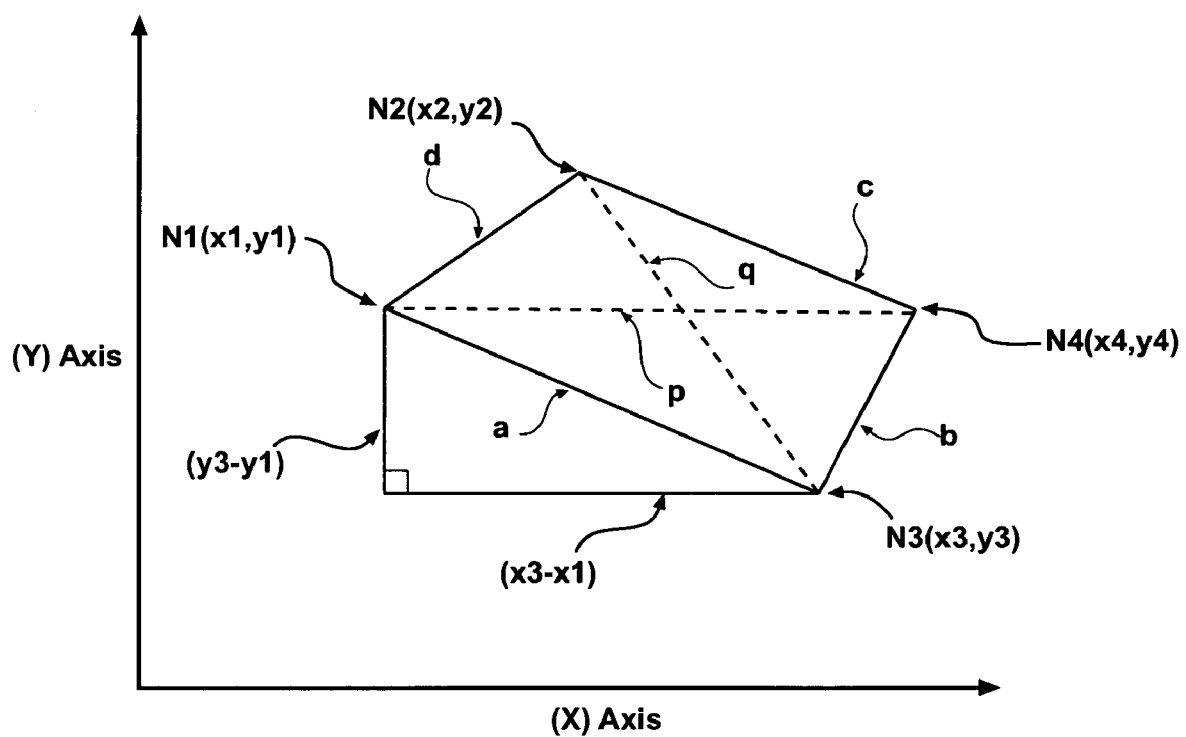
FIG. 14C is a diagram showing additional lines used in a calculation of the item section volume.

Referring to FIGS. 14B and 14C, as the coordinate values of each vertex N1, N2, N3, and N4 are calculated as described above, the side lengths a, b, c, d, and diagonal lengths p, q, are determined by application of Pythagoras Theorem, whereby each side length or diagonal length represents the hypotenuse of a right triangle. Thus, if the coordinate for vertex N1 is expressed as (x1,y1), the coordinate for vertex N2 is expressed as (x2,y2), the coordinate for vertex N3 is expressed as (x3,y3) and the coordinate for vertex N4 is expressed as (x4,y4), then the side lengths a, b, c and d are expressed as:

$$a=sqrt((x3-x1)^2+(y3-y1)^2)$$

$$b=sqrt((x4-x3)^2+(y4-y3)^2)$$

$$c=sqrt((x4-x2)^2+(y4-y2)^2)$$

$$d=sqrt((x2-x1)^2+(y2-y1)^2)$$

Similarly, the diagonal lengths p and q are expressed as:

$$p=sqrt((x4-x1)^2+(y4-y1)^2)$$

$$q=sqrt((x3-x2)^2+(y3-y2)^2)$$

FIG. 14C illustrates the values utilized in the calculation of side length a.

Substituting the above determined values of a, b, c, d, p, and q into Bretschneider's Formula yields the area, A, of the quadrilateral defined by (N1, N2, N4, N3).

Determination of the area of the quadrilateral (N1, N2, N4, N3) and multiplying this value by the average height of the geometric solid, $Z_{AVERAGE}$, results in the approximate volume of the geometric solid portion traversed by two adjacent height sensors.

The sum of the volumes traversed by each set of adjacent height sensors 38 along the length of the sensor bar 16 as the sensor bar 16 traverses the item 14 is the total volume of the segment of the item 14 to the rear of the current sensor bar 16 position. This cumulative volume of each segment traversed is multiplied by a density factor for the particular item 14 type, which can be stored in the signal processor 300 and may be input on keyboard 27, to arrive at segment weight values for each position of the sensor bar 16 in its stroke, whereby such values are continuously displayed on an adjustable display 30. A cost on unit weight basis may also be calculated and displayed either alternatively or at the same time.

As the item 14 weight and cost (based on weight) is continuously calculated and either selectively or continuously displayed on display 30 during the sensor bar 16 movement, the operator may intermittently move the sensor bar 16 in the left direction (e.g., "back-up") or right direction in order to decrease or increase the uncut segment size, weight, or cost, to satisfy the requirements of an observing customer. The signal processor 300 in display case 26 automatically computes the decreasing or increasing volumes (hence weights and cost) in real time and provides the updated current information to the operator and consumer via display 30 thus enabling the operator to accommodate an on-looking consumer's specific requests as per the particular portion desired based on the item 14 physical appearance and associated weight or cost (based on weight) BEFORE the item 14 is cut.

Additional Support Post Displacement Detector Technologies

Figure 16:
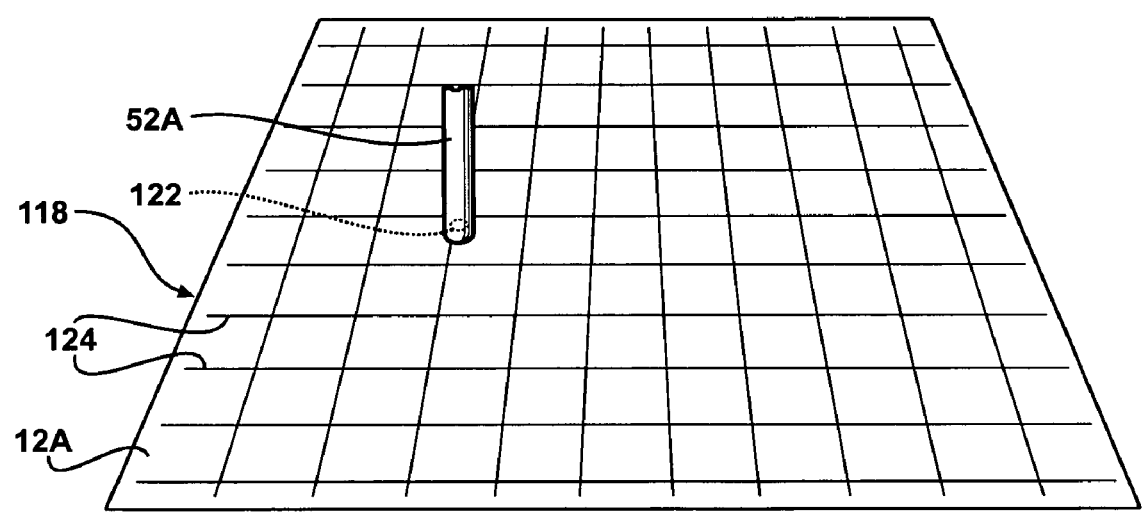
FIG. 16 is a pictorial view of a cutting table incorporating an electromagnetic digitizer for detecting support post displacement, with a fragmentary view of the lower end of one support post.

Electromagnetic Based Support Post Displacement Detectors that Interact with Electromagnetic Based Table Surfaces Referring to FIG. 16, an electromagnetic flatbed digitizer tablet 118 is used as a cutting board. The tablet 118 defines a suitable hard surface 12A.

The bottom end of each support post 52A contains an electromagnetic cursor coil 122. As the sensor bar 16 traverses the item 14, the bottom tip of each support post 52A is kept in constant contact with the table surface 12A. The digitizer tablet 118 continuously captures the absolute coordinate positions of each support post 52A during the movements of the sensor bar 16. These coordinates are transferred via an invisible data link (e.g., infrared) or e.g., USB (universal serial bus) connection to the sensor bar 16 signal processor 300 via input/output ports 58 or wireless communications module 308.

The sensor bar 16 signal processor 300 continuously processes support post 52A coordinate positional data signals along with the height sensor 38 data signals.

The energized cursor coil 122 generates a magnetic field. The underlying digitizer tablet 118 has an embedded electromagnetic sensor grid 124 that locates the absolute coordinate position of the cursor coil 122 by determining the location of the cursor generated magnetic field as the support post 52A traverses the surface 12A.

Electromagnetic based cursor/digitizer technology has been in use for many years and is used in diverse applications ranging from transferring drawing data (coordinate positions) into architectural software programs to entering menu selections at a restaurant.

Figure 17:
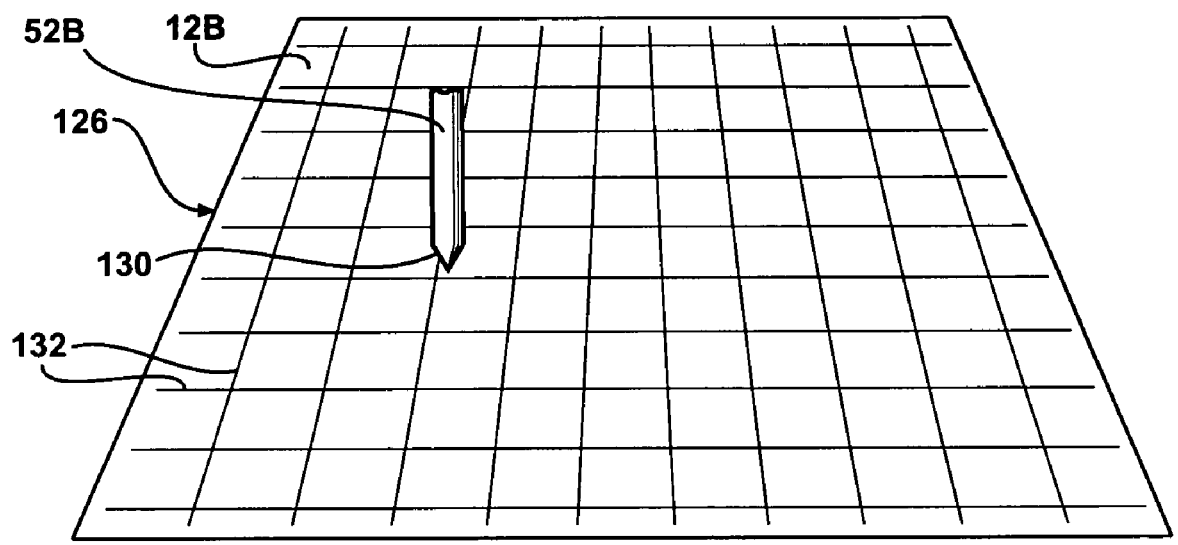
FIG. 17 is a pictorial view of a cutting table using a pressure sensitive surface for detecting displacement of the support posts, with a fragmentary bottom portion of one support post.

Firm-Pointed Stylus Based Support Post Displacement Detectors that Interact with Pressure-Sensitive (Tactile) Based Tables Surfaces Referring to FIG. 17, a pressure sensitive (tactile based) flatbed digitizer tablet 126 is used as a cutting board. The tablet 126 defines a suitable hard surface 12B.

The bottom end of each support post 52B contains a firm-pointed stylus 130. As the sensor bar 16 traverses the item 14, the bottom tip of each support post 52B is kept in constant contact with the table surface 12B. The digitizer tablet 126 continuously captures the absolute coordinate positions of each support post 52B during the movements of sensor bar 16. These coordinates are transferred via an invisible data link (e.g., infrared) or e.g., USB (universal serial bus) connection to the sensor bar 16 signal processor 300 via input/output ports 58 or wireless communications module 308.

The sensor bar 16 signal processor 300 continuously processes the support post 52B coordinate positional data signals along with the height sensor 38 data signals.

The digitizer tablet 126 contains a pressure sensitive sensor grid 132 that resolves the absolute coordinate position of each stylus 130 by tracking the depression weight of the stylus 130 as it traverses the surface 12B.

Pressure-sensitive (tactile) based digitizer technology has been in use for many years and is used in many applications such as those described above for electromagnetic based cursor/digitizer systems.

Additional Height Sensor Technologies

Reflecting Acoustic Height Sensor Used On Relatively Flat Item 14 Surfaces

Figure 18A:
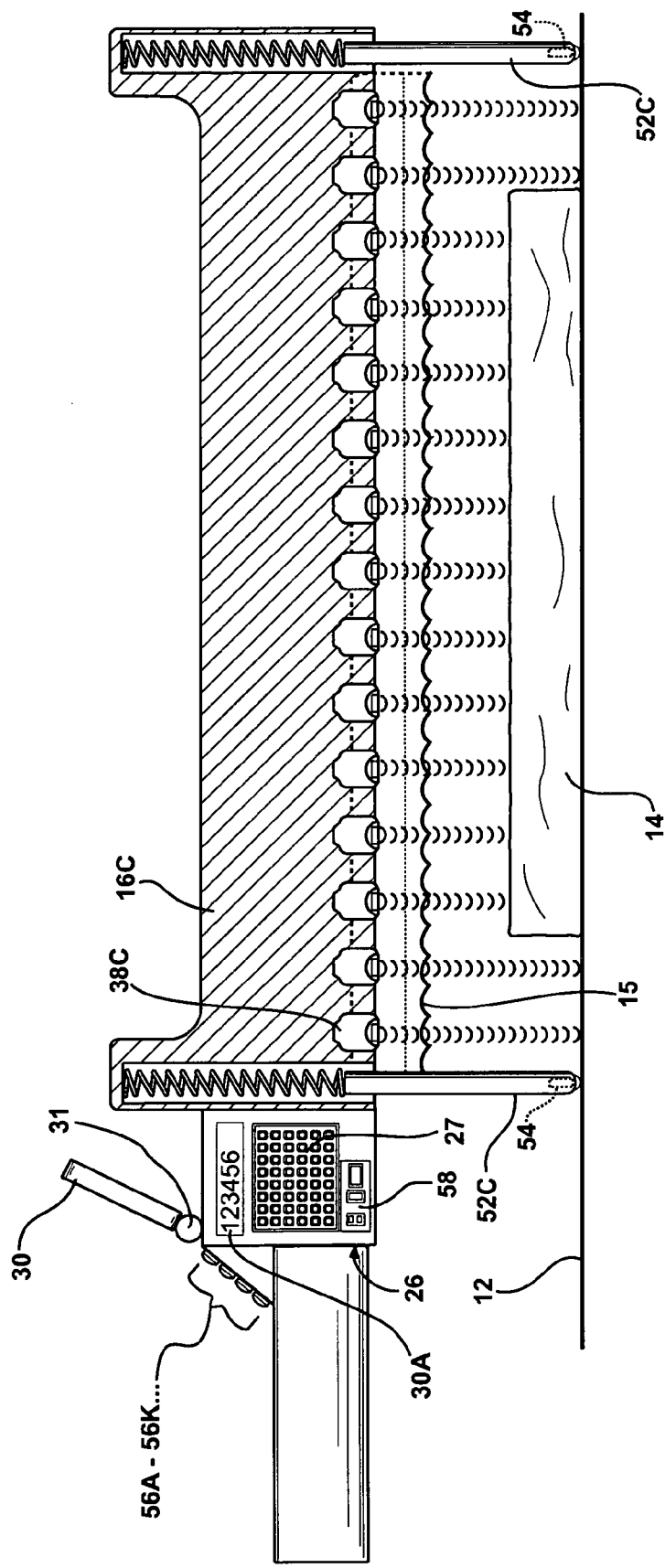
FIG. 18A is a partially sectional view of a sensor bar incorporating acoustic height sensors, with a diagrammatic representation of acoustic waves emanating from each sensor impinging an item shown resting on a table surface beneath the sensor bar.

Referring to FIG. 18A, an acoustic height sensor 38C is shown incorporated in the sensor bar 16C as a linear array arranged along the length of the sensor bar 16C. Each acoustic height sensor 38C is comprised of an acoustic emitter/receiver unit embedded in the sensor bar 16C. Various acoustic emitter/receiver technologies may comprise the height sensor 38C. A common technology utilizes piezoelectric ceramic as the active sensor element. Piezoelectric ceramic enables the conversion of electrical to acoustic energy as well as the conversion of acoustic to electrical energy. This property enables the same piezoelectric ceramic to act as both the emitter as well as the receiver in the sensor 38C. Alternatively, a separate acoustic emitter and receiver may comprise the height sensor 38C.

As the sensor bar 16C traverses the item 14, the acoustic emitters 38C pulse the upper surface of the item 14 lying beneath the sensor bar 16C. The determination of the height of the item 14 top surface above the table surface 12 directly below each sensor 38C corresponds to the round-trip time required for the emitted acoustic waves to reach, reflect off of the item 14 top surface, and return to the respective originating overhead acoustic receiver in the sensor 38C. This round-trip time is commonly called the Time-Of-Flight and its determination is integral for computing distances in many products such as camera auto focus range finders, burglar alarm motion detectors, and robotic collision avoidance devices.

FIG. 18A illustrates a sensor 38C emitted acoustic waves reflecting off of a relatively flat item 14 surface and returning to the originating sensors 38C. Subtracting the acoustically determined sensor bar 16C to item 14 distance from the known (constant) sensor bar 16C height (base of sensors 38C to table surface 12 distance) yields the height of the item 14 upper surface relative to the table surface 12.

For example, assuming that the sensor bar 16C height is 100 mm, the speed of an acoustic wave is 340 mm/ms, and the round-trip time for an emitted acoustic wave to reach, reflect off of the item 14 surface, and return to the originating sensor 38C is 0.45 ms, the following calculation determines the height of the item 14 upper surface relative to table surface 12 located directly below the sensor 38C is 23.5 mm:

Height Of Item 14 (Relative Table Surface 12)
=(sensor bar 16C height)−(((speed of acoustic wave)×(round-trip travel time))/2)
=100 mm−(((340 mm/ms)×(0.45 ms))/2)
=100 mm−76.5 mm
=23.5 mm If all sensor 38C emitters simultaneously discharge their acoustic waves, then interaction among different emitted waves would cause unpredictable wave patterns and sensor 38C receivers may detect reflected acoustic pulses that did not originate from the same sensor 38C emitter unit. This likelihood increases when larger emitted acoustic beam widths are employed and/or sensor arrays along the length of the sensor bar 16C are comprised of a high density of sensor 38C units. Such interference could result in erroneous item 14 height calculations and can be avoided by multiplexing the operation of the linear array of sensor 38C units along the length of the sensor bar 16C.

To multiplex the sensors 38C, instead of all sensor 38C units emitting acoustic waves simultaneously, each sensor 38C is both activated and deactivated sequentially along the length of the sensor bar 16C. A successive sensor 38C emitter is not activated until the currently activated sensor 38C receives back the reflected acoustic wave that it emitted and is then deactivated. Instead of monitoring the transmit and corresponding receive progress of each wave cycle, each successive sensor 38C along the sensor bar 16 may be activated and deactivated at a fixed length time interval that is the maximum time required for a sensor 38C to emit and receive a reflected acoustic wave from any item 14. This maximum time is determined by calculating the time required for a sensor 38C emitted acoustic wave to reach the table surface 12, reflect off the table surface 12, and return to the originating sensor 38C.

Implementing a multiplexing fixed length time interval longer than this maximum time period ensures that only one sensor 38C is operating at a time and thus reduces the possibility of unwanted acoustic wave interactions from multiple sensor 38C units.

Implementing a multiplexing time interval that is longer than this determined value also reduces the likelihood of possible residual acoustic wave bounce-backs between the sensor bar 16C and item 14 will affect upcoming sensor readings. Such bounce-backs are diminished or eliminated by employing a tapered base and non-reflective (reduced-reflective) surface on the sensor containing underside of the sensor bar 16C, as unwanted waves will be reflected upwards and outwards instead of being reflected back in the direction of the item 14.

An example of the calculation used to determine the fixed length multiplexing time interval follows. By assuming that the sensor bar 16C height (base of sensors 38C to table surface 12 distance) is 100 mm, the speed of an acoustic wave is 340 mm/ms, and the item 14 height is 0.0 mm, the following calculation determines the maximum possible round-trip time required for an emitted acoustic wave to reach any item 14 upper surface, reflect off of the item 14 surface, and return to the originating sensor 38C:

Maximum Round-Trip Time=(2×(sensor bar height))/(speed of acoustic wave)
=(2×(100 mm))/(340 mm/ms)
=0.59 ms Thus, the time interval corresponding to the longest possible path for an acoustic wave to travel from an emitting sensor 38C to an item 14 and then return to the originating sensor 38C is 0.59 ms. Therefore, a fixed multiplexing time interval longer than 0.59 ms is used to sequentially activate and deactivate each height sensor 38C along the length of the sensor bar 16C.

A sensor 38C may not receive back an emitted acoustic wave within the allocated multiplexed fixed time interval due to the item 14 surface containing an area(s) that are non-reflective. The application (spraying, painting, dipping, etc.) of an appropriate coating onto the item 14 surface eliminates this phenomenon. A sensor 38C also may not receive back an emitted acoustic wave within the multiplexed time interval due to the item 14 having an irregular (angled) or relatively non-flat surface. Such surfaces cause the incident acoustic wave to reflect in directions other than directly back to the originating sensor 38C position. The implementation of an enlarged acoustic receiver panel enables the successful detection of the scattered reflected waves. This sensor panel enables both the detection and interpretation of the errant waves and is fully described in the section entitled "Reflecting Acoustic Height Sensor Used On Irregular (or Flat) Item 14 Surfaces". Malfunctioning or debris covered 38C sensors as well as other conditions may also prevent the detection of an emitted wave. Regardless of the cause, the item 14 height at the originating sensor 38C position is obtained by extrapolating height values determined from surrounding sensor 38C positions.

Increasing the density (the number of sensor 38C units) positioned along the sensor bar 16C enables the collection of more coordinate data points per given surface area of item 14, and hence increases the overall accuracy of the volume and resultant weight and cost (based on weight) calculations.

As the speed of acoustic waves traveling in air varies for different air temperatures, the controller-signal processor case 26 contains a miniature temperature sensor 304 (FIG. 1A) that continuously measures the operating environment air temperature. The signal processor 300 continuously cross references the measured air temperature against a stored temperature versus wave-speed look-up table to mathematically compensate the temperature dependent item 14 height calculations to ensure their accuracy. In lieu of using the above described look-up table, the signal processor 300 may use the measured air temperature value in a wave speed approximation formula to calculate the temperature adjusted acoustic wave speeds. Other parameters affecting air speed such as humidity and air pressure can similarly be adjusted for, whereby the operator enters such information into the signal processor 300 via keypad 27.

Again referring to FIG. 18A, as sensor bar 16C traverses the item 14 and the position of the sensor bar 16C reaches the desired weight (or cost) of the item 14 as shown on the display 30, the operator manually applies a downward pressure on the sensor bar 16C causing both retractable support posts 52C to retract upwards resulting in knife 15 moving downwards and making contact with the item 14. Simultaneously applying a continued downward pressure and exerting a back and forth sawing motion across the item 14 surface results in the item 14 being completely cut to form the desired segment. Knife blade 15 may also be used to only mark (score) the item 14 surface whereupon a separate cutting tool may be used to perform the final cutting of the item 14. Alternatively, previously described marking plungers 46C may be employed to indicate the exact cutting line whereupon the item 14 is subsequently cut by a knife or other cutting instrument.

After the item 14 is completely cut (or scored) and the sensor bar 16C is again elevated by action of the spring-loaded retractable posts 52 fully extending themselves, the operator depresses the appropriately designated "reset" pushbutton 56A–56K causing the display 30 to clear and the signal processor 300 to ready the sensor bar 16C for new item 14 data. The sensor bar 16C is now ready to be stroked over a new item 14.

For sensor bar implementations 2A, 2B, 2C, or 2D that utilize acoustic sensors 38C, the item 14 can be scored and or cut using a separate knife, rotary cutting blade, laser cutter, guillotine, or other slicing or chopping mechanism.

Reflecting Acoustic Height Sensor Used on Irregular (or Flat) Item 14 Surfaces The above section entitled "Reflecting Acoustic Height Sensor Used On Relatively Flat Item 14 Surfaces" describes the interaction of acoustic waves on a relatively flat item 14 surface. Specifically, an emitted acoustic wave from a sensor 38C reflects off of the item 14 at a near (allowing for small surface deviations) 90 degree angle relative to the item 14 surface and returns to the same originating sensor 38C. If, however, a sensor 38C emits an acoustic wave that interacts with an appreciably irregular (angled) surface portion of item 14, the reflected acoustic wave will not return to the sensor 38C where the wave initially originated, but instead will propagate in the direction dictated by the angle of reflection at the item 14 surface according to the Law Of Reflection which states "A wave incident upon a reflective surface will be reflected at an angle equal to the incident angle".

Figure 18B:
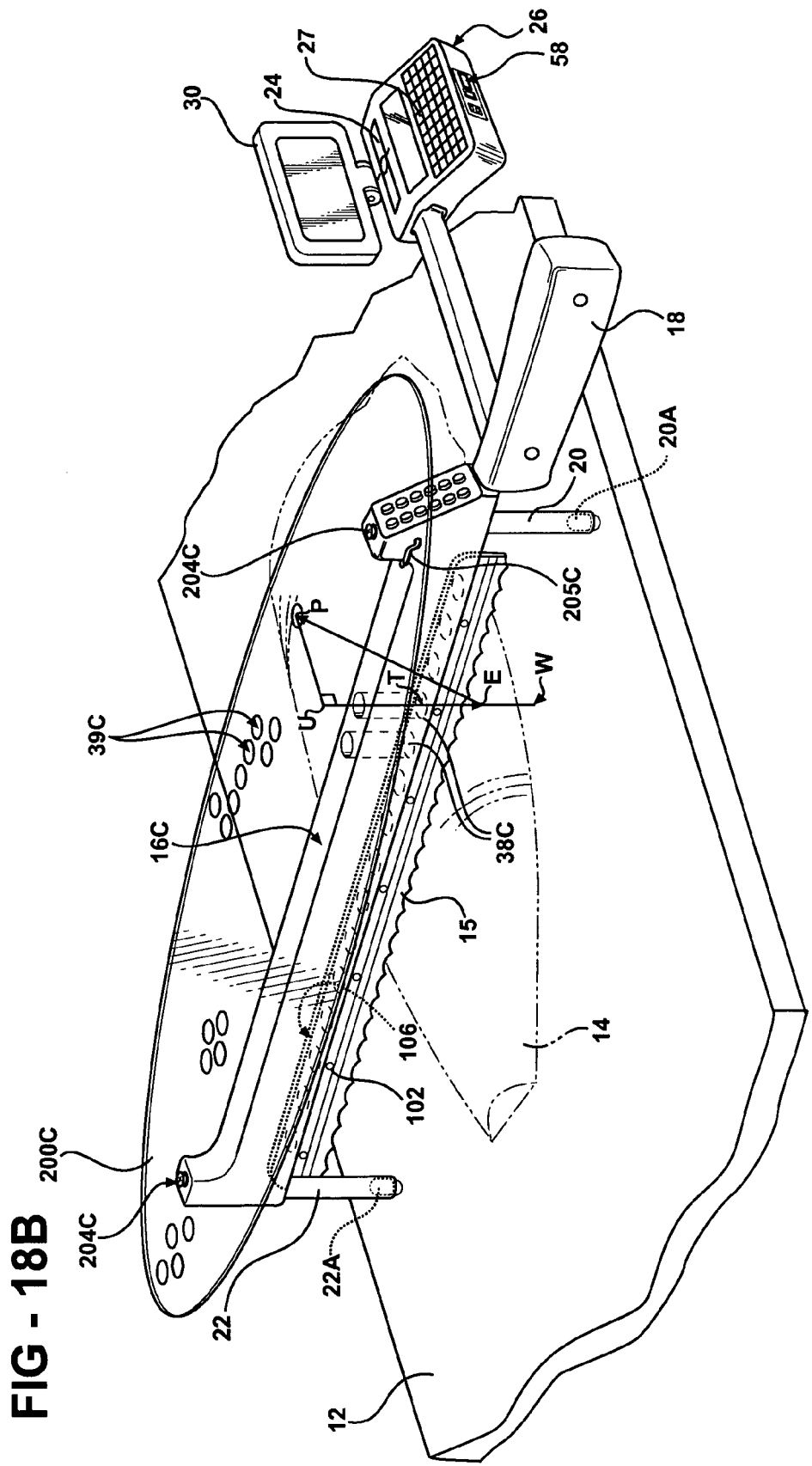
FIG. 18B is a pictorial representation of another embodiment of an apparatus according to the invention utilizing a sensor bar supporting a two dimensional array of acoustic sensors mounted to a transparent plate attached to the sensor bar, with a diagram of certain distances involved in calculating the height of points on the upper surface of the item.

Referring to FIG. 18B, the detection of acoustic waves reflected from irregular (angled) item 14 surface areas is achieved by implementing a two-dimensional array of acoustic receivers 39C embedded into a clear sensor panel 200C that is orthogonally affixed to the top of the sensor bar 16C. Each acoustic receiver 39C detects the presence and magnitude (amplitude) of acoustic waves impinging upon its surface. Various acoustic receiver technologies may comprise the acoustic receiver 39C. A common technology utilizes piezoelectric ceramic as the active sensor element. As piezoelectric ceramic enables the conversion of acoustic to electrical energy, sensors 39C constructed of this material are able to detect both the presence and magnitude of incident acoustic waves.

In the previous section entitled, "Reflecting Acoustic Height Sensor Used On Relatively Flat Item 14 Surfaces" each sensor 38C positioned along the sensor bar 16C is both sequentially activated and deactivated before a successive sensor 38C is activated. This multiplexing procedure prevents an acoustic wave emitted from one sensor 38C from being detected by a different sensor 38C, and helps eliminate unwanted wave interactions. In the case of waves reflecting off an irregular item 14 surface and the use of sensor panel 200C, the position of the specific (to be impinged) sensor receiver is not known in advance, and hence all sensor receivers are simultaneously active and awaiting possible impingement from a reflected wave.

As the acoustic wave reflecting off of the item 14 surface may impinge upon a number of nearby acoustic receivers 39C (or 38C), the acoustic receiver 39C (or 38C) that detects the strongest magnitude (amplitude) acoustic signal is considered to be the receiver most inline with the reflected wave. Other methods used to determine the receiver most inline with the reflected wave include (but are not limited to) calculating the mathematical central point of all impinged receivers and selecting the receiver 39C (or 38C) closet to this point.

Increasing the density (number) of acoustic receivers 39C (and 38C) embedded in sensor panel 200C (and along the length of the sensor bar 16C) increases the accuracy of detection of acoustic waves reflected off of the item 14, and hence increases the resultant accuracy of the item 14 height calculations. Similarly, decreasing the beam width of sensor 38C emitted waves reduces the number of acoustic receivers impinged upon, and hence increases the accuracy of detecting the most in-line reflected wave thereby increasing the accuracy of the item 14 height calculations.

The shape of sensor panel 200C may be varied, e.g., elliptical, circular, rectangular, etc. The larger the surface area of sensor panel 200C that overlays the item 14, the more acoustic waves that are reflected off the item 14 surface will be detected. This assumes, of course, that the density of embedded acoustic receivers 39C in panel 200C is sufficiently large to capture the acoustic waves reflected from the item 14. High degrees of irregularity (e.g., steep surface angles) on the item 14 surface result in high angles of acoustic wave deflection relative to the acoustic wave path defined by the originating acoustic sensor 38C position to the interception point on the item 14 surface. Thus, high degrees of surface irregularity result in more reflected acoustic waves being detected towards the outward boundaries of sensor panel 200C. As the sensor panel 200C is easily detached by means of two screws 204C and a recessed data cable 205C near one of the screw mountings, sensor panels of various shapes and embedded receiver 39C densities can easily be installed/exchanged to match the degree of surface irregularity (and hence the degree of acoustic wave reflection) of the item 14.

Sensor panel 200C is composed of a clear material whereupon the sensors 39C are embedded, thus enabling the operator to view the underlying item 14 during operation of the sensor bar 16C. The underside of the sensor panel is non-reflective (low-reflectance) to inhibit waves that impinge upon the sensor panel from reflecting back downward and then again reflecting upward towards sensors 38C or 39C.

The thin median region of the sensor panel 200C along the length of the sensor bar 16C is devoid of active acoustic receivers 39C as the physical presence of the underlying sensor bar 16C prevents acoustic waves from reaching this central area. Acoustic waves that otherwise would have reached this area along the median region of sensor panel 200C are detected by the acoustic sensors 38C positioned along the base of the sensor bar 16C. Item 14 height calculations are simply adjusted to account for the difference in physical height between the 38C sensor array embedded along the base of the sensor bar 16C and the 39C sensor array embedded in the panel 200C.

As the sensor bar 16C (FIG. 18B) traverses the item 14, the acoustic emitters 38C pulse the upper surface of the item 14 lying beneath the sensor bar 16C. The determination of the height of the item 14 upper surface relative to the table surface 12 directly below each sensor 38C corresponds to the time required for an emitted acoustic wave to reach and reflect off of the item 14 upper surface, and either impinge upon the same acoustic sensor 38C (if the underlying item 14 surface portion is relatively flat), or impinge upon a different acoustic sensor 38C along the length of the sensor bar 16C, or impinge upon an acoustic receiver 39C embedded in sensor panel 200C.

A sharply angled reflected acoustic wave may avoid detection by bypassing both the linear sensor 38C array and the sensors 39C embedded in sensor panel 200C. In this case, the reflected wave travels beyond the boundaries of the sensor panel 200C by entering an "open air region" that is in-between the table surface 12 and the sensor panel 200C. Similarly, an acoustic wave emitted from a sensor 38C is not detected if it impinges upon a non-reflective surface region of the item 14. The method of handling these non-detection exception cases is discussed in a following section.

Subtracting the acoustically determined sensor 38C to item 14 upper surface distance from the known (constant) sensor bar 16C height (base of sensor 38C to table surface 12 distance) yields the height of the item 14 upper surface relative to the underlying table surface 12 at the position located directly below sensor 38C.

Figure 18C:
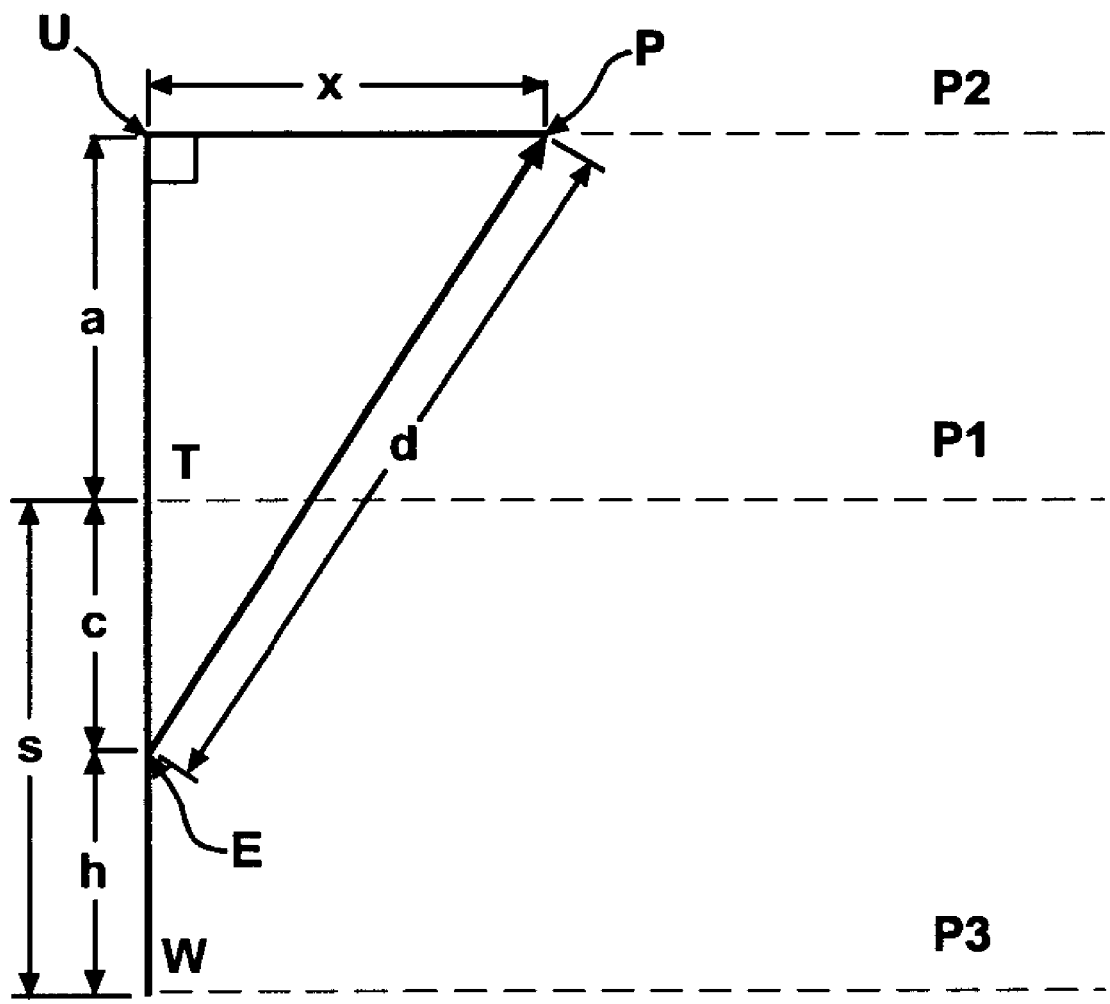
FIG. 18C is a diagrammatic representation of the distances involved in detecting the height of points on an item by the acoustic detector array incorporated in the sensor bar shown in FIG. 18B.

Referring to FIGS. 18B and 18C, following is an example of a hypothetical sensor bar 16C calculation to determine the height, h, of the item 14 upper surface (E) relative to table surface 12 (W) at the position located directly below sensor 38C (T). The sensor 38C (T) emitted acoustic wave reflects off of the upper surface of the item 14 (E) whereby it impinges upon a receiver 39C (P) embedded in sensor panel 200C.

The sensor bar 16C height, s, defined as the distance from the base of sensor bar 16C (T) (position of sensor 38C) to table surface 12 (W), is 100 mm. The distance, a, between the sensor 38C (T) and the sensor panel 200C (U) is 20 mm, and the speed, v, of the acoustic wave is 340 mm/ms. Furthermore, the sensor bar 16C determined travel time, t, for a sensor 38C (T) emitted acoustic wave to reach and reflect off of the upper surface (E) of the item 14 and then impinge upon receiver 39C (P) embedded in sensor panel 200C is 0.90 ms.

The emitting sensor 38C (T) and receiving sensor 39C (P) each lie within different horizontal planes (P1 and P2 respectively), each parallel to the other, as well as to plane P3 which contains table surface 12. The sensor 38C (T) lies in the horizontal plane (P1) defined by the linear array of sensor 38C units at the base of the sensor bar 16C, while sensor 39C (P) lies in the horizontal plane (P2) defined by the sensor panel 200C. Thus, the horizontal distance between these two sensors is the shortest distance between an imaginary line drawn orthogonally through the emitting sensor 38C (T) positioned within plane P1, and an imaginary line drawn orthogonally through the acoustic receiver 39C (P) positioned within plane P2. Since the exact position of each sensor 38C (T) and 39C (P) is a known constant for the specific sensor bar 16C and sensor panel 200C utilized, the signal processor 300 calculates this horizontal distance, x, between these positions once the specific receiver 39C that detects the emitted signal from the specific sensor 38C is known. In this example, the signal processor 300 determines the horizontal distance, x, between the emitting sensor 38C (T) and the receiving sensor 39C (P) as 200 mm.

Again referring to FIGS. 18B and 18C, the vertices E, U, and P form a right triangle where the 90 degree angle is at the vertex U. Applying Pythagoras Theorem, the square of the reflected wave distance (E to P), d, equals the square of the sensor 38C (T) to receiver 39C (P) horizontal distance, x, plus the square of the sensor panel 200C (U) to item 14 (E) distance, (a+c). This relationship is expressed as:

$$d^2 = x^2 + (a+c)^2 \tag{I}$$

Replacing known values into the above equation yields:

$$d^2 = (200 \text{ mm})^2 + (20 \text{ mm} + c)^2 \tag{II}$$

Multiplying the speed of the acoustic wave, v, by the total wave travel time, t, yields the total two segment (c+d) distance traveled by the wave (e.g., the distance traveled from sensor 38C (T) to the item 14 surface (E) to the receiver 39C (P)). This relationship is expressed as:

$$vt = c + d \tag{III}$$

Replacing known values into the above equation yields:

$$(340 \text{ mm/ms})(0.90 \text{ ms}) = c + d \tag{IV}$$

or $$306 \text{ mm} = c + d \tag{V}$$

The two equations, (II) and (V), of two variables are solved to yield the distance, c, that the acoustic wave travels from the sensor 38C (T) to the upper surface of item 14 (E). The value of c is 81.65 mm. Subtracting this distance from the known sensor bar 16C height, s, yields the height, h, of the item 14 upper surface (E) relative to table surface 12 (W) at the position located directly below sensor 38C (T). Thus, $$s = c + h \tag{VI}$$

$$h = s - c \tag{VII}$$

Replacing known values into the above equation yields:

$$h = 100 \text{ mm} - 81.65 \text{ mm} \tag{VIII}$$

$$h = 18.35 \text{ mm} \tag{IX}$$

Thus, the height of the item 14 upper surface (E) relative to the underlying table surface 12 (W) is 18.35 mm.

Similar item 14 height calculations are performed for the cases where the reflected acoustic wave impinges upon the same originating sensor 38C (e.g., when the acoustic wave impinges upon a relatively flat item 14 upper surface) or a different sensor 38C located along the length of the sensor bar 16C. In these cases, the transmitting and receiving sensor(s) 38C units lie in the same horizontal plane (or are the identical unit) at the base of the sensor bar 16C and thus the horizontal distance between the two sensors is simply the linear distance of separation.

If all sensor 38C emitters simultaneously discharge their acoustic waves, then interaction among different emitted waves would cause unpredictable wave patterns and sensor receivers 38C or 39C may not properly associate a detected wave with the proper originating sensor 38C. Multiplexing the operation of each sensor 38C along the length of the sensor bar 16C eliminates this problem by sequentially activating and de-activating each sensor 38C emitter at a fixed length time interval that exceeds the maximum amount of time an emitted acoustic wave from any sensor 38C emitter would require to reach an item 14 upper surface, reflect off of the item 14 surface, and reach any sensor 38C or 39C. This maximum time interval is determined by calculating the time required for an acoustic wave emitted from the sensor 38C located at either end of the sensor bar 16C to reach and reflect off of the table surface 12 directly below the sensor 38C, and then to impinge upon the most distant receiver at the opposite side of the sensor bar 16C.

Implementing a multiplexed fixed length time interval longer than this maximum time ensures that only one sensor 38C emitter is operating at a time and thus reduces the possibility of unwanted acoustic wave interactions from multiple sensor 38C emitters. Similarly, longer time intervals further reduce the possibility that residual acoustic wave bounce-backs between the sensor bar 16C (as well as the sensor panel 200C) and item 14 (or table 12 surface) will cause erroneous detection readings. Such bounce-backs are diminished or eliminated by employing a tapered base and non-reflective (reduced-reflective) surface on the sensor containing underside of the sensor bar 16C as well as on the underside (facing the table surface 12) of the sensor panel 200C.

Figure 18D:
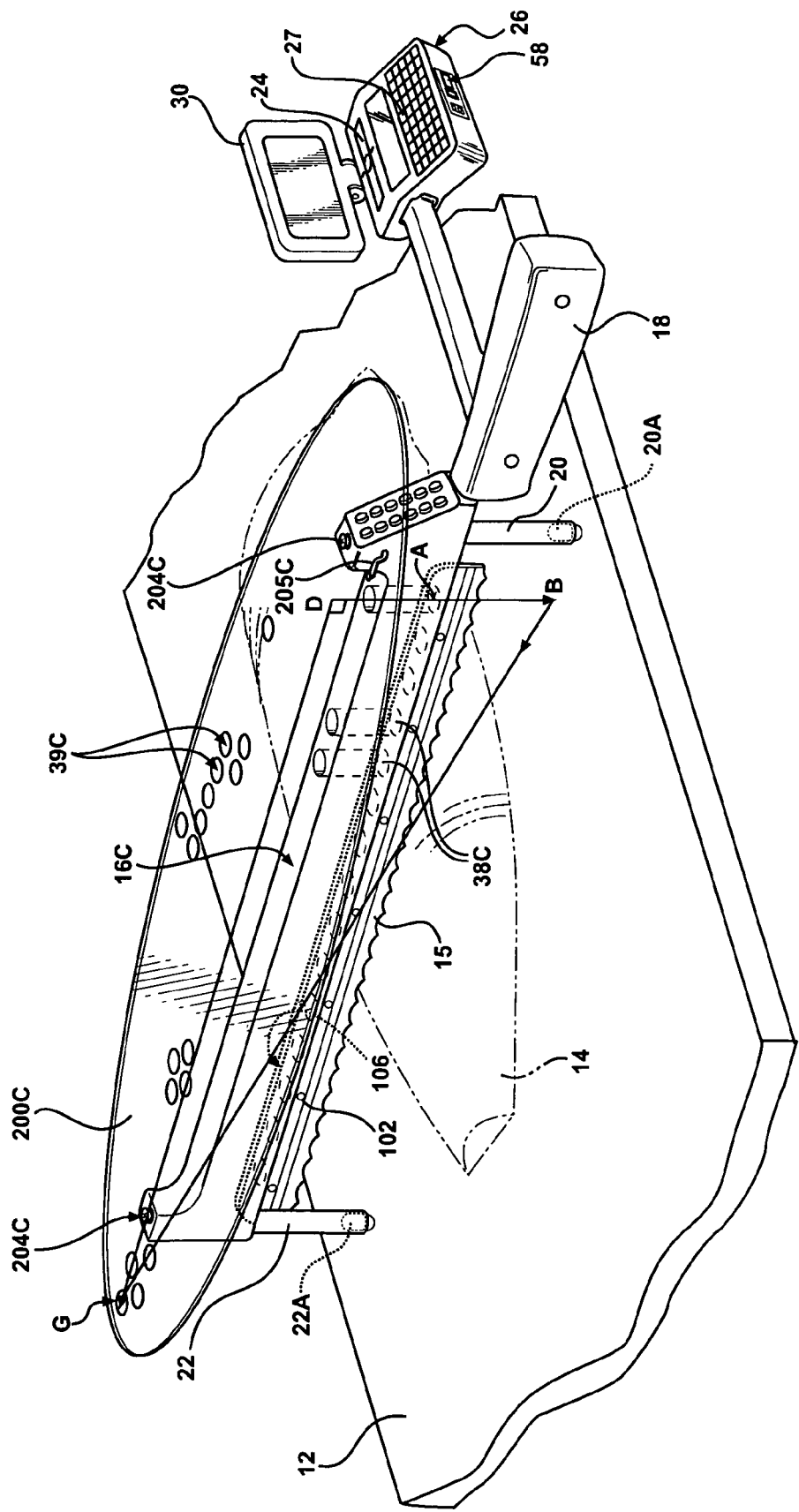
FIG. 18D is a pictorial representation of apparatus shown in FIG. 18B with a diagram of certain distances involved in determining multiplexing values.
Figure 18E:
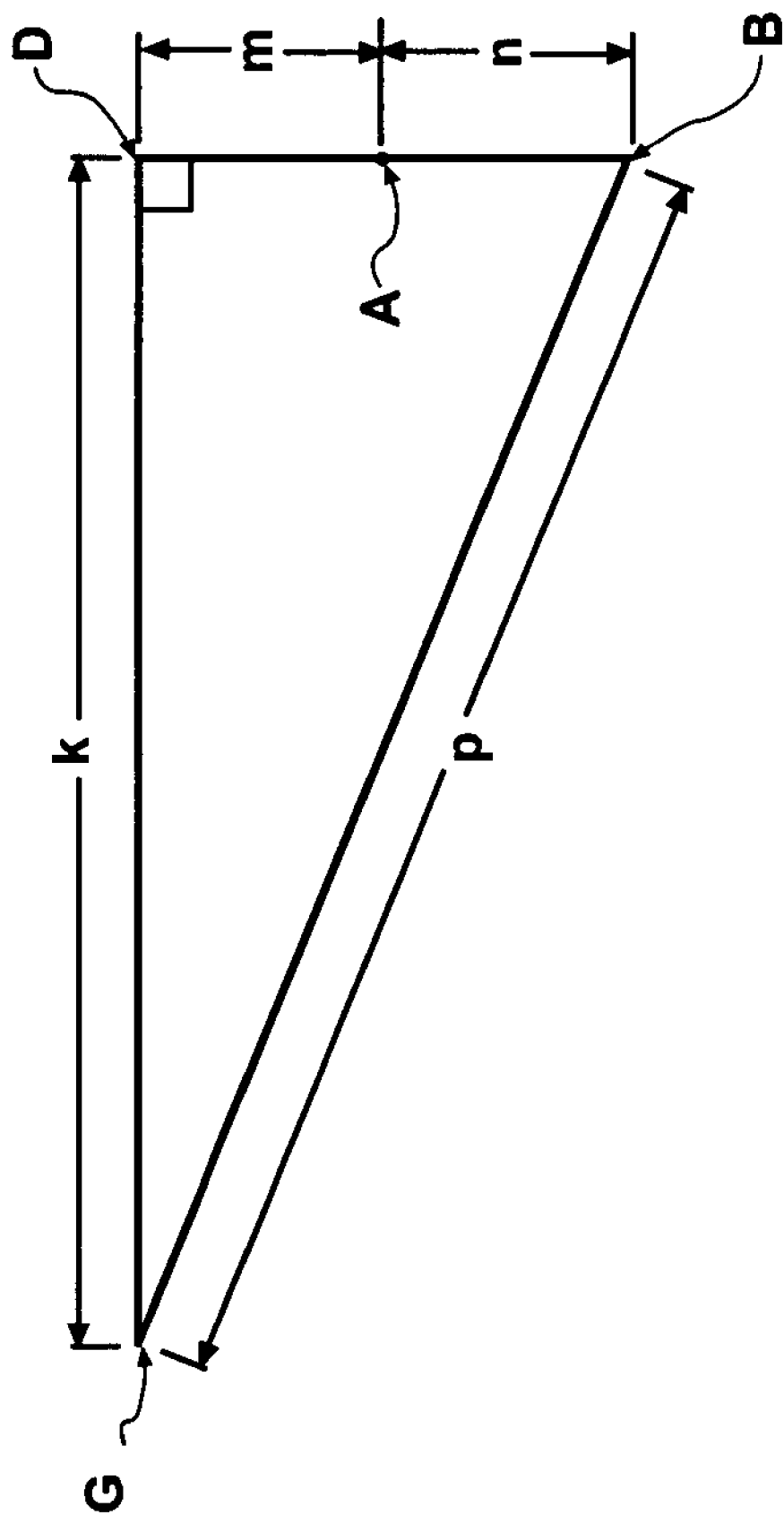
FIG. 18E is a diagram of certain distances used to calculate multiplexing values for the sensor bar shown in FIG. 18D.

Following is an example of a hypothetical sensor bar 16C calculation used to determine the fixed length multiplexing time interval. As previously described, this time interval directly corresponds to the longest possible path for an acoustic wave to travel from any emitting sensor to any receiving sensor. Referring to FIGS. 18D and 18E, the path begins at sensor 38C (A) located at the rightmost sensor 38C position whereby an acoustic wave emitted perpendicularly downwards from this position reaches and reflects off of the table surface 12 (B), and then impinges upon the most distant sensor receiver 39C (G).

The position of the most distant sensor receiver 39C (G) relative to the intercepted table 12 position lies along the median of sensor panel 200C at the opposite end of the sensor bar 16C that contains the emitting sensor 38C (A). As outlined previously, though, the median region of the sensor panel 200C along the length of the sensor bar 16C is devoid of acoustic receivers 39C as the physical presence of the underlying sensor bar 16C prevents acoustic waves from reaching this central area. Although an acoustic wave reflected from the item 14 would actually be blocked from reaching this position by the underside of the sensor bar 16C, this position is used for this calculation as it defines the farthest outer boundary of a reflected acoustic wave position.

Again referring to FIGS. 18D and 18E, the sensor bar 16C height, n, defined as the distance from the base of the sensor bar 16C (A) (position of the sensor 38C) to the table surface 12 (B), is 100 mm. The distance, m, between the sensor 38C (A) and the sensor panel 200C (D) is 20 mm, and the speed, v, of the acoustic wave is 340 mm/ms. The exact position of each sensor 38C (A) and 39C (G) is a known constant for the specific sensor bar 16C and sensor panel 200C utilized. In this example, the horizontal distance, k, between the outermost emitting sensor 38C (A) and the furthest receiving sensor 39C (G) is 300 mm.

The vertices G, D, and B form a right triangle whose 90 degree angle is at vertex D. Applying Pythagoras Theorem, the square of the distance (B) to (G), p, equals the square of the sensor 38C (A) to receiver 39C (G) horizontal distance, k, plus the square of the sensor panel 200C (D) to table surface 12 (B) distance, (m+n). This relationship is expressed as:

$$p^2 = k^2 + (m+n)^2 \quad \text{(I)}$$

Replacing known values into the above equation yields:

$$p^2 = (300 \text{ mm})^2 + (20 \text{ mm} + 100 \text{ mm})^2 \quad \text{(II)}$$

The above reduces to:

$$p = 323.11 \text{ mm} \quad \text{(III)}$$

The total wave travel length, f, is the sum of the two segments n and p. Thus:

$$f = n + p \quad \text{(IV)}$$

Replacing known values into the above equation yields:

$$f = 100 \text{ mm} + 323.11 \text{ mm} \quad \text{(V)}$$

or $$f = 423.11 \text{ mm} \quad \text{(VI)}$$

Since the acoustic wave speed, v, is 340 mm/ms, the total travel time is expressed as:

$$t = f/v \quad \text{(VII)}$$

Replacing known values into the above equation yields:

$$t = 423.11 \text{ mm}/(340 \text{ mm/ms}) \quad \text{(VIII)}$$

or $$t = 1.24 \text{ ms} \quad \text{(IX)}$$

Thus, as the time interval corresponding to the longest possible path for any acoustic wave to travel from an emitting sensor to a receiving sensor is 1.24 ms, a fixed multiplexing time interval longer than 1.24 ms is employed.

As previously indicated, an acoustic wave reflected from a sharply angled item 14 surface may avoid detection by bypassing both the linear sensor 38C array along the base of the sensor bar 16C as well as the two-dimensional sensor 39C array embedded in sensor panel 200C. In this case, the reflected wave travels beyond the sensor panel 200C by entering an "open air region" that is in-between the table surface 12 and the sensor panel 200C. Similarly, an acoustic wave emitted from a sensor 38C would not be detected if it impinges upon a non-reflective surface region of the item 14. This latter occurrence can be avoided by applying (spraying, painting, dipping, etc) an appropriate coating onto the item 14 surface.

If during the allotted multiplexed fixed time interval an expected reflected acoustic wave is not received by a sensor 38C or 39C, the item 14 height at the originating sensor 38C position can be obtained by extrapolating calculated height values determined for surrounding sensor 38C or 39C positions.

As the speed of acoustic waves traveling in air varies for different air temperatures, the controller-signal processor case 26 contains a miniature temperature sensor 304 (shown in FIG. 1A) that continuously measures the operating environment air temperature. Air vent 310 allows free circulation of ambient air to the temperature sensor 304. The signal processor 300 continuously cross references the measured air temperature against a stored temperature versus wave-speed look-up table in memory to mathematically compensate the temperature dependent item 14 height calculations to ensure their accuracy. In lieu of using the above described look-up table, the signal processor 300 may use the measured air temperature value in a wave speed approximation formula to calculate the temperature adjusted acoustic wave speeds. Other parameters affecting air speed such as humidity and air pressure can similarly be adjusted for, whereby the operator enters such information into the signal processor 300 via keypad 27.

Again referring to FIG. 18B, as sensor bar 16C traverses the item 14 and the position of the sensor bar 16C reaches the desired weight (or cost) of the item 14, the operator manually applies a downward pressure on the sensor bar 16C causing both retractable support posts 20 and 22 to retract upwards resulting in knife 15 moving downwards and making contact with the item 14. Simultaneously applying a continued downward pressure and exerting a back and forth sawing motion across the item 14 surface results in the item 14 being completely cut to form the desired segment. Knife blade 15 may also be used only to mark (score) the item 14 surface whereupon an independent cutting tool may be used to perform the final cutting of the item 14. Alternatively, previously described marking plungers 46C may be employed to indicate the exact cutting line whereupon the item 14 is subsequently cut by a knife or other cutting instrument.

After the item 14 is completely cut (or scored) and the sensor bar 16C is again elevated by action of the spring-loaded retractable posts 20 and 22 fully extending themselves, the operator depresses the appropriately designated "reset" pushbutton 56A–56K causing the display 30 to clear and the signal processor 300 to ready the sensor bar 16C for new item 14 data. The sensor bar 16C is now ready to traverse over a new item 14.

Reflecting Optical Height Sensor Used On Relatively Flat Item 14 Surfaces

Figure 19A:
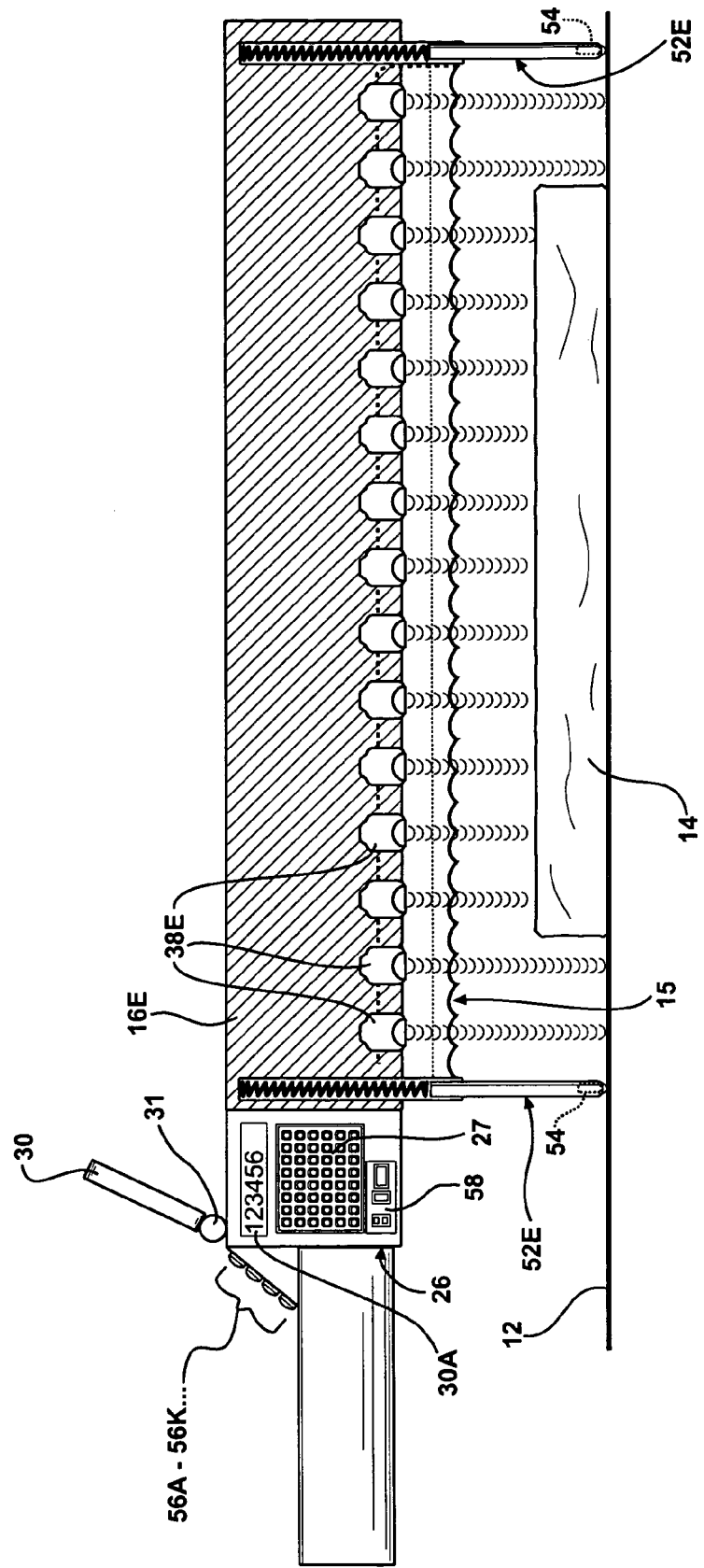
FIG. 19A is a partially sectional view of a sensor bar incorporating optical detectors used to determine the height of points on a flat shaped item shown resting on a table surface, with a diagrammatic representation of light waves impinging on the item.

Referring to FIG. 19A, an optical height sensor 38E is shown incorporated in the sensor bar 16E as a linear array arranged along the length of the sensor bar 16E. Each optical height sensor 38E is comprised of an optical emitter/receiver unit embedded in the sensor bar 16E. Various optical emitter/receiver technologies may comprise the height sensor 38E. Examples of optical emitters include (but are not limited to) LED and laser units, while examples of optical receivers include (but are not limited to) CCD (Charged Coupled Devices) and other PSD (Position Sensitive Detectors) such as photodiodes or photodiode arrays. Thus, a separate optical emitter and receiver comprise each height sensor 38E.

As the sensor bar 16E traverses the item 14, the optical emitters 38E pulse the upper surface of the item 14 lying beneath the sensor bar 16E. The determination of the height of the item 14 top surface above the table surface 12 directly below each sensor 38E corresponds to the round-trip time required for an emitted optical wave to reach, reflect off of the item 14 top surface, and return to the respective overhead optical sensor 38E. Subtracting the optically determined sensor bar 16E to item 14 distance from the known (constant) sensor bar 16E height (base of sensors 38E to table surface 12 distance) yields the height of the item 14 upper surface relative to the table surface 12 directly below the respective originating overhead sensor 38E.

Calculations regarding the optically determined height of an item 14 are similar to those previously presented regarding the acoustically determined height of an item 14 in the section entitled "Reflecting Acoustic Height Sensor Used On Relatively Flat Item 14 Surfaces". The primary operational and computational difference is that the speed of light is used in place of the speed of the acoustic waves.

Many methods may be employed to determine the aforementioned Time-Of-Flight, or round-trip travel time required for an optical wave to reach and reflect off of the item 14 upper surface and then return to the originating optical sensor 38E. Some methods involve determining the optical wave round-trip travel time for a single wave pulse, while others average round-trip times produced by multiple waves of light. Additional methods include (but are not limited to) transmission/receiver systems that use phase shifting which compares the phase shift between emitted modulated waves and the returned waves. Such methods have the advantage of reducing background noise and false readings. Optical Time-Of-Flight determination is commonplace for computing distances in many devices such as surveying distance measurement equipment, range finders, as well as various displacement detection mechanisms.

Multiplexing the operation of sensor 38E units along the sensor bar 16E in order to avoid unwanted optical wave interactions from multiple sensor 38E units is similar to that previously presented regarding multiplexing acoustic sensor 38C units in the section entitled "Reflecting Acoustic Height Sensor Used On Relatively Flat Item 14 Surfaces". Determination of the multiplexing time interval and subsequent calculation of the item 14 height is similar to that described for the acoustic wave sensor bar 16C, with the notable operational and computational difference that the speed of light is used in place of the speed of the acoustic waves employed.

A sensor 38E may not receive back an emitted optical wave within the allocated multiplexed fixed time interval due to the item 14 surface containing an area(s) that are non-reflective. The application (spraying, painting, dipping, etc.) of an appropriate coating onto the item 14 surface eliminates this phenomenon. A sensor 38E also may not receive back an emitted optical wave within the multiplexed time interval due to the item 14 having an irregular (angled) or relatively non-flat surface. Such surfaces cause the incident optical wave to reflect in directions other than directly back to the originating sensor 38E position. The implementation of an enlarged optical receiver panel enables the successful detection of the scattered reflected waves. This sensor panel enables both the detection and interpretation of the errant waves and is fully described in the section entitled "Reflecting Optical Height Sensor Used On Irregular (or Flat) Item 14 Surfaces". Malfunctioning or debris covered 38E sensors as well as other conditions may also prevent the detection of an emitted wave. Regardless of the cause, the item 14 height at the originating sensor 38E position is obtained by extrapolating height values determined from surrounding sensor 38E positions.

Increasing the density (the number of sensor 38E units) positioned along the sensor bar 16E enables the collection of more coordinate data points per given surface area of item 14, and hence increases the overall accuracy of the volume and resultant weight and cost (based on weight) calculations.

Again referring to FIG. 19A, as sensor bar 16E traverses the item 14 and the position of the sensor bar 16E reaches the desired weight (or cost) of the item 14, the operator manually applies a downward pressure on the sensor bar 16E causing both retractable support posts 52E to retract upwards resulting in knife 15 moving downwards and making contact with the item 14.

Simultaneously applying a continued downward pressure and exerting a back and forth sawing motion across the item 14 surface results in the item 14 being completely cut to form the desired segment. Knife blade 15 may also be used only to mark (score) the item 14 surface whereupon an independent cutting tool may be used to perform the final cutting of the item 14. Alternatively, previously described marking plungers 46C may be employed to indicate the exact cutting line whereupon the item 14 is subsequently cut by a knife or other cutting instrument.

After the item 14 is completely cut (or scored) and the sensor bar 16E is again elevated by action of the spring-loaded retractable posts 52E fully extending themselves, the operator depresses the appropriately designated "reset" pushbutton 56A–56K causing the display 30 to clear and the signal processor 300 to ready the sensor bar 16E for new item 14 data. The sensor bar 16E is now ready to traverse over a new item 14.

For sensor bar implementations 2A, 2B, 2C, or 2D that utilize acoustic sensors 38C, the item 14 can be scored and or cut using a separate knife, rotary cutting blade, laser cutter, guillotine, or other slicing or chopping mechanism.

The use of the term "optical" and "light" in this application does not imply only the use of the visible wave portion of the electromagnetic spectrum, but includes all portions (e.g., infrared) of the spectrum that exhibit necessary characteristics of the described technology.

Reflecting Optical Height Sensor Used on Irregular (or Flat) Item 14 Surfaces The above section entitled "Reflecting Optical Height Sensor Used On Relatively Flat Item 14 Surfaces" describes the interaction of optical waves on a relatively flat item 14 surface. Specifically, an emitted optical wave from a sensor 38E reflects off of the item 14 at a near (allowing for small surface deviations) 90 degree angle relative to the item 14 surface and returns to the same originating sensor 38E. If, however, a sensor 38E emits an optical wave that interacts with an appreciably irregular (angled) surface portion of the item 14, the reflected optical wave will not return to the sensor 38E where the wave initially originated, but instead will propagate in the direction dictated by the angle of reflection at the item 14 surface according to the Law Of Reflection which states "An wave incident upon a reflective surface will be reflected at an angle equal to the incident angle".

Figure 19B:
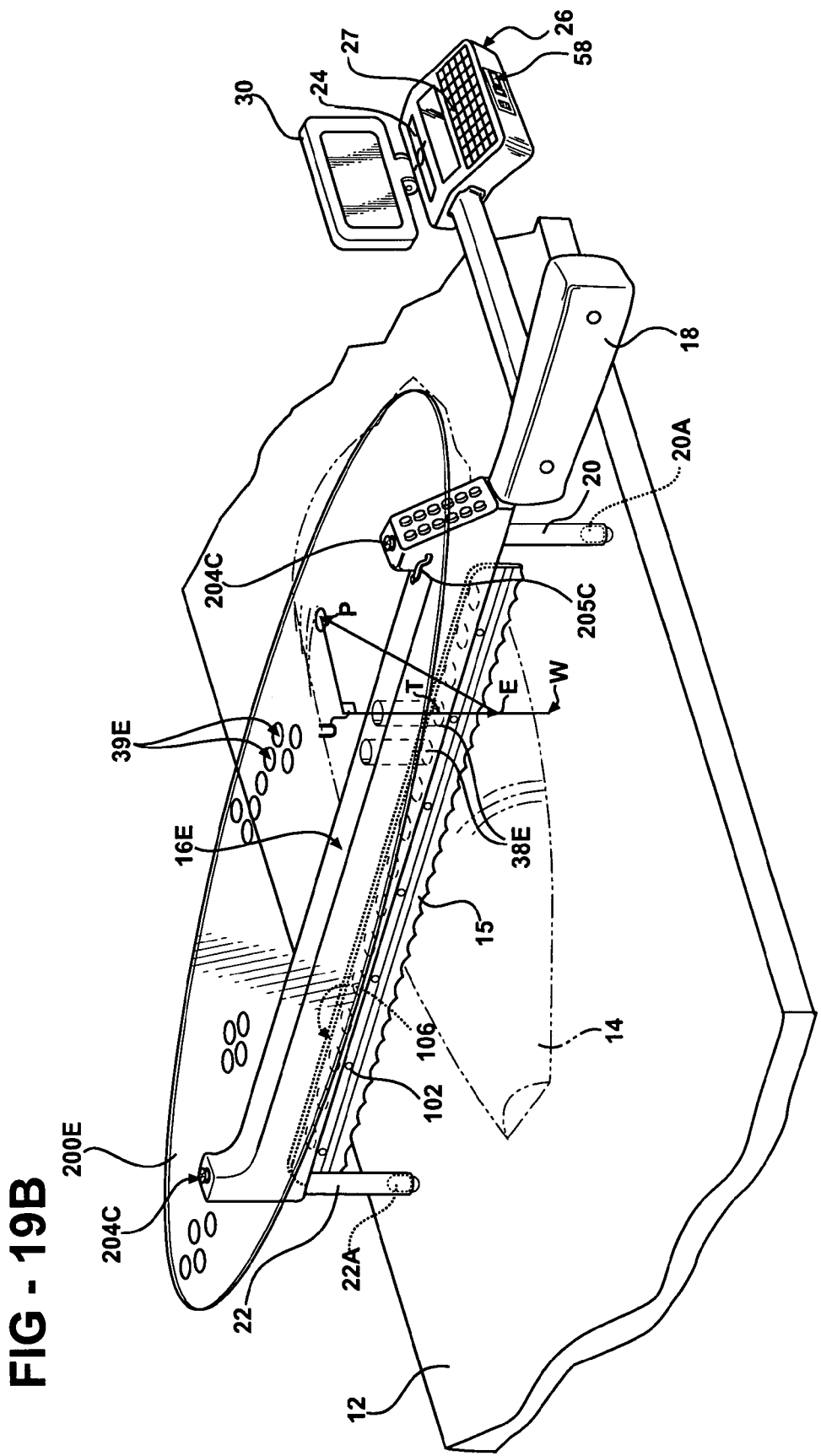
FIG. 19B is a pictorial representation of another embodiment of an apparatus according to the invention incorporating a two dimensional array of optical height sensors on a sensor bar, with a diagram of distances involved in calculating the height of the points of the curved surface item shown.

Referring to FIG. 19B, the detection of optical waves reflected from irregular (angled) item 14 surface areas is achieved by implementing a two-dimensional array of optical receivers 39E embedded into a clear sensor panel 200E that is orthogonally affixed to the top of the sensor bar 16E. Each optical receiver 39E detects the presence and magnitude (amplitude) of optical waves impinging upon its surface. Various optical receiver technologies may comprise the optical receiver 39E. An active sensor element such as a CCD (Charged Coupled Device) enables the detection of both the presence and magnitude of incident optical waves.

In the previous section entitled, "Reflecting Optical Height Sensor Used On Relatively Flat Item 14 Surfaces" each sensor 38E positioned along the sensor bar 16E is both sequentially activated and deactivated before a successive sensor 38E is activated. This multiplexing procedure prevents an optical wave emitted from one sensor 38E from being detected by a different sensor 38E, and helps eliminate unwanted wave interactions. In the case of waves reflecting off an irregular item 14 surface and the use of sensor panel 200E, the position of the specific (to be impinged) sensor receiver is not known in advance, and hence all sensor receivers are simultaneously active and awaiting for possible impingement from a reflected wave.

As the optical wave reflecting off of the item 14 surface may impinge upon a number of nearby optical receivers 39E (or 38E), the optical receiver 39E (or 38E) that detects the strongest magnitude (amplitude) optical signal is considered to be the receiver most inline with the reflected wave. Other methods used to determine the receiver most inline with the reflected wave include (but are not limited to) calculating the mathematical central point of all impinged receivers and selecting the receiver 39E (or 38E) closest to this point.

Increasing the density (number) of optical receivers 39E (and 38E) embedded in sensor panel 200E (and along the length of the sensor bar 16E) increases the accuracy of detection of optical waves reflected off of the item 14, and hence increases the resultant accuracy of the item 14 height calculations. Similarly, decreasing the beam width of sensor 38E emitted waves reduces the number of optical receivers impinged upon, and hence increases the accuracy of detecting the most in-line reflected wave thereby increasing the accuracy of the item 14 height calculations.

The shape of sensor panel 200E may be varied, e.g., elliptical, circular, rectangular, etc. The larger the surface area of sensor panel 200E that overlays the item 14, the more optical waves that are reflected off the item 14 surface will be detected. This assumes, of course, that the density of embedded optical receivers 39E in panel 200E is sufficiently large to capture the optical waves reflected from the item 14.

High degrees of irregularity (e.g., steep surface angles) on the item 14 surface result in high angles of optical wave deflection relative to the optical wave path defined by the originating optical sensor 38E position to the interception point on the item 14 surface. Thus, high degrees of surface irregularity result in more reflected optical waves being detected towards the outward boundaries of sensor panel 200E.

As the sensor panel 200E is easily detached by means of two screws 204C and a recessed data cable 205C near one of the screw mountings, sensor panels of various shapes and embedded receiver 39E densities can easily be installed/exchanged to match the degree of surface irregularity (and hence the degree of optical wave reflection) of the item 14. Sensor panel 200E is composed of a clear material whereupon the sensors 39E are embedded, thus enabling the operator to view the underlying item 14 during operation of the sensor bar 16E. The underside of the sensor panel is non-reflective (low-reflectance) to inhibit waves that impinge upon the sensor panel from reflecting back downward and then again reflecting upward towards sensors 38E or 39E.

The thin median region of the sensor panel 200E along the length of the sensor bar 16E is devoid of active optical receivers 39E as the physical presence of the underlying sensor bar 16E prevents optical waves from reaching this central area. Optical waves that otherwise would of reached this area along the median region of sensor panel 200E are detected by the optical sensors 38E positioned along the base of the sensor bar 16E. Item 14 height calculations are simply adjusted to account for the difference in physical height between the 38E sensor array embedded along the base of the sensor bar 16E and the 39E sensor array embedded in the panel 200E.

As the sensor bar 16E (FIG. 19B) traverses the item 14, the optical emitters 38E pulse the upper surface of the item 14 lying beneath the sensor bar 16E. The determination of the height of the item 14 upper surface relative to the table surface 12 directly below each sensor 38E corresponds to the time required for an emitted optical wave to reach and reflect off of the item 14 upper surface, and either impinge upon the same optical sensor 38E (if the underlying item 14 surface portion is relatively flat), or impinge upon a different optical sensor 38E along the length of the sensor bar 16E, or impinge upon an optical receiver 39E embedded in sensor panel 200E. A sharply angled reflected optical wave may avoid detection by bypassing both the linear sensor 38E array and the sensors 39E embedded in sensor panel 200E.

In this case, the reflected wave travels beyond the boundaries of the sensor panel 200E by entering an "open air region" that is in-between the table surface 12 and the sensor panel 200E. Similarly, an optical wave emitted from a sensor 38E is not detected if it impinges upon a non-reflective surface region of the item 14. The method of handling these non-detection exception cases is discussed in a following section.

Subtracting the optically determined sensor 38E to item 14 upper surface distance from the known (constant) sensor bar 16E height (base of sensor 38E to table surface 12 distance) yields the height of the item 14 upper surface relative to the underlying table surface 12 at the position located directly below sensor 38E.

Calculations regarding the optically determined height of an item 14 are similar to those previously presented regarding the acoustically determined height of an item 14 in the section entitled "Reflecting Acoustic Height Sensor Used On Irregular (or Flat) Item 14 Surfaces". The primary operational and computational difference is that the speed of light is used in place of the speed of acoustic waves.

If all sensor 38E emitters simultaneously discharge their optical waves, then interaction among different emitted waves would cause unpredictable wave patterns and sensor receivers 38E or 39E may not properly associate a detected wave with the proper originating sensor 38E. Multiplexing the operation of each sensor 38E along the length of the sensor bar 16E eliminates this problem by sequentially activating and de-activating each sensor 38E emitter at a fixed length time interval that exceeds the maximum amount of time an emitted optical wave from any sensor 38E emitter would require to reach an item 14 upper surface, reflect off of the item 14 surface, and reach any sensor 38E or 39E. This maximum time interval is determined by calculating the time required for an optical wave emitted from the sensor 38E located at either end of the sensor bar 16E to reach and reflect off of the table surface 12 directly below the sensor 38E, and then to impinge upon the most distant receiver at the opposite side of the sensor bar 16E.

Implementing a multiplexed fixed length time interval longer than this maximum time ensures that only one sensor 38E emitter is operating at a time and thus reduces the possibility of unwanted optical wave interactions from multiple sensor 38E emitters. Similarly, longer time intervals further reduce the possibility that residual optical wave bounce-backs between the sensor bar 16E (as well as the sensor panel 200E) and item 14 (or table 12 surface) will cause erroneous detection readings. Such bounce-backs are diminished or eliminated by employing a tapered base and non-reflective (reduced-reflective) surface on the sensor containing underside of the sensor bar 16E as well as on the underside (facing the table surface 12) of the sensor panel 200E.

As previously indicated, an optical wave reflected from a sharply angled item 14 surface may avoid detection by bypassing both the linear sensor 38E array along the base of the sensor bar as well as the two-dimensional sensor 39E array embedded in sensor panel 200E. In this case, the reflected wave travels beyond the sensor panel 200E by entering an "open air region" that is in-between the table surface 12 and the sensor panel 200E. Similarly, an optical wave emitted from a sensor 38E would not be detected if it impinges upon a non-reflective surface region of the item 14. This latter occurrence can be avoided by applying (spraying, painting, dipping, etc) an appropriate coating onto the item 14 surface.

If during the allotted multiplexed fixed time interval an expected reflected optical wave is not received by a sensor 38E or 39E, the item 14 height at the originating sensor 38E position can be obtained by extrapolating calculated height values determined for surrounding sensor 38E or 39E positions.

Again referring to FIG. 19B, as sensor bar 16E traverses the item 14 and the position of the sensor bar 16E reaches the desired weight (or cost) of the item 14, the operator manually applies a downward pressure on the sensor bar 16E causing both retractable support posts 20 and 22 to retract upwards resulting in knife 15 moving downwards and making contact with the item 14. Simultaneously applying a continued downward pressure and exerting a back and forth sawing motion across the item 14 surface results in the item 14 being completely cut to form the desired segment. Knife blade 15 may also be used only to mark (score) the item 14 surface whereupon an independent cutting tool may be used to perform the final cutting of the item 14. Alternatively, previously described marking plungers 46C may be employed to indicate the exact cutting line whereupon the item 14 is subsequently cut by a knife or other cutting instrument.

After the item 14 is completely cut (or scored) and the sensor bar 16E is again elevated by action of the spring-loaded retractable posts 20 and 22 fully extending themselves, the operator depresses the appropriately designated "reset" pushbutton 56A–56K causing the display 30 to clear and the signal processor 300 to ready the sensor bar 16E for new item 14 data. The sensor bar 16E is now ready to traverse over a new item 14.

The use of the term "optical" and "light" in this application does not imply only the use of the visible wave portion of the electromagnetic spectrum, but includes all portions (e.g., infrared) of the spectrum that exhibit necessary characteristics of the described technology.

"Penetrating" Wave Height Sensor

Referring to FIG. 20, a penetrating acoustic or electromagnetic based height sensor 38D is shown incorporated in the sensor bar 16D as a linear array arranged along the length of the sensor bar 16D. Each penetrating height sensor 38D is comprised of an emitter/receiver unit embedded in the sensor bar 16D. As the sensor bar 16D traverses the item 14, the emitters 38D pulse the item 14 lying beneath the sensor bar 16D. Unlike the previously described sensor bars 16 whose item 14 height determination is based upon wave emissions that are reflected from the item 14 upper surface, the height of the item 14 upper surface relative to the table 12 surface directly below a sensor 38D corresponds to the round-trip time required for a wave pulse to leave the sensor 38D emitter, penetrate the item 14, reflect off of the table surface 12, re-penetrate the item 14, and then return to the respective sensor 38D receiver. Penetrating wave sensors thus eliminate the need for a sensor panel 200C type of configuration as waves do not reflect off of the item 14 surface, but instead return to their originating sensor 38D.

For a given set of conditions (e.g., temperature, humidity, etc), experimentally determined correspondences between round-trip wave propagation times and item 14 thickness is produced. For example, it may be experimentally determined that a 1 second round-trip time is required for a wave pulse to leave an emitter 38D, penetrate a 1 cm thick item 14, reflect off of the table surface 12, re-penetrate the item 14, and then return to the respective sensor 38D receiver. Creating a time versus distance equivalence lookup table that is stored electronically in the memory of signal processor 300 in case 26 enables the determination of item 14 thickness by equating sensor bar 16D determined round-trip wave travel times to pre-determined item 14 thickness values. Sensor bars 16D employ different types of sensors 38D with correspondingly different types of waves in order to accommodate items 14 of various compositions.

INDUSTRIAL APPLICATIONS

Various industrial applications may utilize different configurations of the sensor arm designs presented. Adaptations to the described devices are easily accommodated to meet the requirements of automated assembly lines as specific sensor bar features may easily be added or omitted from a configuration. For example, items 14 may pass via a conveyor belt under a stationary sensor bar 16 whereupon an automatic chopping blade, laser, rotary blade, or high-pressure water cutter cuts the items 14 into specific portions based on volume, weight or cost. Alternately, a movable sensor bar 16 may traverse over stationary single or multiple items 14 whereupon the items 14 are either marked for cutting or cut by implements such as the aforementioned cutting tools. In either arrangement, the knife 15 and retractable sensor bar 16 support posts 20 and 22 are omitted from the configuration.

As each sensor arm contains a signal processor 300, flexible bi-directional communication and control by a centralized computer enables the simultaneous monitoring and operation of many sensor arms.

ADDITIONAL APPLICATIONS FOR ABOVE DESCRIBED SENSOR BARS

The above described sensor bars may also be used as a low cost, compact, hand-held (or table unit) device used to determine 3-dimensional coordinate positions, volumes, and associated weights of various objects (items 14). Such data may be transferred into graphics or other data-manipulation software programs, e.g., architectural, drafting, and CAD (Computer Assisted Drawing), via input/output ports 58 or wireless communications module 308. As this use of the above described sensor bars does not involve cutting or marking the above referenced objects, knife 15 and the aforementioned marking/scoring facilities may be omitted for this implementation.

The invention claimed is:

1. An apparatus for displaying numeric values corresponding to the volume of any selected segment less than the whole of an item having an irregular shape, comprising:
    a support surface for supporting said item;
    a sensor bar;
    a support for positioning said sensor bar over said support surface, spaced above and extending across said item in a manner allowing said sensor bar to be passed over said item and positioned above any selected section of said item from any other position along said item so as to visually define a segment of said item less than the whole of said item;
    a displacement detector arrangement which generates signals corresponding to the displacement of said sensor bar from any reference position along said item in being positioned over any selected section of said item;
    a sensor arrangement generating signals corresponding to the cross sectional contour of successive sections of said item passing beneath said sensor bar as said sensor bar is moved to be positioned over said selected section of said item;
    a signal processor responsive to said signals generated by said displacement detector arrangement and said sensor arrangement to compute therefrom the volume of a selected segment of said item less than the whole of said item defined by movement of said sensor bar in moving over said item from said reference position to a position over said selected section of said item intermediate the length of said item; and
    a display displaying a numeric value corresponding to said volume of said selected segment of the item as computed by said signal processor at the same time that said sensor bar is in position over said selected section of said item.

2. The apparatus according to claim 1 wherein said support for said sensor bar includes a pair of support posts each extending downwardly from said sensor bar at a respective end thereof, said support posts each having a lower end contacting said support surface to provide said support of said sensor bar at a predetermined height above said surface and allow said sensor bar to be stroked over said item on said support surface.

3. The apparatus according to claim 2 wherein each of said support posts has an associated respective displacement detector which generates signals corresponding to the displacement of the lower end of the respective support post, said respective displacement detectors together comprising said displacement detector arrangement.

4. The apparatus according to claim 3 wherein each of said displacement detectors comprises an optical tracking assembly including a light emitter directing a light beam at said support surface and a light receiver receiving a light reflection from said support surface, and an image analyzer analyzing successive images received by said receiver to determine the extent and direction of displacement of said respective support post.

5. The apparatus according to claim 3 wherein each of said displacement detectors includes a ball mounted on the lower end of said associated support post engaging said support surface to be rolled by movement of said associated support post. X-Y axis rollers engaged with said ball to be rolled by rolling movement of said ball along either axis, and an optical encoder arrangement sensing the rotation of each roller to thereby generate signals corresponding to the extent and direction of displacement of each support post.

6. The apparatus according to claim 3 wherein said displacement detector arrangement comprises said support surface having a pressure sensitive covering and each support post lower end is pointed to generate pressure on said pressure sensitive surface to create corresponding signals as said associated support post is displaced thereon.

7. The apparatus according to claim 6 wherein said signals correspond to the extent and direction of said displacement of said lower end of each of said support posts.

8. The apparatus according to claim 2 wherein said displacement detector arrangement comprises an electromagnetic coil associated with each support post, and a grid in said support surface generating electrical signals corresponding to the extent and direction of movement of each support post across said support surface.

9. The apparatus according to claim 2 wherein said displacement detector arrangement comprises a respective displacement detector associated with each of said two support posts.

10. The apparatus according to claim 9 wherein each displacement detector generates signals corresponding to the extent and direction of displacement of each support post on said support surface.

11. The apparatus according to claim 9 wherein each displacement detector generates signals corresponding to the displacement of each support post on said support surface.

12. The apparatus according to claim 2 wherein said support posts are selectively retractable, and further including a knife blade attached to extend alongside said sensor bar, said knife blade having a cutting edge exposed when said support posts are retracted.

13. The apparatus according to claim 12 wherein said knife blade is readily detachable from said sensor bar for easy replacement.

14. The apparatus according to claim 2 further including a second pair of support posts spaced laterally from said first mentioned pair of support posts and extending downwardly from said sensor bar to contact said support surface, providing a four cornered stable support for said sensor bar.

15. The apparatus according to claim 2 further including an alarm indicating an unallowable operation including the tilt of said sensor bar and support posts being out of plumb to a predetermined degree.

16. The apparatus according to claim 2 further including a level indicator fixed with respect to said sensor bar indicating a tilt condition of said attached support posts and sensor bar.

17. The apparatus according to claim 1 wherein said support surface comprises a controllable power conveyor carrying said item positioned thereon past said sensor bar to thereby pass said sensor bar over said item by movement of said item by said controllable power conveyor.

18. The apparatus according to claim 1 wherein said support for said sensor bar comprises a pair of uprights each having an upper end connected to a respective end of said sensor bar, and a lower end supported with respect to said support surface for guided movement of said sensor bar across said support surface, so as to constrain movement of said sensor bar over said support surface to be along a fixed axis and in a fixed orientation.

19. The apparatus according to claim 18 wherein said displacement detector arrangement includes an elongated optical grid extending along said support surface, a skewed reader grid mounted to one of said uprights and over said elongated grid to create a two directional shifting and readable Moiré fringe pattern upon displacement of said one upright.

20. The apparatus according to claim 1 wherein said sensor bar support allows free and unconstrained manual movement of said sensor bar in any direction on said support surface.

21. The apparatus according to claim 20 wherein said sensor bar support allows said sensor bar to be manually freely lifted off and away from said support surface.

22. The apparatus according to claim 1 wherein said sensor arrangement comprises a single sensor movably mounted on said sensor bar and a sensor drive causing said sensor to scan said item to generate signals corresponding to the cross sectional contour of a section of said item extending along and beneath said sensor bar.

23. The apparatus according to claim 1 further including a cutter device and a motor selectively driving said cutter device along said sensor bar to cut said item in a direction extending along said sensor bar.

24. The apparatus according to claim 1 wherein said sensor arrangement comprises a series of spaced apart vertically extendable plungers arranged along said sensor bar, each plunger biased downwardly to be urged towards said support surface to bring a tip thereof into contact with an upper surface of said item or the support surface lying below said plungers, and a sensor for each plunger generating signals corresponding to the distance an associated plunger is extended, said signal processor receiving said signals and determining therefrom the height above said support surface of a point on said upper surface of said item lying beneath a respective plunger to thereby determine the cross-sectional contour of each successive section of said item extending in a direction along said series of plungers.

25. The apparatus according to claim 24 further including a respective solenoid associated with each plunger selectively operable to overcome the downward urging thereof and retract said associated plunger out of contact with said support surface and said item.

26. The apparatus according to claim 25 further including a magnet located above each plunger holding a retracted plunger in position until said associated solenoid is operated to overcome the force of said magnet.

27. The apparatus according to claim 25 further including a knife blade attached to said sensor bar extending along said series of plungers, said knife blade having a cutting edge exposed when said plungers are retracted.

28. The apparatus according to claim 24 wherein at least two extendable and retractable marking plungers are mounted on said sensor bar, each marking plunger having a sharp tip engaging said item when said plunger is extended enabling scoring of said item by movement of said sensor bar.

29. The apparatus according to claim 24 wherein at least two marking plungers are included each having a selectively operable marker device for marking an upper surface of said item lying beneath said sensor bar to enable cutting of said item along markings applied thereby across said item.

30. The apparatus according to claim 29 wherein each of said marking plungers has an optical emitter-receiver array adjacent to one side of each of said plungers, each emitter emitting a beam towards said side of said associated marking plunger, each receiver positioned to receive a reflected beam from said one side of a respective marking plunger, and a signal processor for determining the distance said associated marking plunger is extended from signals received from said emitter-receiver to thereby enable determination of the height of the point on said upper surface of said item contacted by said associated marking plunger.

31. The apparatus according to claim 30 wherein said signal processor also determines from said emitter-receiver signals when each of said marking plungers comes to rest against a top surface of said item.

32. The apparatus according to claim 30 wherein said signal processor also determines from said emitter-receiver signals when each of said marking plungers is fully retracted.

33. The apparatus according to claim 24 wherein each of said plungers has an optical emitter-receiver array adjacent to one side of each of said plungers, each emitter emitting a beam towards said side of said associated plunger, each receiver positioned to receive a reflected beam from said one side of a respective plunger, and a signal processor for determining the distance said associated plunger is extended from signals received from said emitter-receiver to thereby enable determination of the height of the point on said upper surface of said item contacted by said associated plunger.

34. The apparatus according to claim 33 wherein said signal processor also determines from said emitter-receiver signals when each of said plungers comes to rest against a top surface of said item.

35. The apparatus according to claim 33 wherein said signal processor also determines from said emitter-receiver signals when each of said plungers are fully retracted.

36. The apparatus according to claim 24 wherein at least two of said plungers each have a marker device mounted thereto and which is selectively operable to mark an upper surface of said item.

37. The apparatus according to claim 36 wherein each marker device comprises a sharp tip of said associated plunger, and further including a locking mechanism for locking said associated plunger in any of a plurality of extended positions to enable pressure to be exerted on said item by said plunger sharp tip.

38. The apparatus according to claim 1 further including a marking arrangement on said sensor bar selectively operable to mark the upper surface of said item along a line lying below and along said sensor bar to provide cutting guide marks on said item.

39. The apparatus according to claim 38 wherein said marking arrangement includes at least two ink jet printer devices able to print marks on an upper surface of said item.

40. The apparatus according to claim 39 wherein said ink jet printer device is capable of marking said item with one of a plurality of ink colors.

41. The apparatus according to claim 40 further including a color sensor on said sensor bar detecting the color of said item, said ink jet printer device selecting one of said plurality of ink colors automatically to mark said item with an ink color contrasting to said sensed color of said item.

42. The apparatus according to claim 40 wherein a look up table is included having color data on different types of items and color data on a plurality of inks of different colors available from said printer device, said ink jet printer device activated by said signal processor so as to mark said item with a contrasting color to said item color.

43. The apparatus according to claim 38 wherein said marking arrangement includes a plurality of marker devices mounted along said sensor bar, and wherein each marker device comprises a thermal marker mounted to a retractable plunger selectively operable to burn a mark on said item upper surface beneath said sensor bar.

44. The apparatus according to claim 38 wherein said marking arrangement includes a laser scoring marker supported by said sensor bar.

45. The apparatus according to claim 44 further including a collar on said laser scoring marker device acting to shield said laser marker from debris.

46. The apparatus according to claim 38 wherein said marking arrangement includes a sharp instrument mounted on a retractable plunger for scoring said item.

47. The apparatus according to claim 38 wherein said marking arrangement includes a spacer collar mounted thereto preventing contact of said marking arrangement with said item to thereby avoid deposit of debris from said item thereon.

48. The apparatus according to claim 38 further including a cutting device arranged to cut across said item, and including a marking sensor detecting said marking of said marking arrangement guiding cutting of said item by said cutting device.

49. The apparatus according to claim 1 wherein said sensor arrangement comprises at least one sensor emitting a penetrating beam at points on said item lying along said sensor bar to determine the cross-sectional contour of said item.

50. The apparatus according to claim 1 further including a cutting device mounted on said sensor bar for traversing movement therealong and selectively engageable with said item to cut a segment therefrom along a direction extending along and beneath said sensor bar.

51. The apparatus according to claim 1 wherein said sensor arrangement includes a sensor able to scan across said item at each location of said sensor bar reached in being passed along said item.

52. The apparatus according to claim 1 wherein said sensor arrangement includes at least one sensor including an optical emitter-receiver projecting a beam so as to impinge on an upper surface of said item at points extending along and beneath said sensor bar and sensing impingements of said beam across the upper surface of said item and generating signals therefrom corresponding to the distance from said emitter of said optical emitter-receiver to said points on said upper surface; and, a signal processor determining the height of said upper surface points above said support surface from an analysis of said signals and also thereby determining the cross sectional contour of a section of said item extending through said points.

53. The apparatus according to claim 52 wherein said receiver of each sensor is offset from its associated emitter and includes a position sensitive detector determining the position of images seen by said position sensitive detector of said beam impingements, thereby enabling determination of the distance to points of impingement from each of the emitters on an upper surface of said item whereat said emitting beam is projected.

54. The apparatus according to claim 1 wherein said sensor arrangement includes one or more acoustic sensors having an acoustic emitter emitting sound waves and an acoustic receiver detecting a reflection thereof from a series of points extending across an upper surface of said item lying along and beneath said sensor bar and generating distance signals therefrom corresponding to the distance from said acoustic emitter to each of said points on said upper surface of said item; a signal processor computing the height of said upper surface above said support surface from said distance signals, and the cross sectional contour of a section of said item at said points on said item.

55. The apparatus according to claim 54 further including a temperature sensor sensing ambient temperatures and producing signals corresponding thereto, said signal processor receiving said temperature sensor signals and compensating said computing of said distances to said points for any effects of changes in temperature.

56. The apparatus according to claim 1 wherein said sensor arrangement includes a series of sensors mounted extending along said sensor bar.

57. The apparatus according to claim 56 wherein said sensor arrangement includes two or more adjacent rows of sensors.

58. The apparatus according to claim 57 wherein a time interval is provided between operation of successive emitters in said rows of sensors sufficient to prevent response to impingements of reflected beams resulting from operation of more than one emitter at a time.

59. The apparatus according to claim 56 wherein each of said sensors includes an emitter emitting a beam of waves at said item and an associated receiver responsive to reflections of said beam.

60. The apparatus according to claim 59 wherein at least some of said sensor emitters are operated at different times to minimize response by each sensor receiver of impingements of reflected beams originating from emitters of other sensors.

61. The apparatus according to claim 60 wherein a time interval is provided between operation of various emitters sufficient to prevent a response to reflections of beams resulting from operation of more than one emitter at a time.

62. The apparatus according to claim 59 wherein each receiver is offset from the associated emitter and includes a position sensitive detector laterally locating an image of said beam impingement on said item seen by said position sensitive detector, thereby enabling determination by triangulation of the distance from the emitter to said point of impingement on an upper surface of said item whereat said emitting beam is directed.

63. The apparatus according to claim 59 wherein the operation of said sensor emitters is multiplexed.

64. The apparatus according to claim 59 wherein each of said sensors simultaneously generates signals.

65. The apparatus according to claim 56 wherein each of said sensors includes an emitter emitting a beam of waves at said item, and the apparatus further including a two dimensional array of receivers positioned to detect reflections of said waves from said emitters reflected.

66. The apparatus according to claim 65 wherein a receiver in said two dimensional array with the strongest signal is utilized by said signal processor to determine the height of a point on said item.

67. The apparatus according to claim 65 wherein the signals produced by said receivers are processed to determine the receiver most in line with the impingement of reflected waves from a beam from an emitter, the signal from which is used by said signal processor in calculating the height of a point on the upper surface of said item.

68. The apparatus according to claim 65 wherein a two dimensional array of receivers is mounted to a transparent piece mounted on said sensor bar.

69. The apparatus according to claim 65 wherein at least some of said sensor emitters are operated at different times to minimize response by each receiver of impingements of reflected beams originating from other emitters.

70. The apparatus according to claim 56 wherein at least two rows of sensors are mounted along an underside of said sensor bar.

71. The apparatus according to claim 56 wherein each of said sensors simultaneously generates signals.

72. The apparatus according to claim 56 wherein each of said sensors successively generates sensor signals.

73. The apparatus according to claim 1 further including a data memory having stored density and cost per unit weight values for a particular type of item transmitted to said signal processor to determine a total cost of said item segment, and said display displaying the total cost of each segment defined at each position of said sensor bar in being passed over and along said item, as determined by said signal processor.

74. The apparatus according to claim 73 further including data input/output ports for selectively receiving and storing density or cost per unit weight values for use by said signal processor and exporting data therefrom.

75. The apparatus according to claim 73 further including data input/output ports for receiving and sending data signals.

76. The apparatus according to claim 1 further including a data memory having stored density values for a particular item utilized by said signal processor to determine the total weight of each item segment, and said display displaying said total weight of each segment defined at each position of said sensor bar in being passed over and along said item, as determined by said signal processor.

77. The apparatus according to claim 1 further including a vertically movable cutting blade device mounted to said sensor bar selectively operable to enable cutting of a segment from said item along the direction of said sensor bar.

78. The apparatus according to claim 1 further including a rotary blade cutter movably mounted to said sensor bar so as to enable cutting a segment from said item.

79. The apparatus according to claim 1 further including a cutter device comprising a laser beam generator mounted to said sensor bar and controllable to enable selective cutting of a segment from said item.

80. The apparatus according to claim 1 further including a marker device mounted on a marker plunger extendibly mounted to said sensor bar and selectively operable to mark an upper surface of said item.

81. The apparatus according to claim 80 wherein said marker device comprises an ink jet printer mounted to a plunger retractable into said sensor bar.

82. The apparatus according to claim 81 wherein said ink jet printer comprises a piezo electric ink jet printer device.

83. The apparatus according to claim 81 wherein said ink jet printer comprises a thermal bubble ink jet printer device.

84. The apparatus according to claim 80 wherein said marker plunger is selectively locked when retracted to keep said marker devices out of the way when not in use.

85. The apparatus according to claim 80 further including a sensor associated with said marker device detecting an extended position in contact with said item and a fully retracted position thereof.

86. The apparatus according to claim 1 further including at least two marker devices mounted along said sensor bar selectively operable to mark said item upper surface to together provide at least two markings as an aid in cutting said item.

87. The apparatus according to claim 86 wherein each marker device is mounted on said sensor bar to be extendible and retractable.

88. The apparatus according to claim 87 further including a selectively operable locking device preventing retraction or extension of said marking device from each position thereof.

89. The apparatus according to claim 1 further including a controller-signal processor case having tactile controls connected to said signal processor selectively controlling operation of said sensor bar.

90. The apparatus according to claim 89 wherein said controller-signal processor case includes a keyboard for inputting values with respect to item characteristics for use by said signal processor in determining item segment cost numeric values.

91. The apparatus according to claim 90 wherein item density values may be selectively input to a data memory of said signal processor by said keyboard.

92. The apparatus according to claim 90 wherein item cost per unit weight values are selectively input to the data memory of said signal processor by said keyboard.

93. The apparatus according to claim 89 wherein said controller-signal processor case includes a wireless link transmitting signals between said sensor bar and controller signal processor.

94. The apparatus according to claim 93 wherein said controller-signal processor case is detachably mounted to said apparatus.

95. The apparatus according to claim 93 wherein said wireless link includes a radio frequency transmitter-receiver.

96. The apparatus according to claim 93 wherein said wireless link includes an infrared communication device.

97. The apparatus according to claim 93 further including means for transmitting signals via a wireless link between said controller signal processor and external devices including at least one of a point of sale display, receipt printer, or cash register.

98. The apparatus according to claim 89 wherein said control signal processor case a display screen mounted thereto.

99. The apparatus according to claim 89 further including input and output ports (or transferring data to and from said signal processor.

100. The apparatus according to claim 1 wherein a manually graspable handle is affixed to one end of said sensor bar.

101. The apparatus according to claim 1 further including a outing device mounted to said sensor bar and a powered drive for driving said cutting device along said sensor bar.

102. The apparatus according to claim 1 wherein said display is substantially continuously updated by said signal processor as said sensor bar is passed over and along said item.

103. The apparatus according to claim 1 further including a motor driving said sensor bar along said support surface.

104. The apparatus according to claim 1 further including a knife blade mounted on said sensor bar having a cutting edge extending along and below said sensor bar.

105. A method of displaying a numeric value corresponding to the volume of any selected segment of an irregularly shaped item less than the whole of said item comprising:
disposing said item on a support surface;
supporting a sensor bar at a preset height above said support surface sufficient to clear said item;
relatively moving said sensor bar and said support surface to cause said sensor bar to pass over and along said item from a reference position over any section of said item to reach a position over a selected other section of said item intermediate the item's length so as to visually define a portion of said item between said reference position and said selected other section comprising a selected segment of said item less than the whole of said item;
generating sensor signals corresponding to the cross-sectional contour of successive sections of said item passing beneath said sensor bar as said sensor bar is moved to said selected other section;
detecting displacement of said sensor bar as said sensor bar is passed over and along said item and generating corresponding detector signals;
processing said generated sensor and detector signals to calculate therefrom the volume of said seiected segment of said item less than the whole of said item;
deriving a numeric value corresponding to the calculated volume of said selected segment; and
displaying said numeric value thereby derived while said sensor bar is positioned over said selected other section of said item.

106. The method according to claim 105 wherein generating sensor signals corresponding to the cross-sectional contour of each successive section of said item comprises sensing the height of points on an upper surface of said item above said support surface at a plurality of points lying along each section of said item as said sensor bar passes thereover.

107. The method according to claim 106 wherein generating sensor signals corresponding to the cross-sectional contour of successive sections of said item includes engaging an upper surface of said item simultaneously with a bottom end of each of a series of vertically moveable plungers carried by said sensor bar as said sensor bar passes over said item and generating signals corresponding to the vertical position of each of said plungers during said relative movement of said sensor bar.

108. The method according to claim 107 wherein engaging said item upper surface with plungers carried by said sensor bar, comprises mounting a series of vertically movable plungers spaced apart along the underside of said sensor bar and biasing said plungers to move down to engage a tip of each plunger with an upper surface of successive sections of said item or with said support surface in the absence of said item therebeneath, and further including the step of simultaneously generating signals corresponding to the position of each plunger tip while said sensor bar is moved relative to said support surface to pass over said upper surface of said item, with said plunger tips in engagement with said support surface or said upper surface of successive sections of said item.

109. The method according to claim 108 further including mounting a knife to said sensor bar and selectively retracting all of said plungers to expose a blade edge of said knife to allow cutting said item therewith.

110. The method according to claim 106 wherein sensing the height of points along said upper surface of each successive section of said item comprises directing a beam at said points on said upper surface of said item from each of a series of emitters on said sensor bar as said sensor bar is passed thereover.

111. The method according to claim 110 wherein directing a beam from each of a series of emitters at said item along successive sections of said item further includes mounting a series of receivers along said sensor bar positioned to detect reflections of beam impingements.

112. The method according to claim 106 wherein generating signals corresponding to the cross-sectional contour of successive sections of said item includes scanning a beam across said item at each of successive sections of said item as said sensor bar passes thereover and detecting reflections of said beam to determine said cross-sectional contour of successive sections of said item at each position of said sensor bar.

113. A method according to claim 106 wherein processing said generated sensor and detector signals includes defining a solid in part by said signals corresponding to said cross-sectional contour of each of said item sections at successive sensor bar positions and calculating the volume of said defined solid.

114. The method according to claim 105, further including marking an upper surface of said item across along a section thereof as a guide to cutting said item into a segment after a position over said selected other section is reached by said sensor bar.

115. The method according to claim 114 wherein marking said item includes mounting one or more ink jet printer devices to said sensor bar.

116. The method according to claim 114 wherein marking said item includes mounting a series of heating element branding devices to said sensor bar.

117. The method according to claim 114 wherein marking said item includes mounting one or more laser beam marking devices to said sensor bar.

118. The method according to claim 114 wherein marking said item includes mounting a series of sharp pointed marking devices to said sensor bar.

119. The method according to claim 105 wherein determining said numeric value includes multipiying said calculated volume by a stored density factor so that said displayed numeric value corresponds to the weight of an item segment.

120. The method according to claim 119 wherein determining said numeric value further includes multiplying said weight by a stored cost per unit of weight factor so that said numeric value comprises the price of an item segment.

121. The method according to claim 105 further including mounting a knife blade to said sensor bar so as to enable culling of said item therewith.

122. The method according to claim 105 wherein supporting said sensor bar comprises mounting a support post at either end of said sensor bar projecting downwardly to engage said support surface so as to support said sensor bar thereon.

123. The method according to claim 105 wherein supporting said sensor bar includes supporting said sensor bar on a table defining said support surface so as to constrain the motion of the sensor bar over said table to move through successive parallel and aligned positions.

124. The method according to claim 105 wherein supporting said sensor bar on said support surface comprises mounting pairs of support posts to each of two opposite ends of said sensor bar to stably support said sensor bar on said support surface.

125. The method according to claim 105 wherein supporting said sensor bar allows said sensor bar to be moved freely in all directions in a plane parallel to said support surface.

126. The method according to claim 125 wherein supporting said sensor bar also allows said sensor bar to be freely lifted and taken away from said support surface.

127. The method according to claim 125 wherein in processing said sensor and detector signals to calculate the volume of said selected segment backwards movement of said sensor bar is accounted for.

128. The method according to claim 125 wherein in processing said sensor and detector signals to calculate the volume of said selected segment skewing with respect to the direction of motion of said sensor bar in the plane of said support surface is accounted for.

129. The method according to claim 125 wherein movement of said sensor bar in directions crossing said item is accounted for.

130. The method according to claim 105 wherein relatively moving said sensor bar with respect to a support surface includes conveying said item on a conveyor belt located beneath said sensor bar and comprising said support surface.

131. A method of generating a numeric display corresponding to the volume of any selected segment of an item comprising:
disposing said item on a support surface;
positioning an elongated sensor bar extending across and above said item so as to provide a reference position of said sensor bar with respect to said item;
relatively moving said sensor bar with respect to said support surface to cause said sensor bar to move along said item in either direction to selectively allow movement to another position located on either side of said reference position to visually define a selected segment of said item lying between said another position and said reference position;
generating sensor signals corresponding to the cross-sectional contour of successive sections of said item passing said sensor bar as said sensor bar is moved relative thereto;
detecung the displacement of said sensor bar relative to said item in both directions as said sensor bar is passed over and along said item from said reference position to a selected another position on either side of said reference position, and generating corresponding detector signals;
processing said generated sensor and detector signals to derive therefrom the volume of a selected segment of said item visually defined by movement of said sensor bar in either direction from said reference position to said another position to selectively be able to determine the volume of a selected segment lying on either side of said reference position; and
displaying a numeric value corresponding to said volume of said selected segment derived from said sensor and detector signals upon said sensor bar reaching said another position along said item, whereby a numeric display may be produced corresponding to the volume of a selected segment able to be selectively defined on both sides of said reference position.

132. The method according to claim 131 wherein said sensor bar is manually moved when being moved along said item.

133. A method of displaying the weight or price of any selected segment less than the whole of an item to a person observing said item comprising the steps of:
positioning a sensor arrangement over and extending across said item;
passing said sensor arrangement along said item from a reference position with respect to said item while generating sensor signals corresponding to the cross-sectional contour of each successive section of said item passed by said sensor arrangement in reaching a selected other position with respect to said item so as to visually define a selected segment of said item;
detecting the displacement of said sensor arrangement in moving along said item from said reference position with respect to said item to a selected other position with respect to said item and generating corresponding detector signals; and
calculating the total volume of said selected segment of said item from said sensor signals and said detector signals and displaying a corresponding numeric value corresponding to said calculated total volume at a time when said sensor arrangement is at said selected other position with respect to said item so as to allow a person to view together the position of said sensor arrangement along said item and said displayed price or weight numerical value.

134. The method according to claim 133 wherein displaying a numeric value comprises displaying the price of said selected segment of said item derived from said calculated volume thereof.

135. The method according to claim 133 wherein in displaying a numeric value comprises displaying the weight of said selected segment of said item derived from said calculated volume thereof.

136. An apparatus for displaying a numeric value corresponding to the volume of any selected segment of an item comprising:

a support surface for supporting said item;

a sensor arrangement;

a sensor arrangement support for mounting said sensor arrangement for freely allowing relative movement along said support surface in back and forth directions along said item so that said sensor arrangement can be selectively positioned aligned with any section of said item from any other section along said item so that said movement of said sensor arrangement support between said sections visually defines a selected segment of said item less than the whole lying between said sections;

a displacement detector arrangement which generates signals corresponding to displacement of said sensor arrangement support in back and forth directions from any selected reference position along said item in being positioned adjacent to any selected section of said item;

said sensor arrangement generating signals corresponding to the cross sectional contour of successive sections of said item passed by said sensor arrangement in reaching said selected section;

a signal processor receiving said signals generated by said displacement detector arrangement and said sensor arrangement and computing therefrom the volume of any selected segment of said item defined between any reference position and any selected section of said item while moving said sensor arrangement support in said back and forth directions; and a display displaying a numeric value corresponding to said volume of any selected segment of the item as computed by said signal processor with said sensor arrangement support positioned adjacent said any selected section of said item.

137. An apparatus for displaying a numeric value corresponding to the volume of any selected segment of an item comprising:

a support surface for supporting said item;

a sensor arrangement;

a support for said sensor arrangement freely allowing relative movement on said support surface back and forth in either direction along an item across so that said sensor arrangement support can be manually selectively positioned aligned with any intermediate section of said item so as to provide to the user a visually defined segmenting of said item by the position of said sensor arrangement support over said item;

a displacement detector arrangement which generates signals corresponding to the displacement of said sensor arrangement support from a position of said sensor arrangement support aligned with a selected starting section of said item to be positioned aligned to any intermediate selected other section of said item;

said sensor arrangement generating signals corresponding to the cross sectional contour of successive sections of said item passed by said sensor arrangement in being displaced to be aligned with said selected other section;

a signal processor receiving said signals generated by said displacement detector arrangement and said sensor arrangement and computing therefrom the volume of a selected segment of said item less than the whole of said item visually defined between said selected starting section of said item and said intermediate selected other section of said item; and, a display displaying a numeric value corresponding to said volume of the selected segment of the item as computed by said signal processor with said sensor arrangement support at a position aligned with said selected other section of said item.

138. An apparatus for displaying a numeric value corresponding to the price of any selected segment of an item to be sold comprising:

a support surface for supporting said item;

a sensor arrangement;

a sensor arrangement support for mounting said sensor arrangement to be freely movable across said support surface in opposite directions along said item so that said sensor arrangement can be selectively positioned adjacent to any selected section along said item by movement from an initial reference position with respect to said item so as to visually define for the user a selected segment of said item less than the whole of said item lying between said selected section and said reference position of said sensor arrangement support;

a displacement detector arrangement which generates signals corresponding to the relative displacement of said sensor arrangement support from said reference position said selected section of said item;

said sensor arrangement generating signals corresponding to the cross sectional contour of successive sections of said item passed by said sensor arrangement during said movement in reaching said selected section;

a signal processor receiving said signals generated by said displacement detector arrangement and said sensor arrangement and computing therefrom the volume of said selected segment of said item less than the whole of said item; and, a display substantially contemporaneously displaying numeric values corresponding to the price of said selected segment of said item less than the whole of said item as computed by said signal processor as said sensor arrangement support is moved to said selected section.

139. The apparatus according to claim 138 further including a sensor arrangement support drive powering said movement thereof.

140. A method of displaying a numeric value corresponding to the volume of a selected segment of an item comprising the steps of:

disposing said item on a support surface;

supporting a sensor arrangement above said surface so as to clear said item;

manually moving said sensor arrangement relative to said support surface in either direction along the item to enable said sensor arrangement to be positioned over any selected section of said item by displacement from a reference position with respect to said item so as to visually define successive segments of said item less than the whole of said item by said movement of said sensor arrangement over successive sections of said item;

generating signals corresponding to the cross-sectional contour of successive sections of said item passing beneath said sensor arrangement as said sensor arrangement is moved along said item;

detecting the displacement of said sensor arrangement from said reference position as said sensor arrangement is moved along said item to a successive section of said item and generating corresponding detector signals;

processing said generated sensor arrangement and detector signals to calculate therefrom the volume of each segment of said item defined between said reference position and successive sections of said item thereof passed by said sensor arrangement;

deriving a numeric value corresponding to the calculated volume of each successive segment; and displaying said numeric value thereby derived upon said sensor arrangement reaching each successive section so that a user can readily observe both any selected segment of said item and said corresponding numeric value displayed.

141. A method of displaying a numeric value corresponding to the volume of a selected segment of an item less than the whole of said item, comprising extending an indicator across said item, and moving said indicator along said item from a selected reference position with respect to said item while determining the volume of a selected segment of said item less than the whole of said item traversed by said indicator in reaching another position along said item over a selected section of said item, said indicator positioned adjacent to said item so as to thereby visually define said selected segment of said item by the positioning of said indicator directly over said selected section of said item to be substantially vertically aligned therewith, said selected section comprising one side of said selected segment; and displaying a numeric value corresponding to said volume of said selected segment of said item with said indicator in said another position over said selected section of said item.

142. The method according to claim 141 wherein said numeric value comprises the weight of said selected segment.

143. The method according to claim 141 wherein said numeric value comprises a price of said selected segment.

144. The method according to claim 141 wherein said numeric value is displayed substantially contemporaneously as said indicator reaches said other position.

145. The method according to claim 141 wherein said numeric value is displayed adjacent said indicator to allow the position of said indicator along said item and said displaying of said numeric value to be viewed together.

146. The method according to claim 141 wherein a movable elongated bar extended across said item is used as an indicator.

147. The method according to claim 141 further including cutting said selected segment from said item.

* * * * *